(12) United States Patent
Kondo

(10) Patent No.: US 10,715,798 B2
(45) Date of Patent: Jul. 14, 2020

(54) IMAGE PROCESSING APPARATUS AND METHOD THEREOF

(71) Applicant: SONY CORPORATION, Tokyo (JP)

(72) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/861,973

(22) Filed: Jan. 4, 2018

(65) Prior Publication Data

US 2018/0131931 A1 May 10, 2018

Related U.S. Application Data

(63) Continuation of application No. 14/363,874, filed as application No. PCT/JP2013/050214 on Jan. 9, 2013, now Pat. No. 9,894,355.

(30) Foreign Application Priority Data

| Jan. 19, 2012 | (JP) | 2012-009330 |
| Mar. 2, 2012 | (JP) | 2012-046567 |
| Apr. 26, 2012 | (JP) | 2012-101007 |

(51) Int. Cl.
- *H04N 19/103* (2014.01)
- *H04N 19/136* (2014.01)

(Continued)

(52) U.S. Cl.
CPC ......... *H04N 19/103* (2014.11); *H04N 19/132* (2014.11); *H04N 19/136* (2014.11); *H04N 19/176* (2014.11)

(58) Field of Classification Search
CPC ... H04N 19/103; H04N 19/136; H04N 19/176
See application file for complete search history.

(56) References Cited

U.S. PATENT DOCUMENTS

| 2005/0047507 A1* | 3/2005 | Ju ..................... H04N 19/159 375/240.12 |
| 2005/0265450 A1* | 12/2005 | Raveendran ........... H04N 19/51 375/240.15 |

(Continued)

FOREIGN PATENT DOCUMENTS

| JP | 2010-278668 A | 12/2010 |
| WO | 2006/082690 A1 | 8/2006 |
| WO | 2013/047805 A1 | 4/2013 |

OTHER PUBLICATIONS

Ikai ("Bi-prediction restriction in small Pu", Joint Collaborative Team on Video Coding (JCT-VC) of ITU-T SG16 WP3 and ISO/IEC JTC1/SC29/WG11 7th Meeting: Geneva, CH, Nov. 21-30, 2011, [JCTVC-G307_r1]) (Year: 2011).*

(Continued)

*Primary Examiner* — Maria E Vazquez Colon
(74) *Attorney, Agent, or Firm* — Chip Law Group

(57) ABSTRACT

The present technology relates to an image processing apparatus and method capable of preventing an increase in a cost of the apparatus. A setting unit sets restriction information for restricting a size of a block of an image and a prediction method to be applied to the block having the size. An inter-prediction unit generates a prediction image according to the restriction information. An encoder 1000 encodes the block using the prediction image and generates an encoded stream. Then, the encoder 1000 transmits the encoded stream and the restriction information. The present technology can be applied to a case of encoding/decoding an image, and the like.

17 Claims, 46 Drawing Sheets

(51) Int. Cl.
*H04N 19/176* (2014.01)
*H04N 19/132* (2014.01)

(56) References Cited

U.S. PATENT DOCUMENTS

| 2009/0161766 A1* | 6/2009 | Bronstein | H04N 19/132 375/240.23 |
|---|---|---|---|
| 2012/0082222 A1 | 4/2012 | Wang et al. | |
| 2013/0156096 A1 | 6/2013 | Yang | |

OTHER PUBLICATIONS

Kondo et al. ("Non-CE3: Report on a restriction for small block", Joint Collaborative Team on Video Coding (JCT-VC) of ITU-T SG16 WP3 and ISO/IEC JTC1/SC29/WG11, 7th Meeting: Geneva, CH, Nov. 21-30, 2011). (Year: 2011).*
International Search Report and Written Opinion of PCT Application No. PCT/JP2013/050214, dated Apr. 16, 2013, 05 pages of English Translation and 06 pages of ISRWO.
Office Action for CN Patent Application No. 201380005222.6, dated Feb. 6, 2017, 08 pages of Office Action and 17 pages of English Translation.
Joint Collaborative Team on Video Coding (JCT-VC) of ITU-T SG16 WP3 and 180/IEC JTC1/SC29/WG11, 7th Meeting: Geneva, CH, Nov. 21-30, 2011.
Ikai, et al, "Bi-Prediction Restriction in Small PU", Joint Collaborative Team on Video Coding (JCT-VC) of ITU-T SG16 WP3 and ISO/IEC JTC1/SC29/WG11, 7th Meeting: Geneva, CH, Nov. 21-30, 2011.
Kondo, et al, "Non-CE3: Report on a Restriction for Small Block", Joint Collaborative Team on Video Coding (JCT-VC) of ITU-T SG16 WP3 and ISO/IEC JTC1/SC29/WG11, JCTVC-G392, 7th Meeting: Geneva, CH, Nov. 21-30, 2011, 08 pages.
Office Action for JP Patent Application No. 2013-554276, dated Oct. 20, 2015.
"Test Model Under Consideration", JCT-VC, Joint Collaborative Team on Video Coding (JCT-VC) of ITU-T SG16 WP3 and ISO/IEC JTC1/SC29/WG11, Document: JCTVC-B205, 2010, 153 pages.
Jung, et al., "Competition-Based Scheme for Motion Vector Selection and Coding", ITU-Telecommunications AV Standardization Sector, Video Coding Experts Group (VCEG), Document: VCEG-AC06, 2006, 07 Pages.
Winken, et al., "Description of Video Coding Technology Proposal by AW Fraunhofer HHI", Fraunhofer HHI, Joint collaborative Team on Video Coding (JCT-VC) of ITU-T SG16 WP3 and ISO/IEC JTC1/SC29/WG11, JCTVC-A116, 2010, 44 pages.
"Advanced Video Coding for Generic Audiovisual Services", Recommendation ITU-T H.264, Series H: Audiovisual and Multimedia Systems Infrastructure of Audiovisual Services—Coding of Moving Video, Telecommunication Standardization Sector of ITU, 2009, pp. 300-305.
International Preliminary Report on Patentability of PCT Application No. PCT/JP2013/050214, dated Jul. 31, 2014, 07 pages of English Translation and 03 pages of IPRP.

Notice of Allowance for U.S. Appl. No. 14/363,874, dated Oct. 5, 2017, 05 pages.
Non-Final Office Action for U.S. Appl. No. 14/363,874, dated Apr. 17, 2017, 15 pages.
Final Office Action for U.S. Appl. No. 14/363,874, dated Nov. 29, 2016, 17 pages.
Non-Final Office Action for U.S. Appl. No. 14/363,874, dated Jun. 28, 2016, 10 pages.
Office Action for JP Patent Application No. 2017-173737, dated Aug. 2, 2018, 05 pages of Office Action and 05 pages of English Translation.
Kondo, et al., "Non-CE3: Report on a Restriction for Small Block", Joint Collaborative Team on Video Coding (JCT-VC) of ITU-T SG16 WP3 and ISO/TEC JTC1/SC29/ WG11, 7th Meeting, Geneva, JCTVC-G392, Nov. 21-30, 2011, 07 pages.
"Advanced Video Coding for Generic Audiovisual Services", Series H: Audiovisual and Multimedia Systems Infrastructure of Audiovisual Services—Coding of Moving Video, ITU-T, H.264, Mar. 2009, 12 pages.
Tomohiro Ikai, "Bi-Prediction Restriction in Small PU", Joint Collaborative Team on Video Coding (JCT-VC) of ITU-T SG16 WP3 and ISO/IEC JTC1/SC29/WG11, JCTVC-G307, 7th Meeting, Geneva, Nov. 21-30, 2011, 06 pages.
Office Action for JP Patent Application No. 2017-173737, dated Feb. 21, 2019, 04 pages of Office Action and 04 pages of English Translation.
Kondo, et al., "Non-CE3: Report on a Restriction for Small Block", Joint Collaborative Team on Video Coding (JCTVC-G392) of ITU-T SG16 WP 3 and ISO/IEC JTC1/SC29/WG11, 7 Meeting, Geneva, Nov. 21-30, 2011, pp. 1-6.
Tomohiro Ikai, "Bi-Prediction Restriction in Small PU", Joint Collaborative Team on Video Coding (JCT-VC) of ITU-T SG16 WP3 and ISO/IEC JTC1/SC29/WG11, 7th Meeting, Geneva, JCTVC-G307_r1, pp. 1-5.
"Advanced Video Coding for Generic Audiovisual Services", Series H: Audiovisual and Multimedia Systems, Infrastructure of audiovisual services-coding of moving video, Telecommunication Standardization Sector of ITU, H.264, Mar. 2009, pp. 297-306.
Office Action for EP Patent Application No. 13738943.3, dated Dec. 4, 2018, 29 pages of Office Action.
Kondo, et al., "AHG7: Level Definition to Limit Memory Bandwidth of MC", Joint Collaborative Team on Video Coding (JCT-VC) of ITU-T SG16 WP 3 and ISO/IEC JTC1/SC 29/WG 11, 9th Meeting Geneva, JCTVC-10106, Apr. 27-May 7, 2012, 06 pages.
"Advanced Video Coding for Generic Audiovisual Services", Series:H Audiovisual and Multimedia Systems, Infrastructure of audiovisual services-coding of moving video, Telecommunication standardization sector of ITU, H.264, Mar. 2009, 12 pages.
Tomohiro Ikai, et al., "Bi-Prediction Restriction in Small PU", Joint Collaborative Team on Video Coding (JCT-VC) of ITU-T SG16 WP 3 and ISO/IEC JTC1/SC 29/WG 11, 7th Meeting Geneva, JCTVC-G307_r1, Nov. 21-30, 2011, 07 pages.
Kondo, et al., "Non-CE3: Report on a Restriction for Small Block", Joint Collaborative Team on Video Coding (JCT-VC) of ITU-T SG16 WP 3 and ISO/IEC JTC1/SC 29/WG 11, 7th Meeting Geneva, JCTVC-G392, Nov. 21-30, 2011, 08 pages.

* cited by examiner

FIG. 17

| disable_bip_small_mrg_idc INFORMATION | |
|---|---|
| VALUE | CHANGE OF PREDICTION METHOD |
| 0 | NO CHANGE |
| 1 | CHANGE BI-DIRECTIONAL PREDICTION TO UNIDIRECTIONAL PREDICTION FOR BLOCK OF 4×4 |
| 2 | CHANGE BI-DIRECTIONAL PREDICTION TO UNIDIRECTIONAL PREDICTION FOR BLOCKS OF 4×4, 8×4, AND 4×8 |
| 3 | CHANGE BI-DIRECTIONAL PREDICTION TO UNIDIRECTIONAL PREDICTION FOR BLOCKS OF 4×4, 8×4, 4×8, AND 8×8 |

FIG. 19 disable_bip_small_mrg_idc EXTENSION INFORMATION

| VALUE | CHANGE OF PREDICTION METHOD |
|---|---|
| 0 | NO CHANGE |
| 1 | CHANGE BI-DIRECTIONAL PREDICTION TO L0 PREDICTION FOR BLOCK OF 4×4 |
| 2 | CHANGE BI-DIRECTIONAL PREDICTION TO L1 PREDICTION FOR BLOCK OF 4×4 |
| 3 | CHANGE BI-DIRECTIONAL PREDICTION TO L0 PREDICTION FOR BLOCKS OF 4×4, 8×4, AND 4×8 |
| 4 | CHANGE BI-DIRECTIONAL PREDICTION TO L1 PREDICTION FOR BLOCKS OF 4×4, 8×4, AND 4×8 |
| 5 | CHANGE BI-DIRECTIONAL PREDICTION TO L0 PREDICTION FOR BLOCKS OF 4×4, 8×4, 4×8, AND 8×8 |
| 6 | CHANGE BI-DIRECTIONAL PREDICTION TO L1 PREDICTION FOR BLOCKS OF 4×4, 8×4, 4×8, AND 8×8 |

FIG. 25

| RESTRICTION MODE RB | CONTENT OF RESTRICTION | | | | |
|---|---|---|---|---|---|
| B1(Lv. 1) | Bi-4x4 | | | | |
| B2(Lv. 2) | Bi-4x4 | Bi-4x8 | | | |
| B3(Lv. 3) | Bi-4x4 | Bi-4x8 | Bi-8x4 | | |
| B4(Lv. 4) | Bi-4x4 | Bi-4x8 | Bi-8x4 | Uni-4x4 | |
| B5(Lv. 5) | Bi-4x4 | Bi-4x8 | Bi-8x4 | Uni-4x4 | Bi-8x8 |
| B6(Lv. 6) | Bi-4x4 | Bi-4x8 | Bi-8x4 | Uni-4x4 | Bi-8x8 | Uni-4x8 |
| B7(Lv. 7) | Bi-4x4 | Bi-4x8 | Bi-8x4 | Uni-4x4 | Bi-8x8 | Uni-4x8 | Uni-8x4 |

FIG. 29

| Frame rate | LCU size | RESTRICTION MODE RV | | |
|---|---|---|---|---|
| | | V1(Lv. 1) | V2(Lv. 2) | V3(Lv. 3) |
| 0<rate<=30 | 8x8 | 8 | 4 | 2 |
| | 16x16 | 32 | 16 | 8 |
| | 32x32 | 128 | 64 | 32 |
| | 64x64 | 512 | 256 | 128 |
| 30<rate<=60 | 8x8 | 4 | 2 | 1 |
| | 16x16 | 16 | 8 | 4 |
| | 32x32 | 64 | 32 | 16 |
| | 64x64 | 256 | 128 | 64 |
| 60<rate<=120 | 8x8 | 2 | 1 | 1 |
| | 16x16 | 8 | 4 | 2 |
| | 32x32 | 32 | 16 | 8 |
| | 64x64 | 128 | 64 | 32 |

FIG. 30

| | Descriptor |
|---|---|
| seq_parameter_set_rbsp() { | |
| profile_idc | u(8) |
| ... | |
| if(log2_min_coding_block_size_minus3==0) | |
| inter_4x4_enabled_flag | u(1) |
| disable_bip_small_mrg_idc | u(2) |
| num_short_term_ref_pic_sets | ue(v) |
| ... | |
| } | |

FIG. 31

| disable_bip_small_mrg_idc | SIZE OF PU (prediction blocks) FOR WHICH BI-DIRECTIONAL PREDICTION IS PROHIBITED |
|---|---|
| 0 | — |
| 1 | 4x4 |
| 2 | 4x4, 8x4, 4x8 |
| 3 | 4x4, 8x4, 4x8, 8x8 |

FIG. 32

| seq_parameter_set_rbsp( ) { | | |
| --- | --- | --- |
| ... | | |
| temporal_id_nesting_flag | | u(1) |
| if(log2_min_coding_block_size_minus3<=1) | | |
| disable_inter_4x8_8x4_8x8_bidir_flag | | u(1) |
| if(log2_min_coding_block_size_minus3==0 && disable_inter_4x8_8x4_8x8_bidir_flag==0) | | |
| disable_inter_4x8_8x4_bidir_flag | | u(1) |
| num_short_term_ref_pic_sets | | ue(v) |

FIG. 33

| | | |
|---|---|---|
| prediction_unit(x0,y0,log2CbSize) { | | |
| ... | | |
| } else { /* MODE_INTER */ | | |
|   merge_flag[x0][y0] | | ae(v) |
|   if(merge_flag[x0][y0]) { | | |
|     if(MaxNumMergeCand>1) | | |
|       merge_idx[x0][y0] | | ae(v) |
|   } else { | | |
|     disable_bidir=( | | |
|     (log2CbSize==3 && ( | | |
|       (disable_inter_4x8_8x4_bidir_flag && (PartMode==PART_Nx2N\|\|PartMode==PART_2NxN)) \|\| | | |
|       (disable_inter_4x8_8x4_8x8_bidir_flag && PartMode==PART_2Nx2N) | | |
|     )) \|\| | | |
|     (log2CbSize==4 && disable_inter_4x8_8x4_8x8_bidir_flag && PartMode == PART_NxN) | | |
|     ) | | |
|     ? 1 : 0; | | |
|     if(slice_type == B && !disable_bidir) | | |
|       inter_pred_flag[x0][y0] | | ae(v) |
|     if(inter_pred_flag[x0][y0] == Pred_LC) { | | |
|       if(num_ref_idx_lc_active_minus1>0) | | |
|         ref_idx_lc[x0][y0] | | ae(v) |
|       mvd_coding(mvd_lc[x0][y0][0], | | |
|         mvd_lc[x0][y0][1]) | | |
|       mvp_lc_flag[x0][y0] | | ae(v) |

IMAGE PROCESSING APPARATUS AND METHOD THEREOF

CROSS REFERENCE TO RELATED APPLICATIONS

The present application is a continuation application of U.S. patent application Ser. No. 14/363,874, filed Jun. 9, 2014 which is a National Stage Entry of PCT/JP2013/50214, filed Jan. 9, 2013, and claims the benefit of priority from Japanese Patent Application JP 2012-101007 filed Apr. 26, 2012, Japanese Patent Application JP 2012-046567 filed Mar. 2, 2012, and Japanese Patent Application JP 2012-009330 filed Jan. 19, 2012, the entire contents of which are incorporated herein by reference.

TECHNICAL FIELD

The present technology relates to an image processing apparatus and a method thereof, particularly to an image processing apparatus and a method thereof configured to prevent an increase in cost of the apparatus, for example.

BACKGROUND ART

In recent years, an apparatus based on a method such as Moving Picture Experts Group (MPEG) in which image information is treated as digital data, and at that time, the image information is compressed by orthogonal transform such as discrete cosine transform, and motion compensation by using redundancy unique to the image information for transmission and accumulation of information with high efficiency, is widely used for both information distribution in a broadcasting station or the like, and information reception at home.

In particular, MPEG2 (International Organization for Standardization (ISO)/International Electrotechnical Commission (IEC) 13818-2) is defined as a general-purpose image encoding method, and is currently widely used in a broad range of application for professional use and consumer use, as standards covering all of an interlace scanning image and a sequential scanning image, a standard resolution image, and a high definition image. By using the MPEG2 compression method, a high compression ratio and excellent image quality can be realized by assigning a coding rate (bit rate) of 4 Mbps to 8 Mbps in a case of a standard-resolution interlace scanning image including 720×480 pixels, and a coding rate of 18 Mbps to 22 Mbps in a case of a high-resolution interlace scanning image including 1920×1088 pixels.

MPEG2 was mainly used for high image quality encoding suitably used for broadcasting, but was not compatible with an encoding method using a lower coding rate (bit rate) than that of MPEG1, that is, at a higher compression rate. Needs for such an encoding method was expected to be increased in the future with spread of portable terminals, and standardization of a MPEG4 encoding method was performed in response thereto. For standards of an image encoding method, standards of ISO/IEC 14496-2 were approved as international standards in December, 1998.

In addition, in recent years, first, standardization of H.26L (International Telecommunication Union Telecommunication Standardization Sector (ITU-T) Q6/16 Video Coding Expert Group (VCEG)) is in progress with the aim of image encoding for teleconferencing. H.26L requires a larger calculation amount due to encoding and decoding, compared to the encoding method of the related art such as MPEG2 or MPEG4, but is a well-known method for realizing higher encoding efficiency. In addition, currently, as the part of an operation of MPEG4, standardization for realizing higher encoding efficiency by even introducing functions not supported in H.26L, based on H.26L, is performed as Joint Model of Enhanced-Compression Video Coding.

In a schedule of the standardization, H.264/MPEG-4 Part 10 (Advanced Video Coding, hereinafter, referred to as AVC) became international standard in March, 2003.

However, there was a concern that a macro block size of 16 pixels×16 pixels may not be optimal with respect to a large frame of Ultra High Definition (UHD; 4000 pixels×2000 pixels), which may be a target of a next-generation encoding method.

Herein, currently, for further improvement of the encoding efficiency by AVC, standardization of an encoding method called High Efficiency Video Coding (HEVC) is in progress by Joint Collaboration Team—Video Coding (JCTVC) which is a joint standardization organization of ITU-T and ISO/IEC (for example, see NPL 1).

In the encoding method of HEVC, a coding unit (CU) is defined to be the same processing unit as the macro block of AVC. Unlike the macro block of AVC, the size of the CU is not fixed to 16×16 pixels, and is designated in image compression information in respective sequences.

However, in order to improve encoding of a motion vector using median prediction of AVC, adaptively using any one of "temporal predictor" and "spatio-temporal predictor" as predictive motion vector information, in addition to "spatial predictor" which is defined in AVC and is acquired by median prediction (for example, see NPL 2), has been proposed.

In an image information encoding device, a cost function in a case of using each predictive motion vector information item, is calculated for each block, and selection of optimal predictive motion vector information is performed. In the image compression information, graph information showing information indicating which predictive motion vector information is used with respect to each block is transmitted.

In addition, as one of encoding methods of motion information, a method called Motion Partition Merging (hereinafter, also referred to as a merge mode) is proposed (for example, see NPL 3). In this method, in a case where motion information of a corresponding block is the same as motion information of peripheral blocks, only flag information is transmitted, and the motion information of the corresponding block is reconstructed using the motion information of the peripheral blocks when performing decoding.

CITATION LIST

Non Patent Literature

NPL 1: "Test Model under Consideration", JCTVC-B205, Joint Collaborative Team on Video Coding (JCT-VC) of ITU-T SG16 WP3 and ISO/IEC JTC1/SC29/VVG112nd Meeting: Geneva, CH, 21 to 28 Jul. 2010

NPL 2: Joel Jung, Guillaume Laroche, "Competition-Based Scheme for Motion Vector Selection and Coding", VCEG-AC06, ITU—Telecommunications Standardization Sector STUDY GROUP 16 Question 6Video Coding Experts Group (VCEG) 29th Meeting: Klagenfurt, Austria, 17 and 18 Jul. 2006

NPL 3: Martin Winken, Sebastian Bosse, Benjamin Bross, Philipp Helle, Tobias Hinz, Heiner Kirchhoffer, Haricharan Lakshman, Detlev Marpe, Simon Oudin, Matthias Preiss, Heiko Schwarz, Mischa Siekmann, Karsten Suehring, and Thomas Wiegand, "Description of video coding technology proposed by Fraunhofer HHI", JCTVC-A116, April, 2010

SUMMARY OF INVENTION

Technical Problem

In AVC or HEVC, predictive encoding of generating a predictive image and encoding an image using the predictive image is performed.

In the predictive encoding, a decoded image which is (encoded and then) decoded in advance is used for generating the predictive image, and thus the decoded image is stored in a memory called a Decode Picture Buffer (DPB), if necessary. The decoded image stored in the DPB is read out from the DPB as a reference image, when generating the predictive image.

However, the cost of the apparatus increases when attempting to secure a large range of a bandwidth (high rate), as a memory bandwidth which is a transmission rate at which the decoded image is read out from the DPB.

The present technology is made in consideration of these circumstances and is for preventing an increase in cost of the apparatus.

Solution to Problem

According to a first aspect of the present technology, there is provided an image processing apparatus including: a setting unit which sets restriction information for restricting a size of a block of an image and a prediction method to be applied to the block having the size; a prediction unit which generates a prediction image according to the restriction information set by the setting unit; an encoding unit which encodes the image using the prediction image generated by the prediction unit and generates an encoded stream; and a transmission unit which transmits the encoded stream generated by the encoding unit and the restriction information set by the setting unit.

According to the first aspect of the present technology, there is provided an image processing method including: a setting step of setting restriction information for restricting a size of a block of an image and a prediction method to be applied to the block having the size; a prediction step of generating a prediction image according to the restriction information set in the setting step; an encoding step of encoding the image using the prediction image generated in the prediction step and generating the encoded stream; and a transmission step of transmitting the encoded stream generated in the encoding step and the restriction information set in the setting step.

In the first aspect described above, the restriction information for restricting a size of a block of an image and a prediction method to be applied to the block having the size is set, and the prediction image is generated according to the restriction information. In addition, the image is encoded using the prediction image and the encoded stream is generated. Further, the encoded stream and the restriction information are transmitted.

According to a second aspect of the present technology, there is provided an image processing apparatus including: a reception unit which receives restriction information for restricting a size of a block of an image and a prediction method to be applied to the block having the size, and an encoded stream generated by encoding the image; a prediction unit which generates a prediction image according to the restriction information received by the reception unit; and a decoding unit which decodes the encoded stream received by the reception unit, using the prediction image generated by the prediction unit.

According to the second aspect of the present technology, there is provided an image processing method including: a reception step of receiving restriction information for restricting a size of a block of an image and a prediction method to be applied to the block having the size, and an encoded stream generated by encoding the image; a prediction step of generating a prediction image according to the restriction information received in the reception step; and a decoding step of decoding the encoded stream received in the reception step, using the prediction image generated in the prediction step.

In the second aspect described above, the restriction information for restricting a size of a block of an image and a prediction method to be applied to the block having the size, and the encoded stream generated by encoding the image are received, and the prediction image is generated according to the restriction information. In addition, the encoded stream is decoded using the prediction image.

According to a third aspect of the present technology, there is provided an image processing apparatus including: a setting unit which sets restriction information for restricting a size of a block of an image and a prediction method to be applied to the block having the size, based on a profile and a level; a prediction unit which generates a prediction image according to the restriction information set by the setting unit; an encoding unit which encodes the image using the prediction image generated by the prediction unit and generates an encoded stream; and a transmission unit which transmits the encoded stream generated by the encoding unit.

According to the third aspect of the present technology, there is provided an image processing method including: a setting step of setting restriction information for restricting a size of a block of an image and a prediction method to be applied to the block having the size, based on a profile and a level; a prediction step of generating a prediction image according to the restriction information set in the setting step; an encoding step of encoding the image using the prediction image generated in the prediction step and generating an encoded stream; and a transmission step of transmitting the encoded stream generated in the encoding step.

In the third aspect described above, the restriction information for restricting a size of a block of an image and a prediction method to be applied to the block having the size, is set based on a profile and a level, and the prediction image is generated according to the restriction information. In addition, the image is encoded using the prediction image, the encoded stream is generated, and the encoded stream is transmitted.

According to a fourth aspect of the present technology, there is provided an image processing apparatus including: a reception unit which receives an encoded stream encoded according to restriction information for restricting a size of a block of an image and a prediction method to be applied to the block having the size, based on a profile or a level; a prediction unit which generates a prediction image according to the restriction information recognized based on the profile or the level; and a decoding unit which decodes the encoded stream received by the reception unit, using the prediction image generated by the prediction unit.

According to the fourth aspect of the present technology, there is provided an image processing method including: a reception step of receiving an encoded stream encoded according to restriction information for restricting a size of a block of an image and a prediction method to be applied to the block having the size, based on a profile or a level; a prediction step of generating a prediction image according to the restriction information recognized based on the profile or the level; and a decoding step of decoding the encoded stream received in the reception step, using the prediction image generated in the prediction step.

In the fourth aspect described above, the encoded stream encoded according to the restriction information for restricting a size of a block of an image and a prediction method to be applied to the block having the size, based on the profile or the level, is received, and the prediction image is generated according to the restriction information recognized based on the profile or the level. In addition, the encoded stream is decoded using the prediction image.

Advantageous Effects of Invention

According to the present technology, it is possible to prevent an increase in a cost of the apparatus.

BRIEF DESCRIPTION OF DRAWINGS

FIG. 17 is a diagram illustrating disable_bip_small_mrg_idc information.

FIG. 19 is a diagram illustrating disable_bip_small_mrg_idc extension information.

FIG. 25 is a diagram illustrating a restriction mode RB.

FIG. 29 is a diagram illustrating a restriction mode RV.

FIG. 30 is a diagram showing a first example of syntaxes of header information of encoded data, including identification information.

FIG. 31 is a diagram showing values taken by a flag disable_bip_small_mrg_idc, and showing sizes of blocks of which bidirectional prediction is prohibited by each value of the flag disable_bip_small_mrg_idc.

FIG. 32 is a diagram showing a second example of syntaxes of header information of encoded data, including identification information.

FIG. 33 is a diagram showing a second example of syntaxes of header information of encoded data, including identification information.

DESCRIPTION OF EMBODIMENTS

Hereinafter, embodiments of the present technology will be described, but before that, a basic technology will be described.

[Image Encoding Device]

Figure 1:
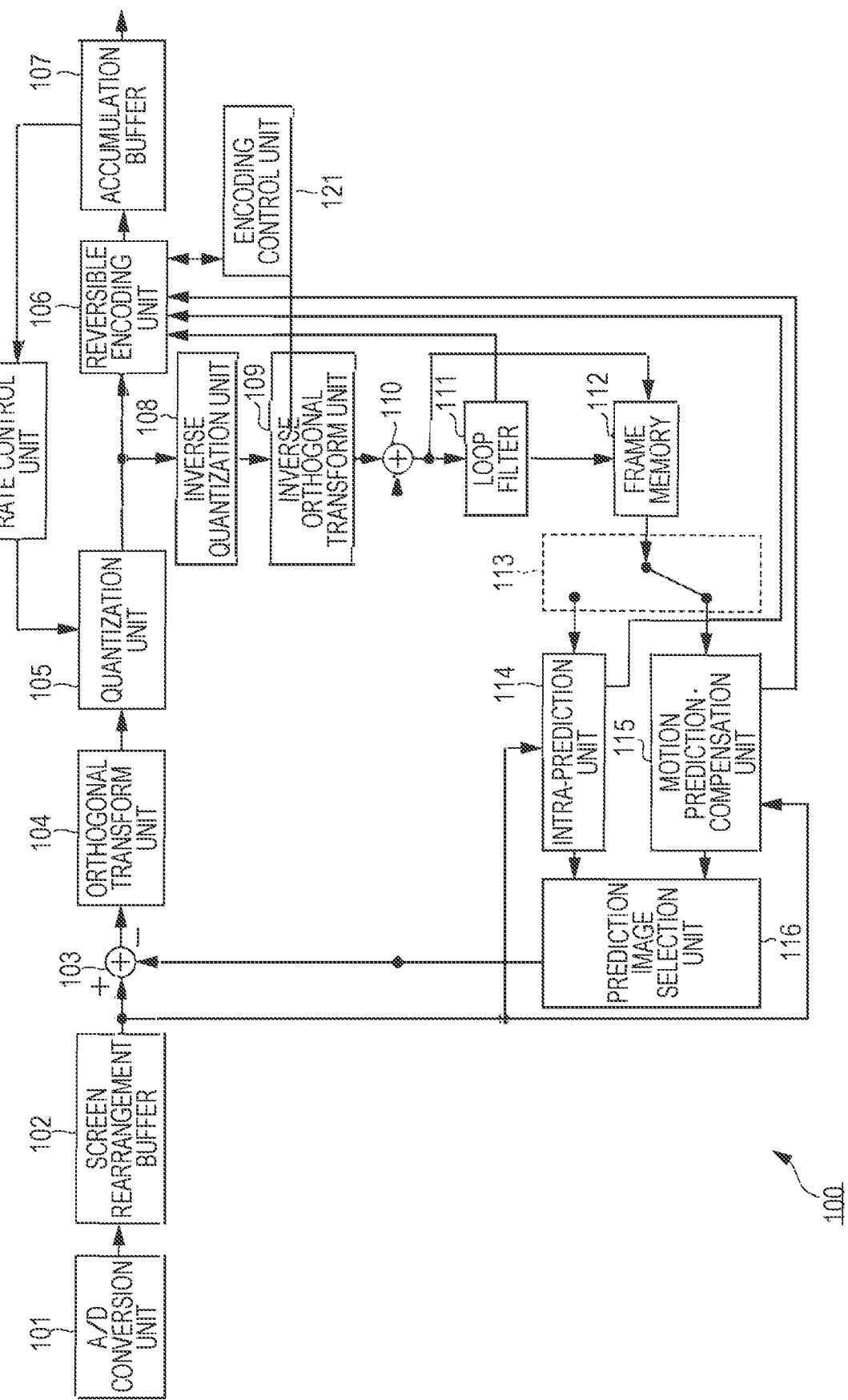
FIG. 1 is a block diagram showing a main configuration example of an image encoding device.

FIG. 1 is a block diagram showing a main configuration example of an image encoding device.

An image encoding device 100 shown in FIG. 1 encodes image data using a prediction process, as an encoding method of H.264/Moving Picture Experts Group (MPEG) 4 Part 10 (Advanced Video Coding (AVC)).

The image encoding device 100 shown in FIG. 1 includes an A/D conversion unit 101, a screen rearrangement buffer 102, a calculation unit 103, an orthogonal transform unit 104, a quantization unit 105, a reversible encoding unit 106, and an accumulation buffer 107. The image encoding device 100 further includes an inverse quantization unit 108, an inverse orthogonal transform unit 109, a calculation unit 110, a loop filter 111, a frame memory 112, a selection unit 113, an intra-prediction unit 114, a motion prediction•compensation unit 115, a prediction image selection unit 116, and a rate control unit 117.

The image encoding device 100 further includes an encoding control unit 121.

The A/D conversion unit 101 performs A/D conversion of input image data, supplies image data after conversion (digital data) to the screen rearrangement buffer 102, and stores the image data therein. The screen rearrangement buffer 102 rearranges the image of frames in a stored display order, to an order of frames for encoding, in accordance with group of pictures (GOP), and supplies the image with the changed order of frames to the calculation unit 103. In addition, the screen rearrangement buffer 102 also supplies the image with the changed order of frames to the intra-prediction unit 114 and the motion prediction•compensation unit 115.

The calculation unit 103 subtracts a prediction image supplied from the intra-prediction unit 114 or the motion prediction•compensation unit 115 through the prediction image selection unit 116, from the image read out from the screen rearrangement buffer 102, and outputs the difference information thereof to the orthogonal transform unit 104.

For example, in a case of the image to be subjected to inter-encoding, the calculation unit 103 subtracts the prediction image supplied from the motion prediction•compensation unit 115, from the image read out from the screen rearrangement buffer 102.

The orthogonal transform unit 104 performs orthogonal transform such as discrete cosine transform or Karhunen-Loeve transform, with respect to the difference information supplied from the calculation unit 103. In addition, a method of this orthogonal transform is arbitrary. The orthogonal transform unit 104 supplies a transform coefficient obtained by the orthogonal transform to the quantization unit 105.

The quantization unit 105 quantizes the transform coefficient supplied from the orthogonal transform unit 104. The quantization unit 105 sets a quantization parameter based on information relating to a target value of a coding rate supplied from the rate control unit 117, and performs quantization thereof. In addition, a method of the quantization thereof is arbitrary. The quantization unit 105 supplies the quantized transform coefficient to the reversible encoding unit 106.

The reversible encoding unit 106 encodes the transform coefficient quantized in the quantization unit 105 by an arbitrary encoding method. Since the transform coefficient is quantized under the control of the rate control unit 117, the coding rate thereof is a target value set by the rate control unit 117 (or approximately a target value).

In addition, the reversible encoding unit 106 acquires information showing a mode of intra-prediction or the like from the intra-prediction unit 114, and acquires information showing a mode of inter-prediction, motion vector information, or the like from the motion prediction•compensation unit 115. Further, the reversible encoding unit 106 acquires a filter coefficient or the like used in the loop filter 111.

The reversible encoding unit 106 encodes the various information items by an arbitrary encoding method, and sets (multiplexes) the information items as some header information of encoded data. The reversible encoding unit 106 supplies the encoded data obtained by encoding to the accumulation buffer 107 and accumulates the encoded data therein.

As the encoding method of the reversible encoding unit 106, variable length encoding, arithmetic encoding, or the like is used, for example. As the variable length encoding, Context-Adaptive Variable Length Coding (CAVLC) obtained based on the H.264/AVC method is used, for example. As the arithmetic encoding, Context-Adaptive Binary Arithmetic Coding (CABAC) is used, for example.

The accumulation buffer 107 temporarily holds the encoded data supplied from the reversible encoding unit 106. The accumulation buffer 107 outputs the held encoded data to a recording apparatus (recording medium) or a transmission path on a rear stage (not shown), for example, at a predetermined timing.

In addition, the transform coefficient quantized in the quantization unit 105 is also supplied to the inverse quantization unit 108. The inverse quantization unit 108 performs inverse quantization of the quantized transform coefficient by a method corresponding to the quantization by the quantization unit 105. This inverse quantization method may be any method as long as it is a method corresponding to the quantization process performed by the quantization unit 105. The inverse quantization unit 108 supplies the obtained transform coefficient to the inverse orthogonal transform unit 109.

The inverse orthogonal transform unit 109 performs inverse orthogonal transform of the transform coefficient supplied from the inverse quantization unit 108 by a method corresponding to the orthogonal transform process performed by the orthogonal transform unit 104. This inverse orthogonal transform method may be any method as long as it is a method corresponding to the orthogonal transform process performed by the orthogonal transform unit 104. Output which is subjected to the inverse orthogonal transform (restored difference information) is supplied to the calculation unit 110.

The calculation unit 110 adds the prediction image supplied from the intra-prediction unit 114 or the motion prediction•compensation unit 115 through the prediction image selection unit 116, to the inverse orthogonal transform result supplied from the inverse orthogonal transform unit 109, that is, the restored difference information, and obtains an image which is locally decoded (decoded image). The decoded image is supplied to the loop filter 111 or the frame memory 112.

The loop filter 111 includes a deblock filter, an adaptive loop filter, or the like, and performs a suitable filter process with respect to the decoded image supplied from the calculation unit 110. For example, the loop filter 111 removes block distortion of the decoded image by performing a deblock filter process with respect to the decoded image. In addition, for example, the loop filter 111 performs image quality improvement by performing a loop filter process using Wiener Filter with respect to a deblock filter process result thereof (decoded image in which the block distortion is removed).

In addition, the loop filter 111 may perform an arbitrary filter process with respect to the decoded image. Further, the loop filter 111 can also be configured to supply information such as a filter coefficient used for the filter process to the reversible encoding unit 106 if necessary and to encode the information.

The loop filter 111 supplies the filter process result (decoded image after the filter process) to the frame memory 112. In addition, as described above, the decoded image output from the calculation unit 110 can be supplied to the frame memory 112 without using the loop filter 111. That is, the filter process performed by the loop filter 111 can be omitted.

The frame memory 112 stores the supplied decoded image, and supplies the stored decoded image to the selection unit 113 as a reference image, at a predetermined timing.

The selection unit 113 selects a supply destination of the reference image supplied from the frame memory 112. For example, in a case of the inter-prediction, the selection unit 113 supplies the reference image supplied from the frame memory 112 to the motion prediction•compensation unit 115.

The intra-prediction unit 114 performs intra-prediction (in-screen prediction) of generating a prediction image basically using a prediction unit (PU) as a process unit, by using a pixel value in a picture to be processed which is the reference image supplied from the frame memory 112 through the selection unit 113. The intra-prediction unit 114 performs this intra-prediction in a plurality of modes (intra-prediction modes) which are prepared in advance.

The intra-prediction unit 114 generates the prediction images in all intra-prediction modes which are candidates, evaluates a cost function value of each prediction image using the input image supplied from the screen rearrangement buffer 102, and selects the optimal mode. If the optimal intra-prediction mode is selected, the intra-prediction unit 114 supplies the prediction image generated in this optimal mode to the prediction image selection unit 116.

In addition, as described above, the intra-prediction unit 114 suitably supplies intra-prediction mode information or the like which shows the employed intra-prediction mode to the reversible encoding unit 106 to cause the information or the like to be encoded.

The motion prediction•compensation unit 115 performs motion prediction (inter-prediction) basically using the PU as the process unit, by using the input image supplied from the screen rearrangement buffer 102 and the reference image supplied from the frame memory 112 through the selection unit 113, performs a motion compensation process based on detected motion vector, and generates the prediction image (inter-prediction image information). The motion prediction•compensation unit 115 performs such inter-prediction in a plurality of modes (inter-prediction modes) which are previously prepared.

The motion prediction•compensation unit 115 generates the prediction images in all of the inter-prediction modes which are candidates, evaluates a cost function value of each prediction image, and selects the optimal mode. If the optimal inter-prediction mode is selected, the motion prediction•compensation unit 115 supplies the prediction image generated in that optimal mode to the prediction image selection unit 116.

In addition, when decoding the information showing the employed inter-prediction mode or the encoded data, the motion prediction•compensation unit 115 supplies the information or the like which is necessary for performing the process in this inter-prediction mode to the reversible encoding unit 106 to cause the information or the like to be encoded.

The prediction image selection unit 116 selects a supply source of the prediction image to be supplied to the calculation unit 103 or the calculation unit 110. For example, in a case of the inter-encoding, the prediction image selection unit 116 selects the motion prediction•compensation unit 115 as the supply source of the prediction image, and supplies the prediction image supplied from the motion prediction•compensation unit 115 to the calculation unit 103 or the calculation unit 110.

The rate control unit 117 controls a rate of a quantization operation of the quantization unit 105 based on a coding rate of encoded data accumulated in the accumulation buffer 107, so as not to generate overflow or underflow.

The encoding control unit 121 controls the encoding process of the reversible encoding unit 106. At that time, the encoding control unit 121 performs determination of whether or not the encoding is performed in the merge mode.

In addition, the encoding control unit 121 also performs the control of the encoding process in a mode other than the merge mode, for example, a skip mode, the intra-prediction mode, the inter-prediction mode, a direct mode, or the like.

The reversible encoding unit 106 performs a reversible encoding process in a mode selected by the encoding control unit 121.

[Coding Unit]

Meanwhile, in the AVC encoding method, the macro blocks or sub-macro blocks obtained by dividing the macro block into a plurality of blocks, are used as process units of the prediction process or the encoding process. However, setting a macro block size of 16 pixels×16 pixels is not optimal with respect to a large frame of Ultra High Definition (UHD; 4000 pixels×2000 pixels) which may be a target of a next-generation encoding method.

Herein, currently, for further improvement of the encoding efficiency by AVC, standardization of an encoding method called High Efficiency Video Coding (HEVC) is in progress by Joint Collaboration Team—Video Coding (JCTVC) which is a joint standardization organization of International Telecommunication Union Telecommunication Standardization Sector (ITU-T) and International Organization for Standardization (ISO)/International Electrotechnical Commission (IEC).

Figure 2:
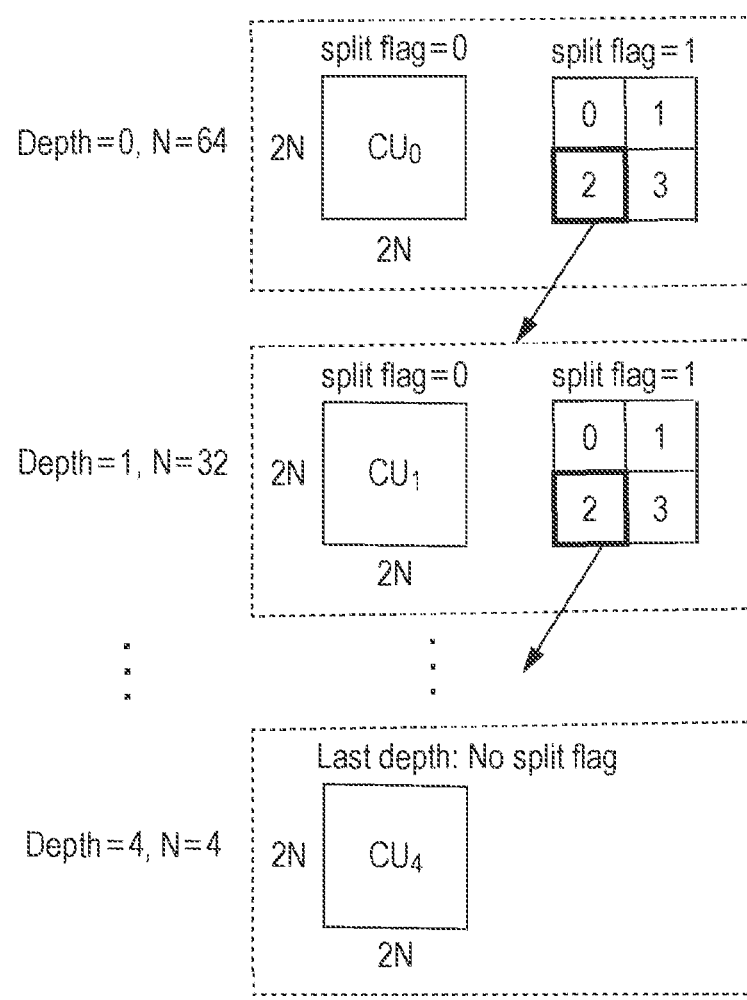
FIG. 2 is a diagram illustrating a coding unit.

In the AVC, a hierarchical layer structure with the macro blocks and the sub-macro blocks is defined, but in the HEVC, the coding unit (CU) is defined as shown in FIG. 2.

The CU is also called a coding tree block (CTB), and is a partial region of the image of a picture unit, which plays the same role as the macro block of the AVC. While the size in the later method is fixed to the size of 16×16 pixels, the size in the former method is not fixed and is designated in image compression information in respective sequences.

For example, in a sequence parameter set (SPS) included in the encoded data to be output, a maximum size of the CU (largest coding unit (LCU)) and a minimum size thereof (smallest coding unit (SCU)) are defined.

In each LCU, by setting split-flag to be 1 in a range which is not less than the size of the SCU, it is possible to divide the CU into the CUs having a smaller size. In the example of FIG. 2, the size of the LCU is 128 and a maximum hierarchical layer depth is 5. The CU having a size of 2N×2N is divided into a CU having a size of N×N which is in a hierarchical layer which is one level lower than that of the CU having a size of 2N×2N, at the time when a value of split_flag is "1".

Figure 3:
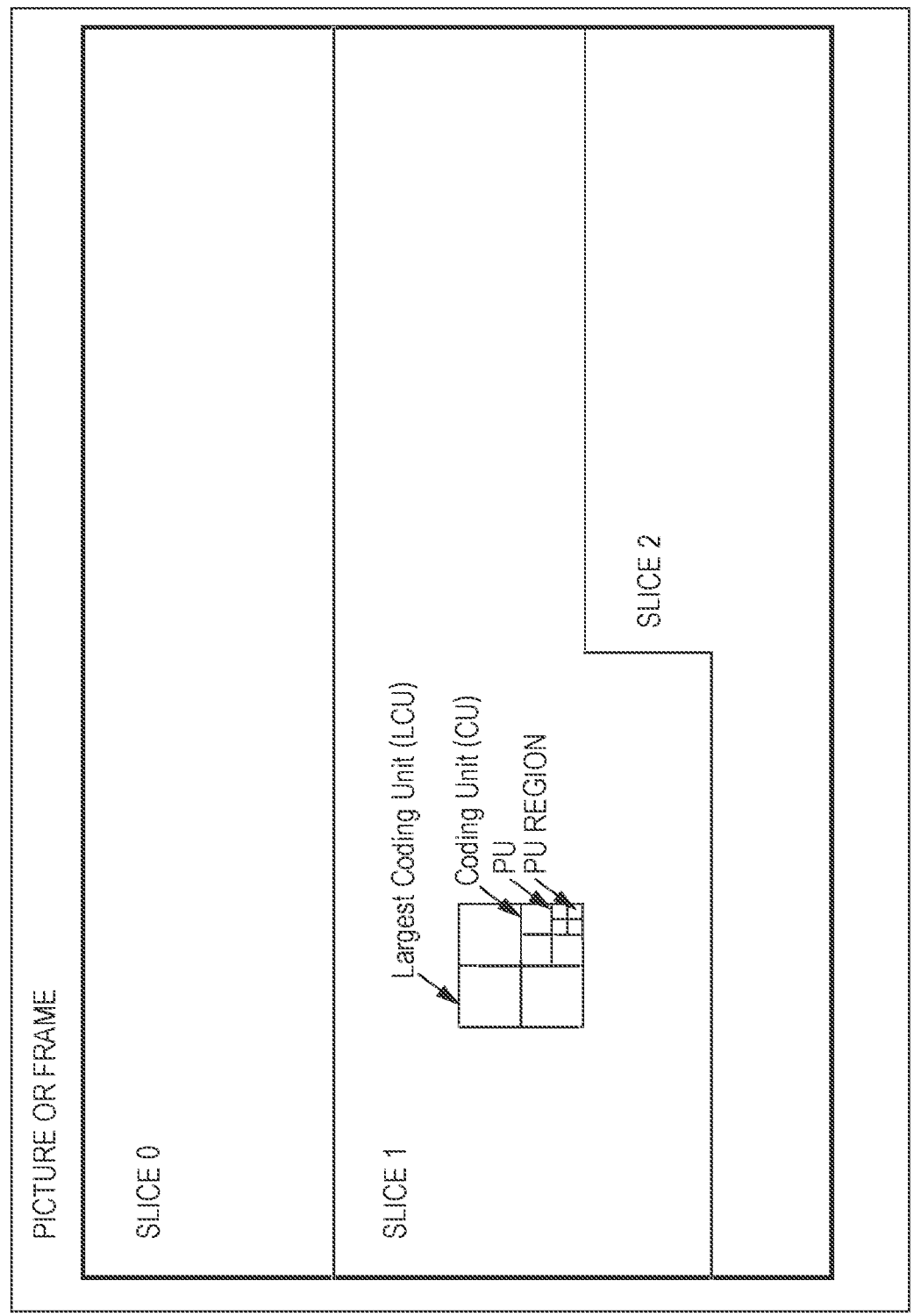
FIG. 3 is a diagram illustrating a relationship between slices and coding units.

In addition, as shown in FIG. 3, the CU is divided into prediction units (PU), each of which is a region (partial region of the image of the picture unit) to be a process unit of the intra- or inter-prediction, and further divided into transform units (TU), each of which is a region (partial region of the image of the picture unit) to be a process unit of the orthogonal transform. Currently, in the HEVC, in addition to 4×4 and 8×8, it is possible to use the orthogonal transform of 16×16 and 32×32.

As in the HEVC described above, in a case of the encoding method in which the CU is defined and various processes are performed with the CU as a unit, it can be considered that the macro block of the AVC corresponds to the LCU. However, since the CU has the hierarchical layer structure as shown in FIG. 2, it is general to set the size of the LCU in the highest hierarchical layer, larger than the macro block of the AVC, for example, as 128×128 pixels.

The present technology can also be applied to the encoding method using the CU, the PU, and the TU, instead of the macro blocks. That is, the process unit for performing the prediction process may be an arbitrary region. That is, in the following description, not only the macro blocks or the sub-macro blocks, but also the CU, the PU, and the TU are included in a region to be processed of the prediction process (also referred to as a corresponding region or a target region) or a peripheral region which is a region located on the periphery of the corresponding region.

[Merge of Motion Partition]

Figure 4:
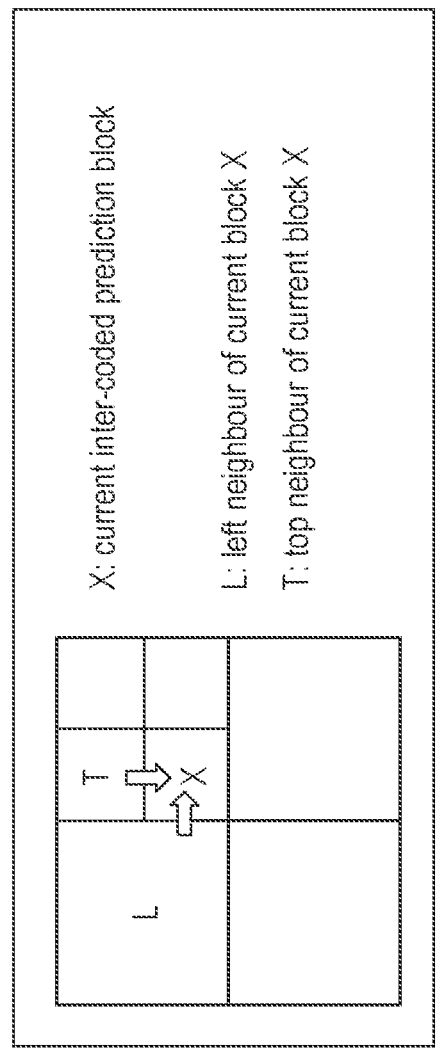
FIG. 4 is a diagram illustrating a merge mode.

Meanwhile, there is proposed a method (merge mode) called Motion Partition Merging as shown in FIG. 4, as one of the encoding methods of the motion information. In this method, two flags which are Merge_Flag and Merge_Left_Flag are transmitted as merge information which is information relating to the merge mode.

Merge_Flag=1 shows that motion information of the corresponding region X is the same as motion information of peripheral region T adjacent to the upper portion of the corresponding region or a peripheral region L adjacent to the left portion of the corresponding region. At that time, merge information includes Merge_Left_Flag and is transmitted. Merge_Flag=0 shows that the motion information of the corresponding region X is different from the motion information of both the peripheral region T and the peripheral region L. In this case, the motion information of the corresponding region X is transmitted.

In a case where the motion information of the corresponding region X is the same as the motion information of the peripheral region L, Merge_Flag=1 and Merge_Left_Flag=1. In a case where the motion information of the corresponding region X is the same as the motion information of the peripheral region T, Merge_Flag=1 and Merge_Left_Flag=0.

[Reversible Encoding Unit and Encoding Control Unit]

Figure 5:
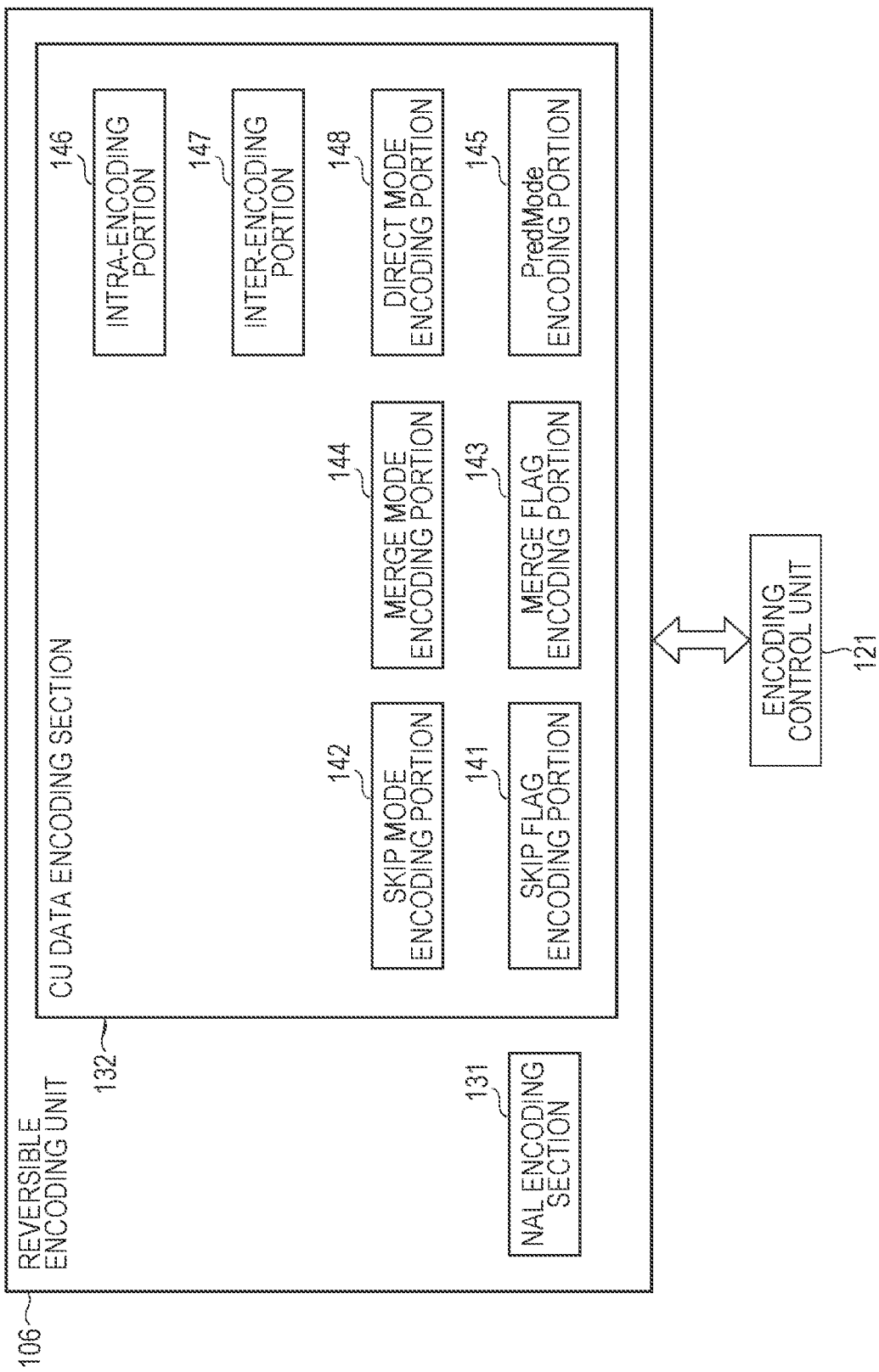
FIG. 5 is a block diagram showing a main configuration example of a reversible encoding unit and an encoding control unit.

FIG. 5 is a block diagram showing a main configuration example of the reversible encoding unit 106 and the encoding control unit 121.

As shown in FIG. 5, the reversible encoding unit 106 includes a network abstraction layer (NAL) encoding unit 131 and a CU data encoding unit 132.

The NAL encoding unit 131 encodes data of NAL such as the sequence parameter set (SPS), a picture parameter set (PPS), and the slice header. The CU data encoding unit 132 encodes data in the hierarchical layer lower than the CU (video coding layer (VCL)).

The CU data encoding unit 132 includes a skip flag encoding unit 141, a skip mode encoding unit 142, a merge flag encoding unit 143, and a merge mode encoding unit 144. The CU data encoding unit 132 further includes a PredMode encoding unit 145, an intra-encoding unit 146, an inter-encoding unit 147, and a direct mode encoding unit 148.

The skip flag encoding unit 141 generates a skip flag showing whether or not to employ the skip mode and performs encoding, in accordance with the control of the encoding control unit 121. The skip mode encoding unit 142 performs an encoding process in the skip mode, in accordance with the control of the encoding control unit 121.

The merge flag encoding unit 143 generates and encodes MergeFlag showing whether or not to employ the merge mode, in accordance with the control of the encoding control unit 121. The merge mode encoding unit 144 performs an encoding process in the merge mode, in accordance with the control of the encoding control unit 121.

The PredMode encoding unit 145 encodes PredMode which is a parameter showing the prediction mode, in accordance with the control of the encoding control unit 121. The intra-encoding unit 146 performs a process relating to encoding of a difference image generated using the intra-prediction, in accordance with the control of the encoding control unit 121. The inter-encoding unit 147 performs a process relating to encoding of a difference image generated using the inter-prediction, in accordance with the control of the encoding control unit 121. The direct mode encoding unit 148 performs a process relating to encoding of a difference image generated using the direct mode, in accordance with the control of the encoding control unit 121.

[Flow of Encoding Process]

Next, a flow of each process performed by the image encoding device 100 described above will be described. First, an example of a flow of the encoding process will be described with reference to a flowchart of FIG. 6.

In Step S101, the A/D conversion unit 101 performs A/D conversion of the input image. In Step S102, the screen rearrangement buffer 102 stores the A/D-converted image, and performs rearrangement from the order displaying each picture, to the order to be encoded.

In Step S103, the intra-prediction unit 114 performs the intra-prediction process in the intra-prediction mode. In Step S104, the motion prediction•compensation unit 115 performs an inter-motion prediction process of performing motion prediction or motion compensation in the inter-prediction mode.

In Step S105, the prediction image selection unit 116 determines the optimal mode, based on each cost function value output from the intra-prediction unit 114 and the motion prediction•compensation unit 115. That is, the prediction image selection unit 116 selects any one of the prediction image generated by the intra-prediction unit 114 and the prediction image generated by the motion prediction•compensation unit 115.

In Step S106, the calculation unit 103 calculates a difference between the image rearranged by the process of Step S102 and the prediction image selected by the process of Step S105. A data volume of the difference data is reduced compared to that of the original image data. Accordingly, it is possible to compress the data volume, compared to the case of encoding the image as it is.

In Step S107, the orthogonal transform unit 104 performs orthogonal transform of difference information generated by the process of Step S106. In detail, the orthogonal transform such as discrete cosine transform or Karhunen-Loeve transform is performed, and the transform coefficient is output.

In Step S108, the quantization unit 105 quantizes the transform coefficient obtained by the process of Step S107.

The difference information quantized by the process of Step S108 is locally decoded as follows. That is, in Step S109, the inverse quantization unit 108 inversely quantizes the transform coefficient (also referred to as a quantized coefficient) generated and quantized by the process of Step S108, with a property corresponding to the property of the quantization unit 105. In Step S110, the inverse orthogonal transform unit 109 performs inverse orthogonal transform of the transform coefficient obtained by the process of Step S107 with a property corresponding to the property of the orthogonal transform unit 104, locally decodes the difference information, and supplies the difference information to the calculation unit 110.

In Step S111, the calculation unit 110 adds the prediction image to the locally-decoded difference information, and generates a locally-decoded image (image corresponding to input to the calculation unit 103). In Step S112, the loop filter 111 suitably performs the loop filter process including the deblock filter process or an adaptive loop filter process, with respect to the locally-decoded image obtained by the process of Step S111.

In Step S113, the frame memory 112 stores the decoded image which is subjected to the loop filter process by the process of Step S112. In addition, an image which is not subjected to the filter process by the loop filter 111 is also supplied to the frame memory 112 from the calculation unit 110 and is stored therein.

In Step S114, the reversible encoding unit 106 encodes the transform coefficient (quantized coefficient) quantized by the process of Step S108. That is, reversible encoding such as variable length encoding or arithmetic encoding is performed with respect to the difference image.

In addition, the reversible encoding unit 106 encodes a quantized parameter calculated in Step S108 and adds (includes) the quantized parameter to encoded data. In addition, the reversible encoding unit 106 encodes information relating to the prediction mode of the prediction image selected by the process of Step S105, and adds the information to the encoded data which is obtained by encoding the difference image. That is, the reversible encoding unit 106 also encodes optimal intra-prediction mode information supplied from the intra-prediction unit 114, information based on the optimal intra-prediction mode information supplied from the motion prediction•compensation unit 115, or the like, and adds the information to the encoded data.

In Step S115, the accumulation buffer 107 accumulates the encoded data obtained by the process of Step S114. The encoded data accumulated in the accumulation buffer 107 is suitably read out, and is transmitted to a decoding side through a transmission path or a recording medium.

In Step S116, the rate control unit 117 controls the rate of the quantization operation of the quantization unit 105 based on the coding rate (generated coding rate) of the encoded data accumulated in the accumulation buffer 107 by the process of Step S115, so as not to generate overflow or underflow.

When the process of Step S116 ends, the encoding process ends.

In addition, in Step S114, the reversible encoding unit 106 performs the encoding process in accordance with the control of the encoding control unit 121.

[Flow of Reversible Encoding Process]

Figure 6:
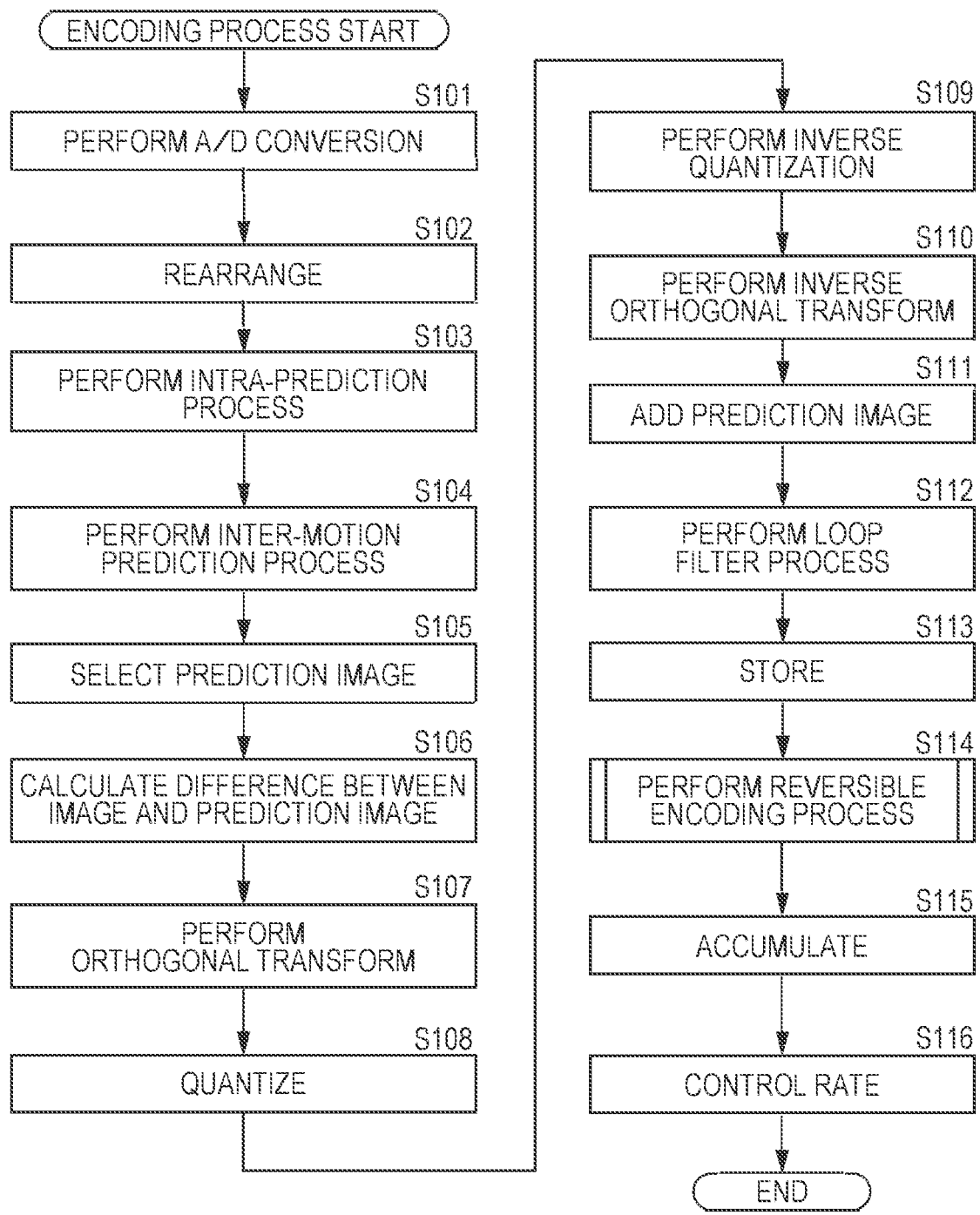
FIG. 6 is a flowchart illustrating an example of a flow of an encoding process.
Figure 7:
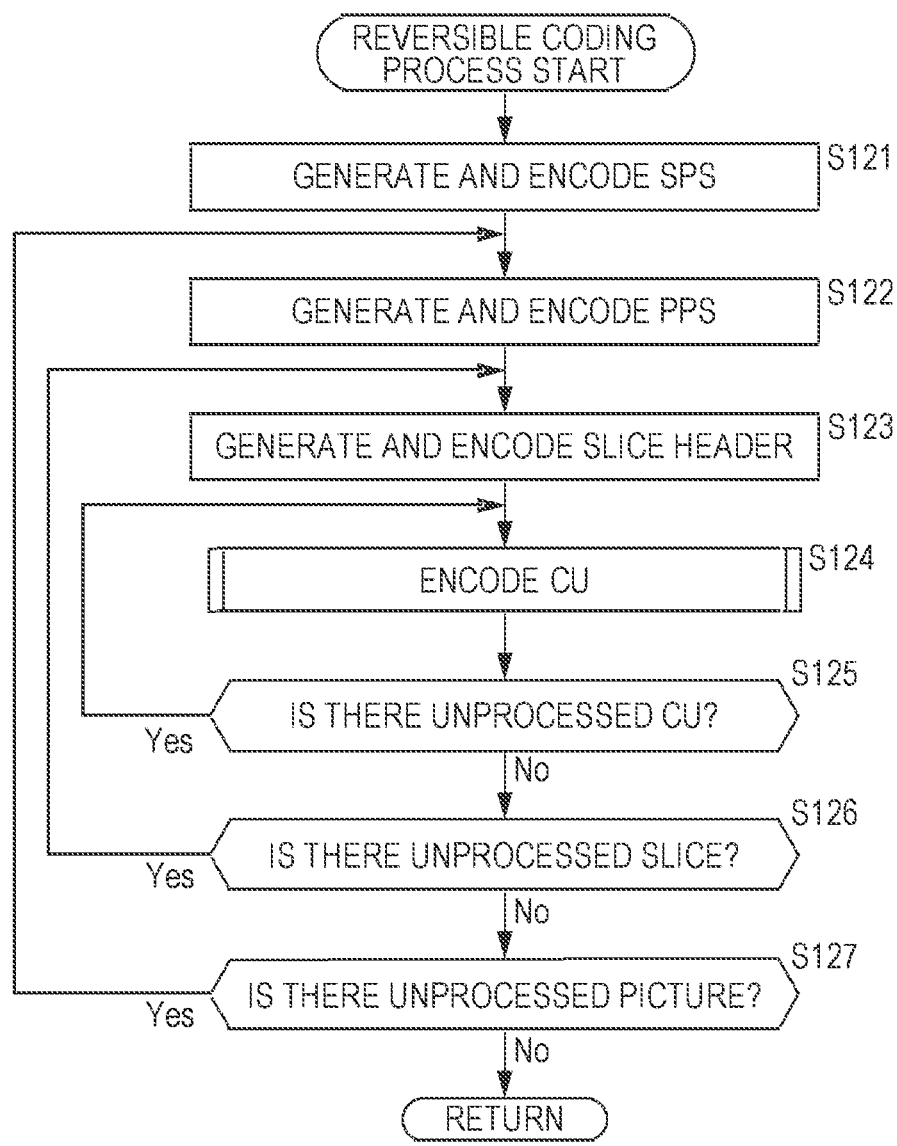
FIG. 7 is a flowchart illustrating an example of a flow of a reversible encoding process.

Next, an example of a flow of the reversible encoding process performed in Step S114 of FIG. 6 will be described with reference to a flowchart of FIG. 7. As shown in FIG. 7, the reversible encoding process is performed for each hierarchical layer of the image.

That is, the NAL encoding unit 131 generates and encodes the SPS in Step S121, generates and encodes the PPS in Step S122, and generates and encodes the slice header in Step S123. In Step S124, the CU data encoding unit 132 encodes a corresponding CU which is a process target.

The CU data encoding unit 132 repeats the process of Step S124 for all of the CUs in a corresponding slice which is a process target. In Step S125, in a case where it is determined that no unprocessed CU exists in the corresponding slice, the CU data encoding unit 132 allows the process to proceed to Step S126.

The NAL encoding unit 131 repeats the processes from Step S123 to Step S125 for all of the slices in a corresponding picture which is a process target. In Step S126, in a case where it is determined that no unprocessed slice exists in the corresponding picture, the NAL encoding unit 131 allows the process to proceed to Step S127.

The NAL encoding unit 131 repeats the processes from Step S122 to Step S126 for all of the pictures in a corresponding sequence which is a process target. In Step S127, in a case where it is determined that no unprocessed picture exists in the corresponding sequence, the NAL encoding unit 131 allows the reversible encoding process to end, and the process returns to FIG. 6.

[Flow of CU Encoding Process]

Next, an example of a flow of the CU encoding process performed in Step S124 of FIG. 7 will be described with reference to flowcharts of FIG. 8 and FIG. 9.

When the CU encoding process starts, in Step S131, the encoding control unit 121 determines a type of the corresponding slice from NAL data generated by the NAL encoding unit 131, and determines whether or not the corresponding slice is an I slice. Only in a case where the corresponding slice is not the I slice (is P slice or B slice), the skip flag encoding unit 141 generates the skip flag and encodes the skip flag in Step S132.

In a case where the encoding control unit 121 determines that a value of the skip flag is 1 in Step S133, the skip mode encoding unit 142 which has acquired the determination result thereof from the encoding control unit 121 encodes the CU data in the skip mode in Step S134. When the encoding ends, the CU encoding process ends, and the process returns to FIG. 7.

Figure 8:
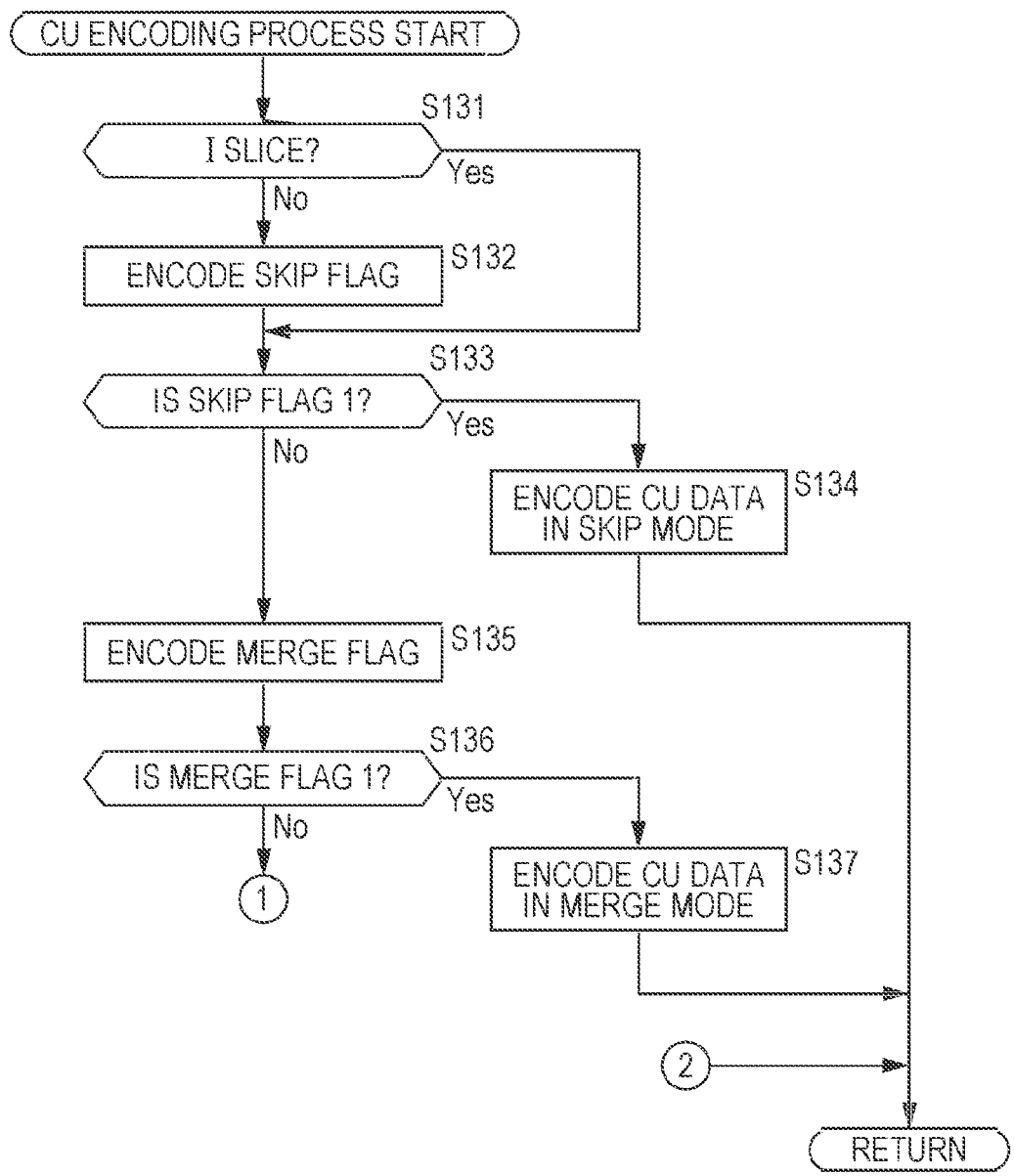
FIG. 8 is a flowchart illustrating an example of a flow of a CU encoding process.

In addition, in Step S133 of FIG. 8, in a case where the encoding control unit 121 determined that the value of the skip flag is 0 or no skip flag exists, the encoding control unit 121 allows the process to proceed to Step S135. In this case, the encoding in the skip mode is not performed.

The merge flag encoding unit 143 generates and encodes the merge flag in Step S135.

In a case where the encoding control unit 121 determined that a value of the merge flag is 1 in Step S136, the merge mode encoding unit 144 which acquired the determination result thereof from the encoding control unit 121 encodes the CU data in the merge mode in Step S137. When the encoding ends, the CU encoding process ends, and the process returns to FIG. 7.

Figure 9:
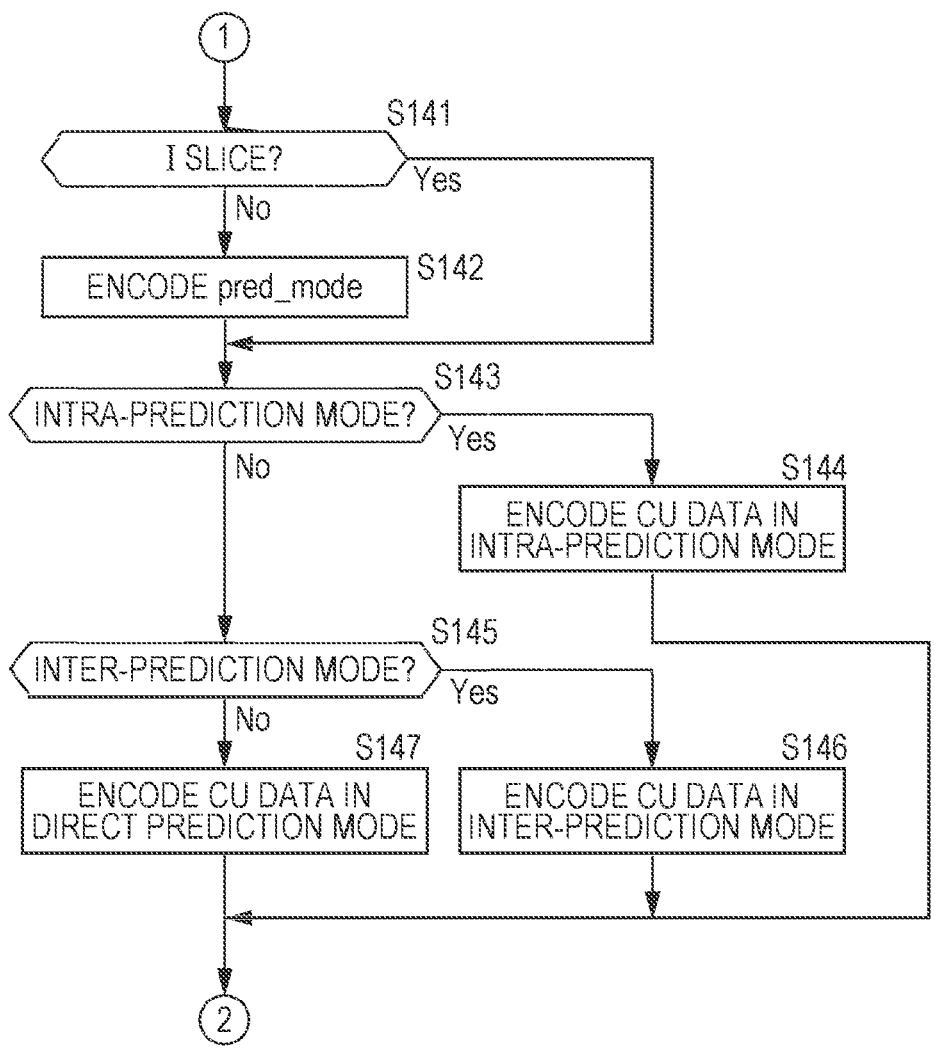
FIG. 9 is a flowchart, subsequent to FIG. 8, illustrating an example of a flow of a CU encoding process.

In addition, in Step S136 of FIG. 8, in a case where the encoding control unit 121 determined that the value of the merge flag is 0 or no merge flag exists, the process proceeds to the flowchart of FIG. 9 and the encoding based on the employed prediction mode is performed.

That is, only in a case where the encoding control unit 121 determined that the corresponding slice which is a process target is not the I slice in Step S141 of FIG. 9, the PredMode encoding unit 145 generates and encodes pred_mode which is a parameter showing a type of the prediction mode of the corresponding slice, in Step S142.

In a case where the encoding control unit 121 determined that the prediction mode of a corresponding region is the intra-prediction mode, with reference to PredMode in Step S143, the intra-encoding unit 146 encodes the CU data in the intra-prediction mode in Step S144. That is, the difference image information (quantized coefficient), the information relating to the intra-prediction mode, or the like is encoded. When the encoding ends, the CU encoding process ends, and the process returns to FIG. 7.

In addition, in a case where the encoding control unit 121 determined that the prediction mode of a corresponding region is the inter-prediction mode, not the intra-prediction mode (Step S143 and Step S145), the inter-encoding unit 147 encodes the CU data in the inter-prediction mode in Step S146. That is, the difference image information (quantized coefficient), the information relating to the inter-prediction mode, or the like is encoded. When the encoding ends, the CU encoding process ends, and the process returns to FIG. 7.

In addition, in a case where the encoding control unit 121 determined that the prediction mode of a corresponding region is neither the intra-prediction mode nor the inter-prediction mode (Step S143 and Step S145), the direct mode encoding unit 148 encodes the CU data in the direct prediction mode in Step S147. When the encoding ends, the CU encoding process ends, and the process returns to FIG. 7.

[Image Decoding Device]

Figure 10:
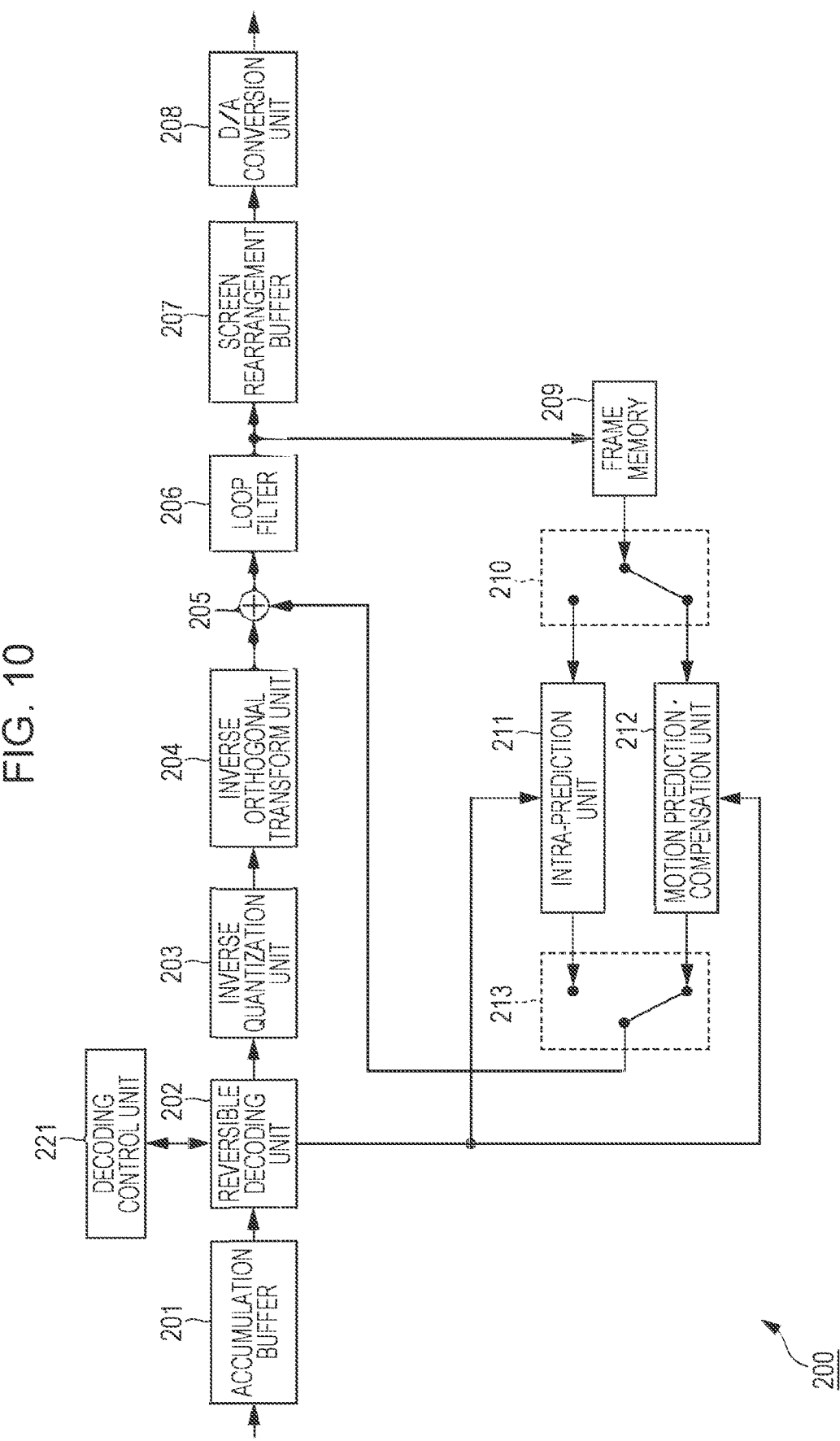
FIG. 10 is a block diagram showing a main configuration example of an image decoding device.

FIG. 10 is a block diagram showing a main configuration example of an image decoding device. An image decoding device 200 shown in FIG. 10 decodes the encoded data generated by the image encoding device 100 by a decoding method corresponding to the encoding method thereof. In addition, the image decoding device 200 performs the prediction process for each arbitrary region (for example, prediction unit (PU) or the like), in the same manner as that of the image encoding device 100.

As shown in FIG. 10, the image decoding device 200 includes an accumulation buffer 201, a reversible decoding unit 202, an inverse quantization unit 203, an inverse orthogonal transform unit 204, a calculation unit 205, a loop filter 206, a screen rearrangement buffer 207, and a D/A conversion unit 208. The image decoding device 200 further includes a frame memory 209, a selection unit 210, an intra-prediction unit 211, a motion prediction•compensation unit 212, and a selection unit 213.

The image decoding device 200 further includes a decoding control unit 221.

The accumulation buffer 201 accumulates the transmitted encoded data, and supplies the encoded data to the reversible decoding unit 202 at a predetermined timing. The reversible decoding unit 202 decodes the information which is supplied by the accumulation buffer 201 and is encoded by the reversible encoding unit 106 of FIG. 1, by a method corresponding to the encoding method of the reversible encoding unit 106. The reversible decoding unit 202 supplies the quantized coefficient of the difference image which is obtained by decoding, to the inverse quantization unit 203.

In addition, the reversible decoding unit 202 determines whether the intra-prediction mode is selected or the inter-prediction mode is selected for the optimal prediction mode, and supplies the information relating to the optimal prediction mode, to the unit with the mode which is determined as being selected, among the intra-prediction unit 211 and the motion prediction•compensation unit 212. That is, for example, in a case where the inter-prediction mode is selected as the optimal prediction mode in the image encoding device 100, the information relating to the optimal prediction mode is supplied to the motion prediction•compensation unit 212.

The inverse quantization unit 203 inversely quantizes the quantized coefficient obtained by decoding performed by the reversible decoding unit 202 by a method corresponding to the quantization method of the quantization unit 105 of FIG. 1, and supplies the obtained transform coefficient to the inverse orthogonal transform unit 204.

The inverse orthogonal transform unit 204 performs inverse orthogonal transform of the transform coefficient supplied from the inverse quantization unit 203 by a method corresponding to the orthogonal transform method of the orthogonal transform unit 104 of FIG. 1. By this inverse orthogonal transform process, the inverse orthogonal transform unit 204 obtains decoded residual data corresponding to residual data before being subjected to the orthogonal transform in the image encoding device 100 (same data as the locally-decoded difference information which is output by the inverse orthogonal transform unit 109 of the image encoding device 100).

The decoded residual data obtained by performing the inverse orthogonal transform is supplied to the calculation unit 205. In addition, the prediction image is supplied to the calculation unit 205 from the intra-prediction unit 211 or the motion prediction•compensation unit 212 through the selection unit 213.

The calculation unit 205 adds the decoded residual data and the prediction image, and obtains decoded image data corresponding to the image data before the subtraction of the prediction image performed by the calculation unit 103 of the image encoding device 100. The calculation unit 205 supplies the decoded image data to the loop filter 206.

The loop filter 206 suitably performs the loop filter process including the deblock filter process or the adaptive loop filter process, with respect to the supplied decoded image, and supplies that to the screen rearrangement buffer 207.

The loop filter 206 includes a deblock filter, an adaptive loop filter, or the like, and performs a suitable filter process with respect to the decoded image supplied from the calculation unit 205. For example, the loop filter 206 removes block distortion of the decoded image by performing a deblock filter process with respect to the decoded image. In addition, for example, the loop filter 206 performs image quality improvement by performing a loop filter process using Wiener Filter with respect to a deblock filter process result thereof (decoded image in which the block distortion is removed).

In addition, the loop filter 206 may perform an arbitrary filter process with respect to the decoded image. Further, the loop filter 206 may perform the filter process by using the filter coefficient supplied from the image encoding device 100 of FIG. 1.

The loop filter 206 supplies the filter process result (decoded image after the filter process) to the screen rearrangement buffer 207 and the frame memory 209. In addition, the decoded image output from the calculation unit 205 can be supplied to the screen rearrangement buffer 207 or the frame memory 209 without using the loop filter 206. That is, the filter process performed by the loop filter 206 can be omitted.

The screen rearrangement buffer 207 performs rearrangement of the image. That is, the order of the frames rearranged for the order of the encoding by the screen rearrangement buffer 102 of FIG. 1, is rearranged to the order of the original display. The D/A conversion unit 208 performs D/A conversion of the image supplied from the screen rearrangement buffer 207, outputs to and displays the image on a display (not shown).

The frame memory 209 stores the supplied decoded image, and supplies the stored decoded image as a reference image to the selection unit 210, at a predetermined timing or based on external requests of the intra-prediction unit 211 or the motion prediction•compensation unit 212.

The selection unit 210 selects a supply destination of the reference image supplied from the frame memory 209. In a case of decoding the image which is subjected to the intra-encoding, the selection unit 210 supplies the reference image supplied from the frame memory 209 to the intra-prediction unit 211. In addition, in a case of decoding the image which is subjected to the inter-encoding, the selection unit 210 supplies the reference image supplied from the frame memory 209 to the motion prediction•compensation unit 212.

Information or the like showing the intra-prediction mode obtained by decoding the header information included in the encoded data, is suitably supplied to the intra-prediction unit 211 from the reversible decoding unit 202. The intra-prediction unit 211 performs the intra-prediction using the reference image obtained from the frame memory 209, in the intra-prediction mode used in the intra-prediction unit 114 of FIG. 1, and generates the prediction image. The intra-prediction unit 211 supplies the generated prediction image to the selection unit 213.

The motion prediction•compensation unit 212 acquires information which is obtained by decoding the header information (optimal prediction mode information, difference information, a code number of the prediction motion vector information, and the like) from the reversible decoding unit 202.

The motion prediction•compensation unit 212 performs inter-prediction using the reference image acquired from the frame memory 209, in the inter-prediction mode used in the motion prediction•compensation unit 115 of FIG. 1, and generates the prediction image.

The decoding control unit 221 controls the decoding process of the reversible decoding unit 202. Since the reversible decoding unit 202 basically performs the decoding process by a method corresponding to the reversible encoding unit 106 of FIG. 1, a control method of the decoding control unit 221 is basically the same as the control method of the encoding control unit 121 of FIG. 1. As the same control method is used in an encoding side and the decoding side, the decoding control unit 221 can select a decoding method corresponding to the encoding method selected by the encoding control unit 121, and can control so that the decoding process is properly performed.

That is, the decoding control unit 221 performs determination of whether or not the decoding is performed in the merge mode.

In addition, the decoding control unit 221 also performs the control of the decoding process in a mode other than the merge mode, for example, the skip mode, the intra-prediction mode, the inter-prediction mode, the direct mode, or the like.

The reversible decoding unit 202 performs a reversible decoding process in a mode selected by the decoding control unit 221.

[Reversible Decoding Unit and Decoding Control Unit]

Figure 11:
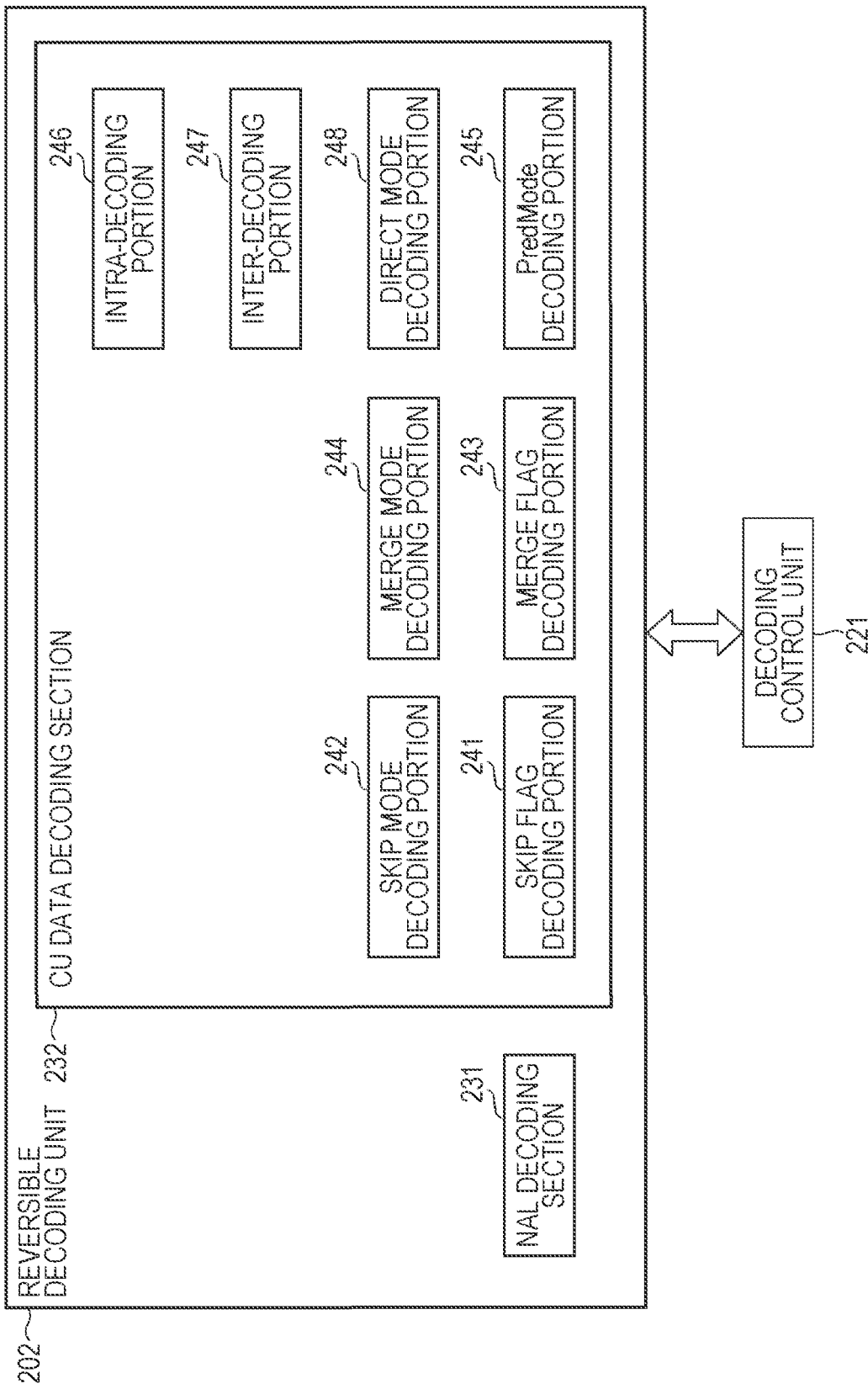
FIG. 11 is a block diagram showing a main configuration example of a reversible decoding unit and a decoding control unit.

FIG. 11 is a block diagram showing a main configuration example of the reversible decoding unit 202 and the decoding control unit 221.

As shown in FIG. 11, the reversible decoding unit 202 includes a NAL decoding unit 231 and a CU data decoding unit 232.

The NAL decoding unit 231 decodes the encoded data of NAL such as the sequence parameter set, the picture parameter set, the slice header, and the like. The CU data decoding unit 232 decodes the encoded data in the hierarchical layer lower than the CU.

The CU data decoding unit 232 includes a skip flag decoding unit 241, a skip mode decoding unit 242, a merge flag decoding unit 243, and a merge mode decoding unit 244. The CU data decoding unit 232 further includes a PredMode decoding unit 245, an intra-decoding unit 246, an inter-decoding unit 247, and a direct mode decoding unit 248.

The skip flag decoding unit 241 decodes a skip flag, in accordance with the control of the decoding control unit 221. The skip mode decoding unit 242 performs a decoding process in the skip mode, in accordance with the control of the decoding control unit 221.

The merge flag decoding unit 243 decodes a merge flag (MergeFlag), in accordance with the control of the decoding control unit 221. The merge mode decoding unit 244 performs a decoding process in the merge mode, in accordance with the control of the decoding control unit 221.

The PredMode decoding unit 245 decodes PredMode, in accordance with the control of the decoding control unit 221. The intra-decoding unit 246 performs a process relating to the decoding of the encoded data of the difference image generated by using the intra-prediction, in accordance with the control of the decoding control unit 221. The inter-decoding unit 247 performs a process relating to the decoding of the encoded data of the difference image generated by using the inter-prediction, in accordance with the control of the decoding control unit 221. The direct mode decoding unit 248 performs a process relating to the decoding of the encoded data of the difference image generated by using the direct mode, in accordance with the control of the decoding control unit 221.

[Flow of Decoding Process]

Next, a flow of each process performed by the image decoding device 200 described above will be described. First, an example of the flow of the decoding process will be described with reference to a flowchart of FIG. 12.

If the decoding process starts, in Step S201, the accumulation buffer 201 accumulates the transmitted encoded data (encoded stream). In Step S202, the reversible decoding unit 202 decodes the encoded data supplied from the accumulation buffer 201. That is, an I picture, a P picture, and, a B picture which are encoded by the reversible encoding unit 106 of FIG. 1 are decoded. In addition, the various information items other than the difference image information included in the encoded data such as the difference motion information, the code number of the prediction motion vector information, the merge information, and the like, are also decoded.

In Step S203, the inverse quantization unit 203 inversely quantizes the quantized transform coefficient (quantized coefficient) which is obtained by the process of Step S202. In Step S204, the inverse orthogonal transform unit 204 performs inverse orthogonal transform of the transform coefficient which is inversely quantized in Step S203.

In Step S205, the intra-prediction unit 211 or the motion prediction•compensation unit 212 performs the prediction process using the supplied information. In Step S206, the selection unit 213 selects the prediction image generated in Step S205. In Step S207, the calculation unit 205 adds the prediction information selected in Step S206, to the difference information obtained by performing the inverse orthogonal transform in Step S204. Accordingly, the decoded image is obtained.

In Step S208, the loop filter 206 suitably performs the loop filter process including the deblock filter process or an adaptive loop filter process, with respect to the decoded image obtained in Step S207.

In Step S209, the screen rearrangement buffer 207 performs rearrangement of the image subjected to the filter process in Step S208. That is, the order of the frames rearranged for the encoding by the screen rearrangement buffer 102 of the image encoding device 100, is rearranged to the order of the original display.

In Step S210, the D/A conversion unit 208 performs D/A conversion of the image in which the order of the frames is rearranged in Step S209. This image is output to a display (not shown) and the image is displayed.

In Step S211, the frame memory 209 stores the image subjected to the filter process in Step S208. This image is used for generating the prediction image (prediction process), as a reference image in Step S205.

When the process of Step S211 ends, the decoding process ends.

[Flow of Reversible Decoding Process]

Figure 12:
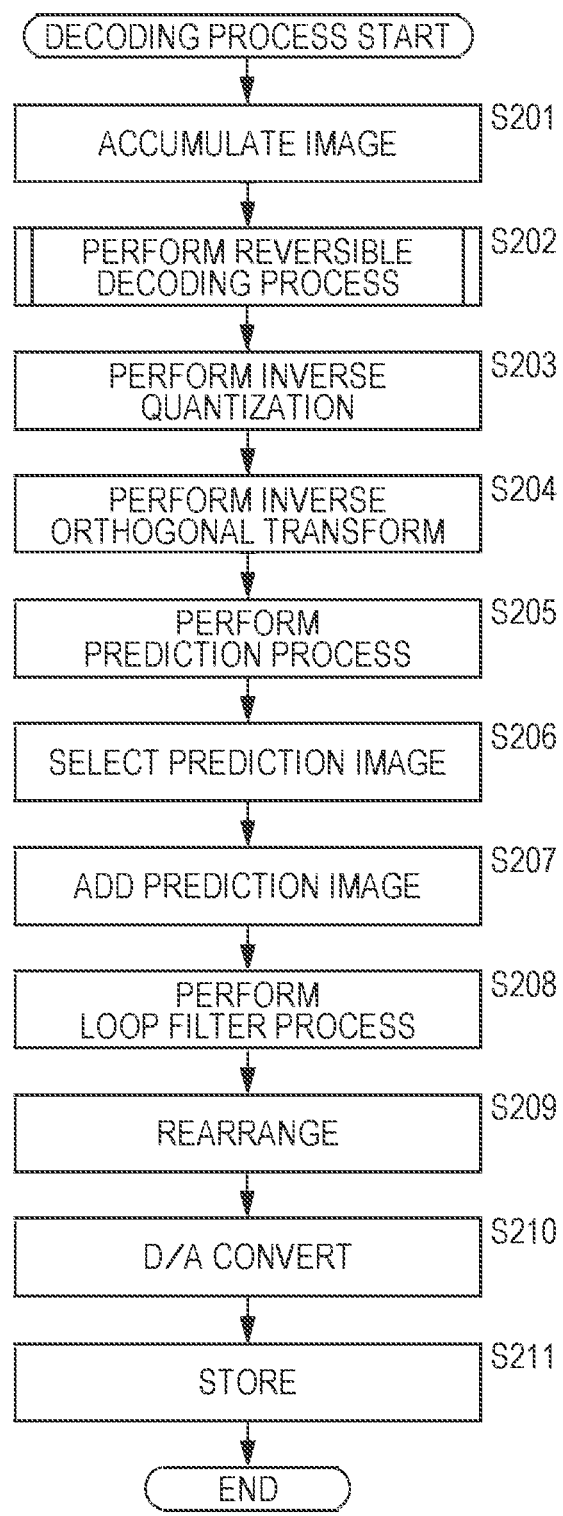
FIG. 12 is a flowchart illustrating an example of a flow of a decoding process.
Figure 13:
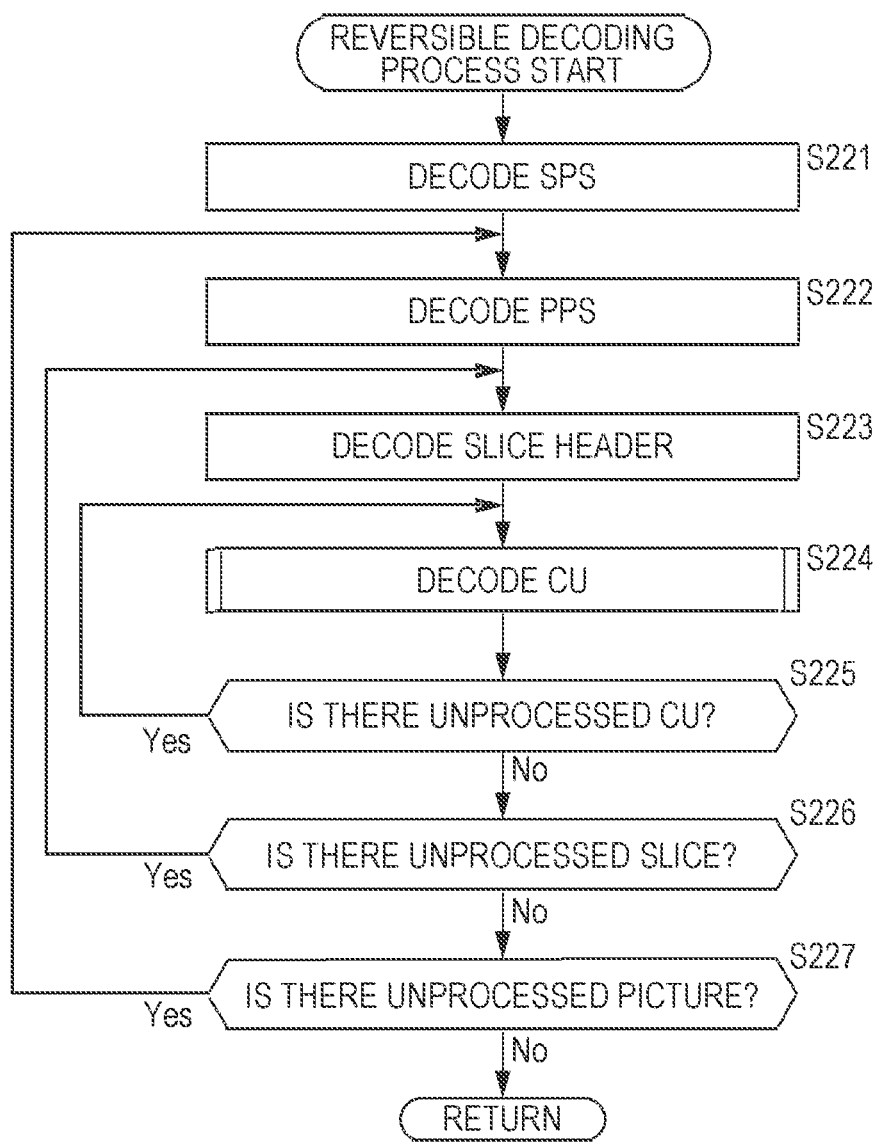
FIG. 13 is a flowchart illustrating an example of a flow of a reversible decoding process.

Next, an example of the flow of the reversible decoding process performed in Step S202 of FIG. 12 will be described with reference to a flowchart of FIG. 13.

This reversible decoding process is performed for each hierarchical layer of the image, in the same manner as in the case of the reversible encoding process.

That is, the NAL decoding unit 231 decodes the encoded data of the SPS in Step S221, decodes the encoded data of the PPS in Step S222, and decodes the encoded data of the slice header in Step S223. In Step S224, the CU data decoding unit 232 decodes the corresponding CU which is a process target.

The CU data decoding unit 232 repeats the process of Step S224 for all of the CUs in a corresponding slice which is a process target. In Step S225, in a case where it is determined that no unprocessed CU exists in the corresponding slice, the CU data decoding unit 232 allows the process to proceed to step 226.

The NAL decoding unit 231 repeats the processes from Step S223 to Step S225 for all of the slices in a corresponding picture which is a process target. In Step S226, in a case where it is determined that no unprocessed slice exists in the corresponding picture, the NAL decoding unit 231 allows the process to proceed to Step S227.

The NAL decoding unit 231 repeats the processes from Step S222 to Step S226 for all of the pictures in a corresponding sequence which is a process target. In Step S227, in a case where it is determined that no unprocessed picture exists in the corresponding sequence, the NAL decoding unit 231 allows the reversible decoding process to end, and the process returns to FIG. 12.

[CU Decoding Process]

Figure 14:
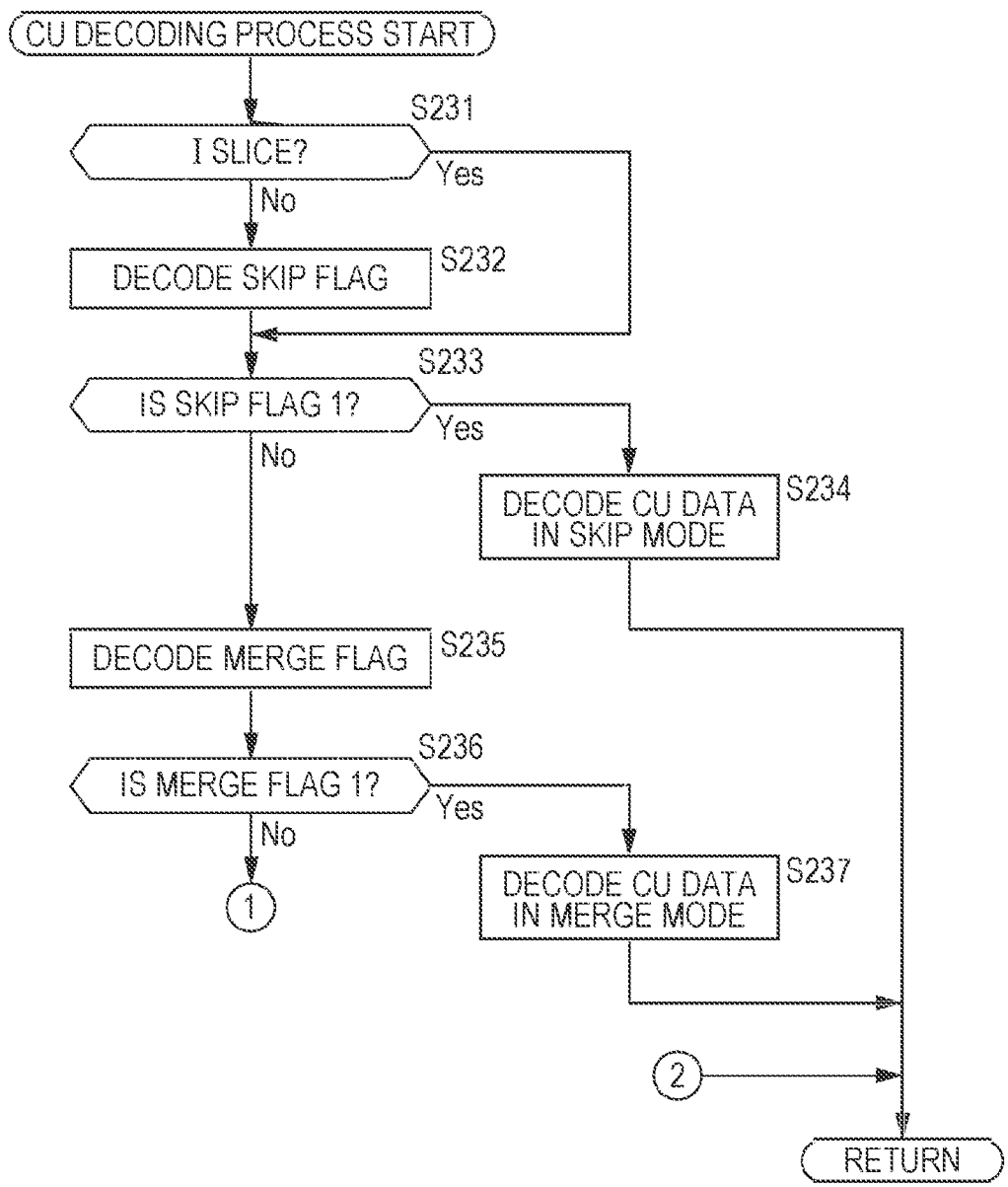
FIG. 14 is a flowchart illustrating an example of a flow of a CU decoding process.

Next, an example of a flow of the CU decoding process performed in Step S224 of FIG. 13 will be described with reference to flowcharts of FIG. 14 and FIG. 15. When the CU decoding process starts, in Step S231, the decoding control unit 221 determines a type of the corresponding slice from NAL data decoded by the NAL decoding unit 231, and determines whether or not the corresponding slice is the I slice.

In a case where the corresponding slice is not the I slice (is P slice or B slice), the skip flag decoding unit 241 decodes the skip flag and in Step S232. In a case where it is determined that the corresponding slice is the I slice, the skip flag is not encoded, and thus this process is omitted.

In a case where the decoding control unit 221 determines that the skip flag exists and the value thereof is 1 in Step S233, the skip mode decoding unit 242 decodes the CU data in the skip ode in Step S234. When the CU data is decoded, the skip mode decoding unit 242 allows the Cu decoding process to end, and the process returns to FIG. 13.

In a case where the decoding control unit 221 determined that no skip flag exists, or the value thereof is 0 in Step S233, the merge flag decoding unit 243 decodes the merge flag in Step S235.

In a case where the decoding control unit 221 determined that the merge flag exists and the value thereof is 1 in Step S236, the merge mode decoding unit 244 decodes the CU data in the merge mode in Step S237. When the CU data is decoded, the merge mode decoding unit 244 allows the CU decoding process to end, and the process returns to FIG. 13.

Figure 15:
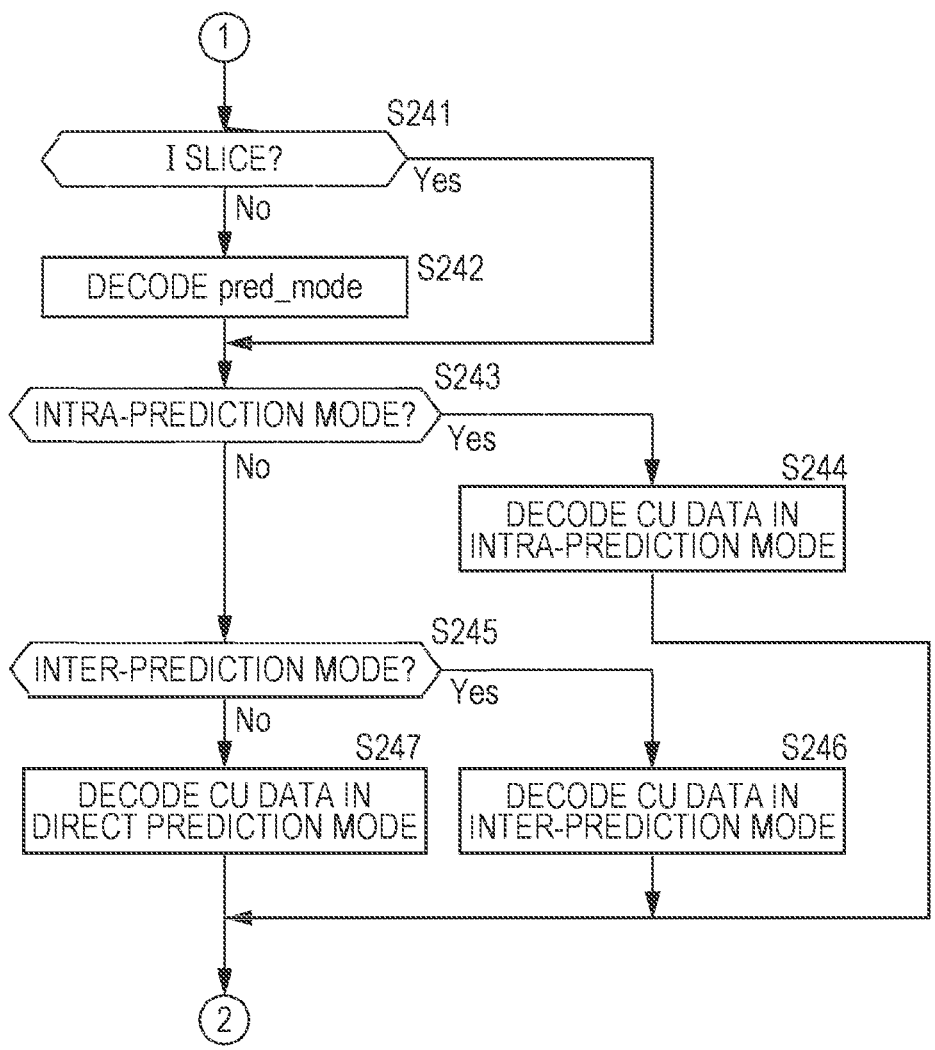
FIG. 15 is a flowchart, subsequent to FIG. 14, illustrating an example of a flow of a CU decoding process.

In a case where the decoding control unit 221 determined that no merge flag exists or the value thereof is 0 in Step S238, the process proceeds to FIG. 15.

In this case, the CU data is decoded by a method based on the prediction mode. That is, in a case where the decoding control unit 221 determined that the corresponding slice is not the I slice in Step S241 of FIG. 15, the PredMode decoding unit 245 decodes pred_mode (PredMode) in Step S242. In a case where it is determined that the corresponding slice is the I slice, pred_mode is not encoded, and thus the process thereof is omitted.

In a case where the decoding control unit 221 determined that the prediction mode of a corresponding region is the intra-prediction mode in Step S243, the intra-decoding unit 246 performs the decoding in the intra-prediction mode (decodes the Cu data encoded in the intra-prediction mode by an appropriate method) in Step S244. When the Cu data is decoded, the intra-decoding unit 246 allows the CU decoding process to end, and the process returns to FIG. 13.

In addition, in a case where the decoding control unit 221 determines that the prediction mode of the corresponding region is not the intra-prediction mode in Step S243 and determines that the prediction mode thereof is the inter-prediction mode in Step S245, the inter-decoding unit 247 performs the decoding in the inter-prediction mode (decodes the Cu data encoded in the inter-prediction mode by an appropriate method) in Step S246. When the CU data is decoded, the inter-decoding unit 247 allows the CU decoding process to end, and the process returns to FIG. 13.

In addition, in a case where the decoding control unit 221 determines that the prediction mode of the corresponding region is not the intra-prediction mode in Step S243 and determines that the prediction mode thereof is not the inter-prediction mode in Step S245, the direct mode decoding unit 248 performs the decoding in the direct prediction mode (decodes the CU data encoded in the direct prediction mode by an appropriate method) in Step S247. When the CU data is decoded, the direct mode decoding unit 248 allows the CU decoding process to end, and the process returns to FIG. 13.

Figure 16:
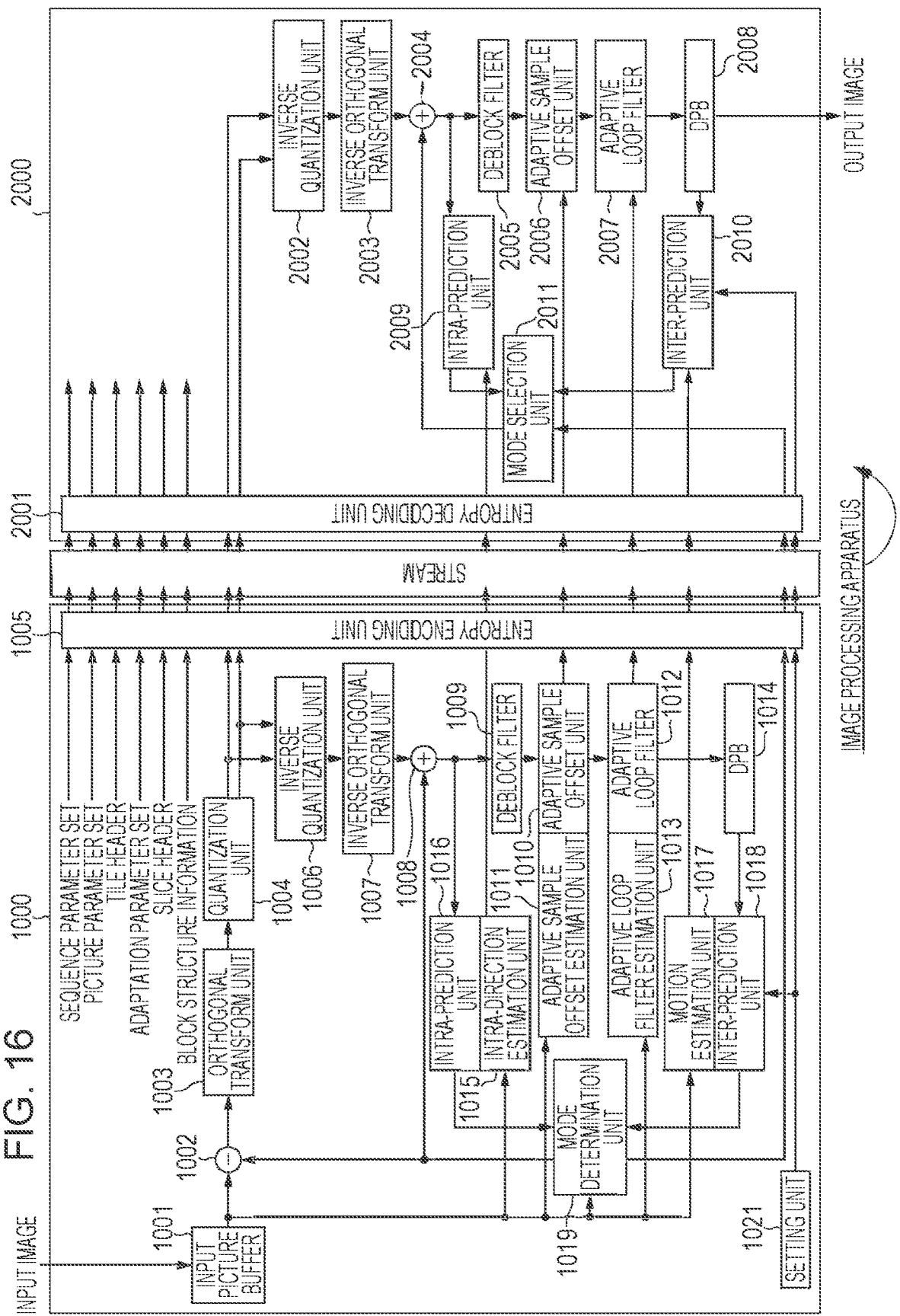
FIG. 16 is a block diagram showing a configuration example of one embodiment of an image processing apparatus to which the present technology is applied.

One Embodiment of Image Processing Apparatus to which the Present Technology is Applied FIG. 16 is a block diagram showing a configuration example of one embodiment of an image processing apparatus to which the present technology is applied.

In FIG. 16, the image processing apparatus includes an encoder 1000 and a decoder 2000. In addition, the encoder 1000 and the decoder 2000 can be mounted as separated blocks in one independent apparatus, or can be respectively mounted in separated independent apparatuses. Further, each of the encoder 1000 and the decoder 2000 can be configured as one independent apparatus.

The encoder 1000 is configured in the same manner as that of the image encoding device 100 of FIG. 1.

That is, in the encoder 1000, an input picture buffer 1001 corresponds to the screen rearrangement buffer 102 of FIG. 1, and a calculation unit 1002 corresponds to the calculation unit 103 of FIG. 1. An orthogonal transform unit 1003 corresponds to the orthogonal transform unit 104 of FIG. 1, and a quantization unit 1004 corresponds to the quantization unit 105 of FIG. 1. An entropy encoding unit 1005 corresponds to the reversible encoding unit 106 of FIG. 1, and an inverse quantization unit 1006 corresponds to the inverse quantization unit 108 of FIG. 1. An inverse orthogonal transform unit 1007 corresponds to the inverse orthogonal transform unit 109 of FIG. 1, and a calculation unit 1008 corresponds to the calculation unit 110 of FIG. 1. A deblock filter 1009, an adaptive sample offset unit 1010, an adaptive sample offset estimation unit 1011, an adaptive loop filter 1012, and an adaptive loop filter estimation unit 1013 correspond to the loop filter 111 of FIG. 1, and a decode picture buffer (DPB) 1014 corresponds to the frame memory 112 of FIG. 1. An intra-direction estimation unit 1015 and an intra-prediction unit 1016 correspond to the intra-prediction unit 114 of FIG. 1, and a motion estimation unit 1017 and an inter-prediction unit 1018 correspond to the motion prediction•compensation unit 115 of FIG. 1. A mode determination unit 1019 corresponds to the prediction image selection unit 116 of FIG. 1.

In addition, the encoder 1000 is different from the image encoding device 100 of FIG. 1, in that a setting unit 1021 is newly provided, the inter-prediction unit 1018 performs a process using information output by the setting unit 1021, and the information output by the setting unit 1021 is included in the encoded data, in the entropy encoding unit 1005.

In addition, in the encoder 1000 of FIG. 16, the blocks corresponding to the A/D conversion unit 101, the accumulation buffer 107, the rate control unit 117, and the encoding control unit 121 of FIG. 1 are omitted in the drawing.

The decoder 2000 is configured in the same manner as that of the image decoding device 200 of FIG. 10.

That is, in the decoder 2000, an entropy decoding unit 2001 corresponds to the reversible decoding unit 202 of FIG. 10, and an inverse quantization unit 2002 corresponds to the inverse quantization unit 203 of FIG. 10. An inverse orthogonal transform unit 2003 corresponds to the inverse orthogonal transform unit 204 of FIG. 10, and a calculation unit 2004 corresponds to the calculation unit 205 of FIG. 10.

A deblock filter 2005, an adaptive sample offset unit 2006, and an adaptive loop filter 2007 correspond to the loop filter 206 of FIG. 10, and a DPB 2008 corresponds to the frame memory 209 of FIG. 10. An intra-prediction unit 2009 corresponds to the intra-prediction unit 211 of FIG. 10, and an inter-prediction unit 2010 corresponds to the motion prediction•compensation unit 212 of FIG. 10. A mode selection unit 2011 corresponds to the selection unit 213 of FIG. 10.

In addition, the decoder 2000 is different from the image decoding device 200 of FIG. 10, in that the inter-prediction unit 2010 performs a process using information which is included in encoded data obtained by the encoder 1000 and is output by the setting unit 1021.

Further, in the decoder 2000 of FIG. 16, blocks corresponding to the accumulation buffer 201, the screen rearrangement buffer 207, the D/A conversion unit 208, and the decoding control unit 221 of FIG. 10 are omitted in the drawing.

In the image processing apparatus of FIG. 16 configured as described above, an image is encoded and encoded data (encoded stream) obtained as a result thereof is transmitted, in the encoder 1000, in the same manner as that of the image encoding device 100 of FIG. 1.

However, in the encoder 1000, the setting unit 1021 sets and outputs predetermined information. The information output by the setting unit 1021 (hereinafter, also referred to as setting information) is supplied to the inter-prediction unit 1018 and the entropy encoding unit 1005.

The inter-prediction unit 1018 generates a prediction image based on the setting information from the setting unit 1021. This prediction image is used for encoding (prediction encoding) of blocks of the image such as the CU, the PU, a PU partition, and the TU in the calculation unit 1002 to the entropy encoding unit 1005, if necessary.

In addition, the entropy encoding unit 1005 includes the setting information from the setting unit 1021 in the encoded data and transmits the setting information.

Meanwhile, the decoder 2000 receives the encoded data transmitted from the encoder 1000 and decodes the encoded data to an image, in the same manner as in the image decoding device 200 of FIG. 10.

However, in the decoder 2000, the entropy decoding unit 2001 separates the setting information from the encoded data and supplies the setting information to the inter-prediction unit 2010.

The inter-prediction unit 2010 generates the prediction image based on the setting information from the entropy decoding unit 2001. This prediction image is used for decoding blocks of the image subjected to the prediction encoding in the entropy decoding unit 2001 to the calculation unit 2004.

In the image processing apparatus of FIG. 16, identification information, restriction information, or the like is used, for example, for the setting information set by the setting unit 1021.

Hereinafter, the identification information and the restriction information will be described.

[Identification Information]

First, the identification information set in the setting unit 1021 will be described.

Herein, as described above, the merge mode is a technology of transmitting the flag (flag information), instead of the motion information (prediction direction, motion vector, or reference index) (without transmitting the motion information), and can improve encoding efficiency.

The merge mode can be used with respect to block units of both a CU unit and a PU unit, and a technology which will be described below can be applied to any merge modes performed with the block units of both the CU unit and the PU unit.

Now, a block (corresponding region) which is a target of the encoding in the encoder 1000 is referred to as a target block.

In the merge mode, candidates of a merge region which is a region to be merged with the target block (hereinafter, also referred to as merging candidates) are selected from a region (peripheral region) which is spatially and temporally close to the target block. Then, (the merging candidates to be) the merge region are selected from the merging candidates so as to increase the encoding efficiency, and merge_idx indicating the merge region thereof is included in the encoded stream (encoded data).

In addition, merge_idx is described as follows. merge_idx[x0][y0] specifies the merging candidate index of the merging candidate list where x0, y0 specify the location (x0,y0) of the top-left luma sample of the considered prediction block relative to the top-left luma sample of the picture.

merge_idx is information indicating the region to be the merge region (or motion information of the region thereof), which is used instead of Merge_Left_Flag described above. Merge_Left_Flag indicates the region at the left or upper location of the target block, but according to merge_idx, it is also possible to indicate regions at the other locations.

However, in motion compensation (MC) of the encoder 1000, if access to the DPB 1014 which stores the decoded image frequently occurs, a range of a memory bandwidth which is a transmission rate at which the decoded image is read out from the DPB 1014 is increased.

That is, as the prediction of the prediction image used in the MC, in a case of performing both L0 prediction and L1 prediction (hereinafter, also referred to as bidirectional prediction (bi-prediction)), instead of one prediction of L0 prediction and L1 prediction (hereinafter, also referred to as unidirectional prediction (uni-prediction)), or in a case where a block size of the target block is small, the range of the memory bandwidth is increased.

However, the cost of the encoder 1000 increases when attempting to secure a large range of the bandwidth (high rate), as the memory bandwidth. This also applies to the decoder 2000 including the DPB 2008, in the same manner.

Hereinabove, the maximum memory bandwidth necessary in the MC (hereinafter, also referred to as maximum necessary bandwidth) becomes a bottleneck in mounting of the encoder 1000 and the decoder 2000.

As a method of decreasing the range of the maximum necessary bandwidth, there is a method of prohibiting usage of a block having a small size, or a method of prohibiting usage of bidirectional prediction depending on the size of the block, for example. However, in a case where the usage of the bidirectional prediction is prohibited for the small blocks having a size smaller than the predetermined size, when all of the merging candidates were in the region to be subjected to the bidirectional prediction, the merging candidates to be the merge region cannot be selected for the blocks having a size smaller than the predetermined size, and as a result, the merge mode cannot be used and the encoding efficiency may be degraded.

Herein, in the encoder 1000, the maximum necessary bandwidth is suppressed by setting the identification information in the setting unit 1021 and performing the prediction (generation of the prediction image) in the inter-prediction unit 1018 based on the identification information.

Herein, the identification information is information for identifying a correspondence relationship between the size of the block of the image and change of the prediction method applied to the block, and as the identification information, any of first information, second information, and third information which will be described later can be employed, for example.

The first information which can be employed as the identification information is disable_bip_small_mrg_idc information (flag), and the disable_bip_small_mrg_idc information can have four values of 0, 1, 2, and 3.

FIG. 17 is a diagram illustrating the disable_bip_small_mrg_idc information. The disable_bip_small_mrg_idc information having each value indicates a size (block size) of a block (herein, for example, PU partition) in which the prediction method is changed, so as to apply the unidirectional prediction instead of the bidirectional prediction.

That is, the disable_bip_small_mrg_idc information having a value of 0, indicates that the prediction method of the merging candidates is not changed, regardless of the block size of the PU partition of the target block.

The disable_bip_small_mrg_idc information having a value of 1, indicates that the prediction method of the merging candidates to which the bidirectional prediction is applied, is changed (replaced) so that the unidirectional prediction is applied instead of the bidirectional prediction, in a case where a block size of the PU partition of the target block is 4×4 (the number of width×height pixels), and a process in the merge mode is performed.

Herein, the fact that the prediction method of the merging candidates to which the bidirectional prediction is applied is changed so that the unidirectional prediction is applied instead of the bidirectional prediction and the process in the merge mode is performed, means that the prediction method of the merging candidates to which the bidirectional prediction is applied is not changed to the unidirectional prediction in practice, but the prediction of the merging candidates is assumed to be performed in the unidirectional prediction, and the motion information regarding the unidirectional prediction is used for the process of the target block (PU partition thereof). Therefore, the prediction of (not a target block but) a merging candidate itself is performed by using a prediction method which is determined (selected) for the merging candidate without change.

In a case where the disable_bip_small_mrg_idc having a value of 1 is set, the prediction method of the merging candidate to which bidirectional prediction is applied is changed so that unidirectional prediction is applied instead of the bidirectional prediction, and the process in the merge mode is performed for the PU partition having a block size of 4×4.

Therefore, for example, in a case where the usage of bidirectional prediction is prohibited in the PU partition having a block size of 4×4, even if all merging candidates are regions which are bi-predicted, the bidirectional prediction is changed to the unidirectional prediction, and a process in the merge mode is performed.

As a result, it is possible to prevent encoding efficiency from degrading due to being incapable of using the merge mode in a case where the usage of bidirectional prediction is prohibited in a PU partition having a predetermined size or less.

Here, a loss of changing a prediction method of a merging candidate from the bidirectional prediction to the unidirectional prediction in the merge mode is smaller than a loss of being incapable of using the merge mode.

The disable_bip_small_mrg_idc information having a value of 2 indicates that in a case where a block size of a PU partition of a target block is any one of 4×4, 8×4, and 4×8, a prediction method of a merging candidate to which bidirectional prediction is applied is changed so that unidirectional prediction is applied instead of the bidirectional prediction, and a process in the merge mode is performed.

The disable_bip_small_mrg_idc information having a value of 3 indicates that in a case where a block size of a PU partition of a target block is any one of 4×4, 8×4, 4×8, and 8×8, a prediction method of a merging candidate to which bidirectional prediction is applied is changed so that unidirectional prediction is applied instead of the bidirectional prediction, and a process in the merge mode is performed.

Here, block sizes other than 4×4, 8×4, 4×8, and 8×8 described above can be employed as a block size of a PU partition in which a prediction method of a merging candidate is changed so that the unidirectional prediction is applied instead of the bidirectional prediction.

In addition, values taken by the disable_bip_small_mrg_idc information are not limited to the four values of 0 to 3.

Further, the bidirectional prediction is prediction of performing, for example, both L0 prediction and L1 prediction, and the unidirectional prediction which is applied to a merging candidate instead of the bidirectional prediction is any one of the L0 prediction and the L1 prediction as the bidirectional prediction.

In a case where the disable_bip_small_mrg_idc information as the first information is used, it is necessary to previously determine to set which one of the L0 prediction and the L1 prediction as the unidirectional prediction applied to a merging candidate instead of the bidirectional prediction, and to unify the prediction in the encoder 1000 and the decoder 2000.

Figure 18:
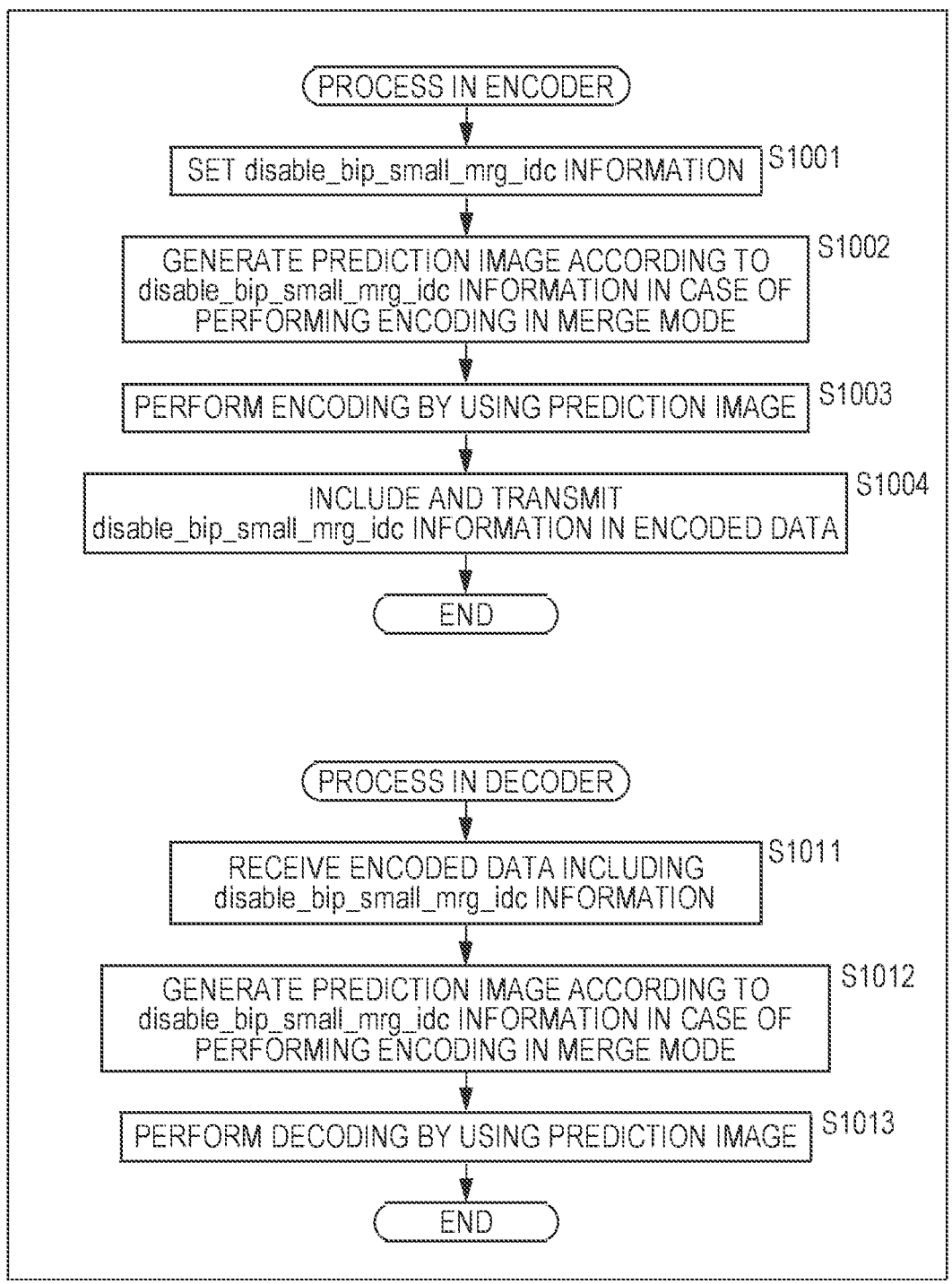
FIG. 18 is a flowchart illustrating a process of an encoder 1000 and a decoder 2000 in a case of using disable_bip_small_mrg_idc information.

FIG. 18 is a flowchart illustrating an outline of a process performed by the encoder 1000 and the decoder 2000 in a case where the disable_bip_small_mrg_idc information as the first embodiment is used.

In the encoder 1000, in Step S1001, the setting unit 1021 sets the disable_bip_small_mrg_idc information for a target block, for example, based on a maximum value of a memory bandwidth of the DPB 1014, and supplies the information to the inter-prediction unit 1018 and the entropy encoding unit 1005.

In Step S1002, the inter-prediction unit 1018 performs a process in the merge mode and further performs generation of a prediction image based on the disable_bip_small_mrg_idc information from the setting unit 1021. That is, in a case where a process (encoding) in the merge mode is performed, the inter-prediction unit 1018 generates a prediction image based on the disable_bip_small_mrg_idc information from the setting unit 1021.

In addition, the setting unit 1021 sets the disable_bip_small_mrg_idc information having a greater value as a maximum value of a memory bandwidth of the DPB 1014 becomes smaller. Accordingly, as a maximum value of a memory bandwidth of the DPB 1014 becomes smaller, a prediction method of a merging candidate of a PU partition is changed from the bidirectional prediction to the unidirectional prediction up to the PU partition having a greater block size, and a memory bandwidth when a decoded image is read out from the DPB 1014 for generation of a prediction image is suppressed.

As described above, a memory bandwidth when a decoded image is read out from the DPB 1014 is suppressed, and accordingly it is possible to prevent an increase in a cost of the encoder 1000.

In Step S1003, the calculation unit 1002 to the entropy encoding unit 1005 encode the target block by using the prediction image generated in Step S1002 as necessary.

In Step S1004, the entropy encoding unit 1005 includes (for example, multiplexes) the disable_bip_small_mrg_idc information from the setting unit 1021 in the encoded data, and transmits the information.

Further, the entropy encoding unit 1005 can include the disable_bip_small_mrg_idc information in, for example, a SPS, a PPS, an APS, or a slice header of the encoded data (encoded stream).

In contrast, in the decoder 2000, in Step S1011, the entropy decoding unit 2001 receives the encoded data including the disable_bip_small_mrg_idc information. In addition, the entropy decoding unit 2001 separates the disable_bip_small_mrg_idc information from the encoded data, and supplies the information to the inter-prediction unit 2010.

In Step S1012, the inter-prediction unit 2010 performs a process in the merge mode and further performs generation of a prediction image based on the disable_bip_small_mrg_idc information in the same manner as that of the inter-prediction unit 1018. That is, in a case where a process (encoding) in the merge mode is performed, the inter-prediction unit 2010 generates a prediction image based on the disable_bip_small_mrg_idc information from the entropy decoding unit 2001.

In addition, in Step S1013, the entropy decoding unit 2001 to the calculation unit 2004 decode the encoded data received in Step S1021 by using the prediction image generated in Step S1012 as necessary.

Further, in the encoder 1000, the setting unit 1021 can set the disable_bip_small_mrg_idc information in response to manipulation performed by a user such as an operator of the encoder 1000.

In addition, in the encoder 1000, by using a memory bandwidth of each value as a maximum necessary bandwidth, a profile or a level for regulating a process amount of the decoder can be defined according to the maximum necessary bandwidth at each value, and profile and level information (profile_idc and level_idc) can be included in the encoded data.

Here, profile_idc and level_idc are described as follows. profile_idc and level_idc indicate the profile and level to which the coded video sequence conforms.

Accordingly, profile_idc and level_idc have not been defined in detail yet, but, for example, profile_idc and level_idc can be defined so as to include information of a maximum necessary bandwidth in the MC.

For example, profile_idc and level_idc can be defined so as to include information such as a minimal value of a block size of a PU partition, whether or not bidirectional prediction is used, and a combination of a minimal value of a block size of a PU partition and whether or not bidirectional prediction is used.

In the setting unit 1021, for example, as described above, the disable_bip_small_mrg_idc information is set based on a maximum value of a memory bandwidth of the DPB 1014.

In addition, in the encoder 1000, use of a PU partition having a block size which is equal to or smaller than a predetermined size, or application of bidirectional prediction to the PU partition having a block size which is equal to or smaller than a predetermined size is prohibited, in accordance with profile_idc or level_idc.

However, for example, although the application of the bidirectional prediction is prohibited to a PU partition having a block size of 4×4, in a case where the disable_bip_small_mrg_idc information having a value of 1 is set, in the encoder 1000, for the PU partition of (block size of) 4×4, a prediction method of a merging candidate to which the bidirectional prediction is applied is changed so that the unidirectional prediction is applied instead of the bidirectional prediction, and a process in the merge mode is performed.

Accordingly, for the PU partition of 4×4 to which the application of the bidirectional prediction is prohibited, even if all merging candidates are regions which are bi-predicted, the bidirectional prediction is changed to the unidirectional prediction, and thus a process in the merge mode can be performed.

Also in the decoder 2000, a prediction method of a merging candidate to which the bidirectional prediction is applied is changed from the bidirectional prediction to the unidirectional prediction based on the disable_bip_small_mrg_idc information as necessary, in the same manner as in the encoder 1000.

Next, the second information which can be employed as the identification information will be described.

The second information which can be employed as the identification information is disable_bip_small_mrg_idc extension information which is obtained by extending the disable_bip_small_mrg_idc information which is the first information, and can take seven values including, for example, 0, 1, 2, 3, 4, 5, and 6.

FIG. 19 is a diagram illustrating the disable_bip_small_mrg_idc extension information.

The disable_bip_small_mrg_idc extension information at each value indicates a block size of a PU partition of which a prediction method is changed so that unidirectional prediction is applied instead of bidirectional prediction, and indicates a prediction direction of the unidirectional prediction which is applied instead of the bidirectional prediction, and semantics thereof are as follows.

That is, the disable_bip_small_mrg_idc extension information having a value of 0 indicates that a prediction method of a merging candidate is not changed regardless of a block size of a PU partition of a target block in the same manner as that of the disable_bip_small_mrg_idc information having a value of 0.

The disable_bip_small_mrg_idc extension information having a value of 1 or 2 all indicates that, in a case where a block size of a PU partition of a target block is 4×4, a prediction method of a merging candidate to which bidirectional prediction is applied is changed so that unidirectional prediction is applied instead of the bidirectional prediction, and a process in the merge mode is performed, in the same manner as that of the disable_bip_small_mrg_idc information having a value of 1.

In addition, the disable_bip_small_mrg_idc extension information having a value of 1 indicates that a prediction direction of the unidirectional prediction applied instead of the bidirectional prediction is, for example, L0 prediction of L0 prediction and L1 prediction. Further, the disable_bip_small_mrg_idc extension information having a value of 2 indicates that a prediction direction of the unidirectional prediction applied instead of the bidirectional prediction is, for example, L1 prediction of L0 prediction and L1 prediction.

The disable_bip_small_mrg_idc extension information having a value of 3 or 4 all indicates that in a case where a block size of a PU partition of a target block is any one of 4×4, 8×4, and 4×8, a prediction method of a merging candidate to which bidirectional prediction is applied is changed so that unidirectional prediction is applied thereto instead of the bidirectional prediction, and a process in the merge mode is performed, in the same manner as that of the disable_bip_small_mrg_idc information having a value of 2.

In addition, the disable_bip_small_mrg_idc extension information having a value of 3 indicates that a prediction direction of the unidirectional prediction applied instead of the bidirectional prediction is, for example, L0 prediction of L0 prediction and L1 prediction. Further, the disable_bip_small_mrg_idc extension information having a value of 4 indicates that a prediction direction of the unidirectional prediction applied instead of the bidirectional prediction is, for example, L1 prediction of L0 prediction and L1 prediction.

The disable_bip_small_mrg_idc extension information having a value of 5 or 6 all indicates that in a case where a block size of a PU partition of a target block is any one of 4×4, 8×4, 4×8, and 8×8, a prediction method of a merging candidate to which bidirectional prediction is applied is changed so that unidirectional prediction is applied instead of the bidirectional prediction, and a process in the merge mode is performed, in the same manner as the disable_bip_small_mrg_idc information having a value of 3.

In addition, the disable_bip_small_mrg_idc extension information having a value of 5 indicates that a prediction direction of the unidirectional prediction applied instead of the bidirectional prediction is, for example, L0 prediction of L0 prediction and L1 prediction. Further, the disable_bip_small_mrg_idc extension information having a value of 6 indicates that a prediction direction of the unidirectional prediction applied instead of the bidirectional prediction is, for example, L1 prediction of L0 prediction and L1 prediction.

The disable_bip_small_mrg_idc extension information as the second information indicates not only a block size of a PU partition of which a prediction method is changed so that the unidirectional prediction is applied instead of the bidirectional prediction but also a prediction direction of the unidirectional prediction applied instead of the bidirectional prediction, in the same manner as in the disable_bip_small_mrg_idc information as the first information, and thus it is not necessary to previously determine to set which one of the L0 prediction and the L1 prediction as the unidirectional prediction applied to a merging candidate instead of the bidirectional prediction, with the encoder 1000 and the decoder 2000.

A process of the encoder 1000 and the decoder 2000 of FIG. 16 when the disable_bip_small_mrg_idc extension information is used is the same as the process described in FIG. 18 except for using the disable_bip_small_mrg_idc extension information instead of the disable_bip_small_mrg_idc information, and thus the description thereof will be omitted.

Next, the third information which can be employed as the identification information will be described.

The third information which can be employed as the identification information is two information items including the disable_bip_small_mrg_idc information which is the first information, and modify_bip_small_mrg_I0 information.

Figure 20:
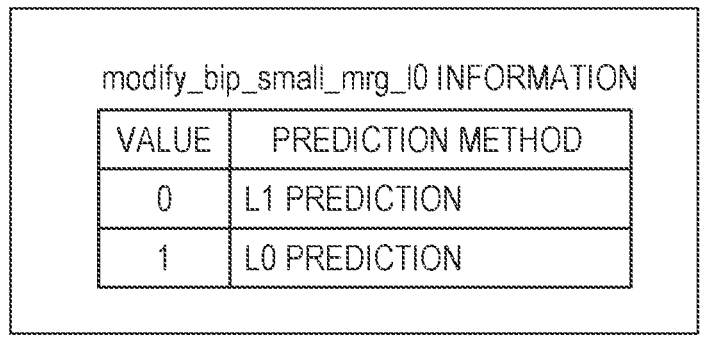
FIG. 20 is a diagram illustrating modify_bip_small_mrg_I0 information.

FIG. 20 is a diagram illustrating the modify_bip_small_mrg_I0 information.

The modify_bip_small_mrg_l0 information has two values including, for example, 0 and 1, and indicates a prediction direction of unidirectional prediction applied instead of bidirectional prediction.

That is, the modify_bip_small_mrg_l0 information having a value of 0 indicates that unidirectional prediction applied instead of bidirectional prediction is, for example, L1 prediction, and the modify_bip_small_mrg_l0 information having a value of 1 indicates that unidirectional prediction applied instead of bidirectional prediction is, for example, L0 prediction.

According to the third information, a block size of a PU partition of which a prediction method is changed can be controlled so that unidirectional prediction is applied instead of bidirectional prediction by using the disable_bip_small_mrg_idc information, and a prediction direction of the unidirectional prediction applied instead of the bidirectional prediction can be controlled by using the modify_bip_small_mrg_l0 information.

As a result, a reference direction can be controlled in a smaller unit.

In a case where there is a difference in prediction quality (prediction error) depending on a prediction direction of unidirectional prediction, that is, a reference direction, in a case where a target picture which is a prediction target is temporally closer to a reference picture (reference image) in the L1 prediction than in the L0 prediction, the L1 prediction generally tends to have higher prediction quality. In this case, the L1 prediction is used as unidirectional prediction applied instead of bidirectional prediction, and thus it is possible to increase encoding efficiency.

In addition, in a case where there is a difference in a quantization parameter QP when reference pictures of the L0 prediction and the L1 prediction are encoded, the reference picture with a smaller quantization parameter QP is expected to be predicted with higher quality. In addition, when scenes of moving images are changed, employing a reference direction in which the same scene is selected increases predetermined quality. That is, in a case where there is a scene change, a picture before the scene change is employed as a reference picture when the picture before the scene change is encoded, and a picture after the scene change is employed as a reference picture when the picture after the scene change is encoded, thereby increasing prediction quality.

According to the modify_bip_small_mrg_l0 information, it is possible to select one of the L0 prediction and the L1 prediction, which have excellent prediction quality, as unidirectional prediction applied instead of bidirectional prediction.

In addition, the modify_bip_small_mrg_l0 information can be included in encoded data when the disable_bip_small_mrg_idc information has values other than 0.

Accordingly, the modify_bip_small_mrg_l0 information can be included in encoded data in a hierarchical layer lower than the disable_bip_small_mrg_idc information.

For example, the disable_bip_small_mrg_idc information can be included in an SPS, and the modify_bip_small_mrg_l0 information can be included in a slice header. The modify_bip_small_mrg_l0 information can be included in other elements, for example, a PPS, a tile header, an LCU, a CU, a PU, and the like.

The hierarchical layer in which the modify_bip_small_mrg_l0 information and the disable_bip_small_mrg_idc information are included can be determined by the trade-off between the extent to which changing in a prediction method based on the modify_bip_small_mrg_l0 information and the disable_bip_small_mrg_idc information is controlled in a fine unit, and an increase in a data amount due to the modify_bip_small_mrg_l0 information and the disable_bip_small_mrg_idc information being included in encoded data.

A process of the encoder 1000 and the decoder 2000 of FIG. 16 when the modify_bip_small_mrg_l0 information and the disable_bip_small_mrg_idc information are used is the same as the process described in FIG. 18 except for using the modify_bip_small_mrg_l0 information in addition to the disable_bip_small_mrg_idc information, and thus description thereof will be omitted.

Figure 21:
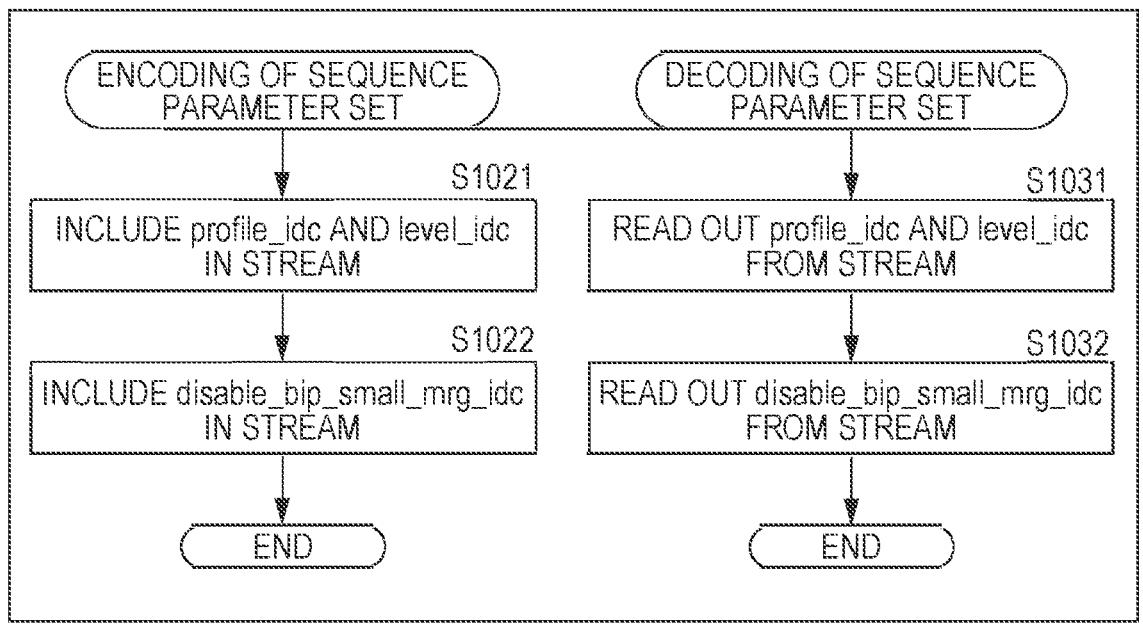
FIG. 21 is flowcharts illustrating encoding of SPS by an encoder 1000 and decoding of SPS by a decoder 2000.

FIG. 21 is a flowchart illustrating an outline of encoding of an SPS performed by the encoder 1000 and decoding of the SPS performed by the decoder 2000 when the disable_bip_small_mrg_idc information or the disable_bip_small_mrg_idc extension information is used.

In the encoder 1000, in Step S1021, the entropy encoding unit 1005 includes profile_idc and level_idc in an SPS of encoded data (encoded stream).

In addition, in Step S1022, the entropy encoding unit 1005 includes the disable_bip_small_mrg_idc information or the disable_bip_small_mrg_idc extension information supplied from the setting unit 1021 in the SPS of the encoded data.

On the other hand, in the decoder 2000, in Step S1031, the entropy decoding unit 2001 separates (reads out) profile_idc and level_idc from the encoded data.

In addition, in Step S1032, the entropy decoding unit 2001 separates the disable_bip_small_mrg_idc information or the disable_bip_small_mrg_idc extension information from the encoded data, and supplies the information to the inter-prediction unit 2010.

Figure 22:
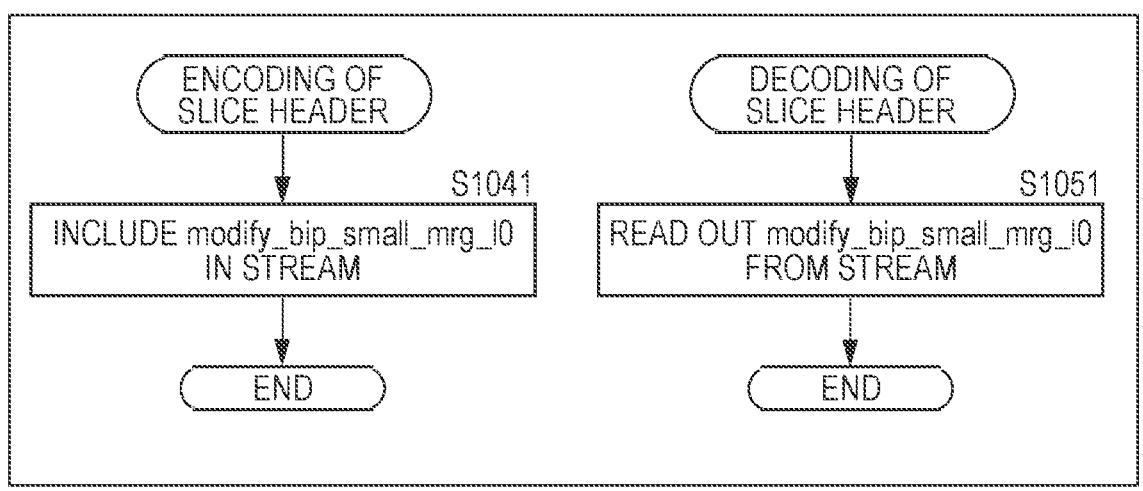
FIG. 22 is flowcharts illustrating encoding of a slice header by an encoder 1000 and decoding of a slice header by a decoder 2000.

FIG. 22 is a flowchart illustrating an outline of encoding of a slice header performed by the encoder 1000 and decoding of the slice header performed by the decoder 2000 when the disable_bip_small_mrg_idc information and the modify_bip_small_mrg_l0 information are used.

In the encoder 1000, in Step S1041, the entropy encoding unit 1005 includes the modify_bip_small_mrg_l0 information from the setting unit 1021 in a slice header of encoded data.

On the other hand, in the decoder 2000, in Step S1051, the entropy decoding unit 2001 separates (reads out) the modify_bip_small_mrg_l0 information from the encoded data, and supplies the information to the inter-prediction unit 2010.

In addition, a process such as including the disable_bip_small_mrg_idc information used along with the modify_bip_small_mrg_l0 information in the SPS is performed, for example, as described in FIG. 21.

Figure 23:
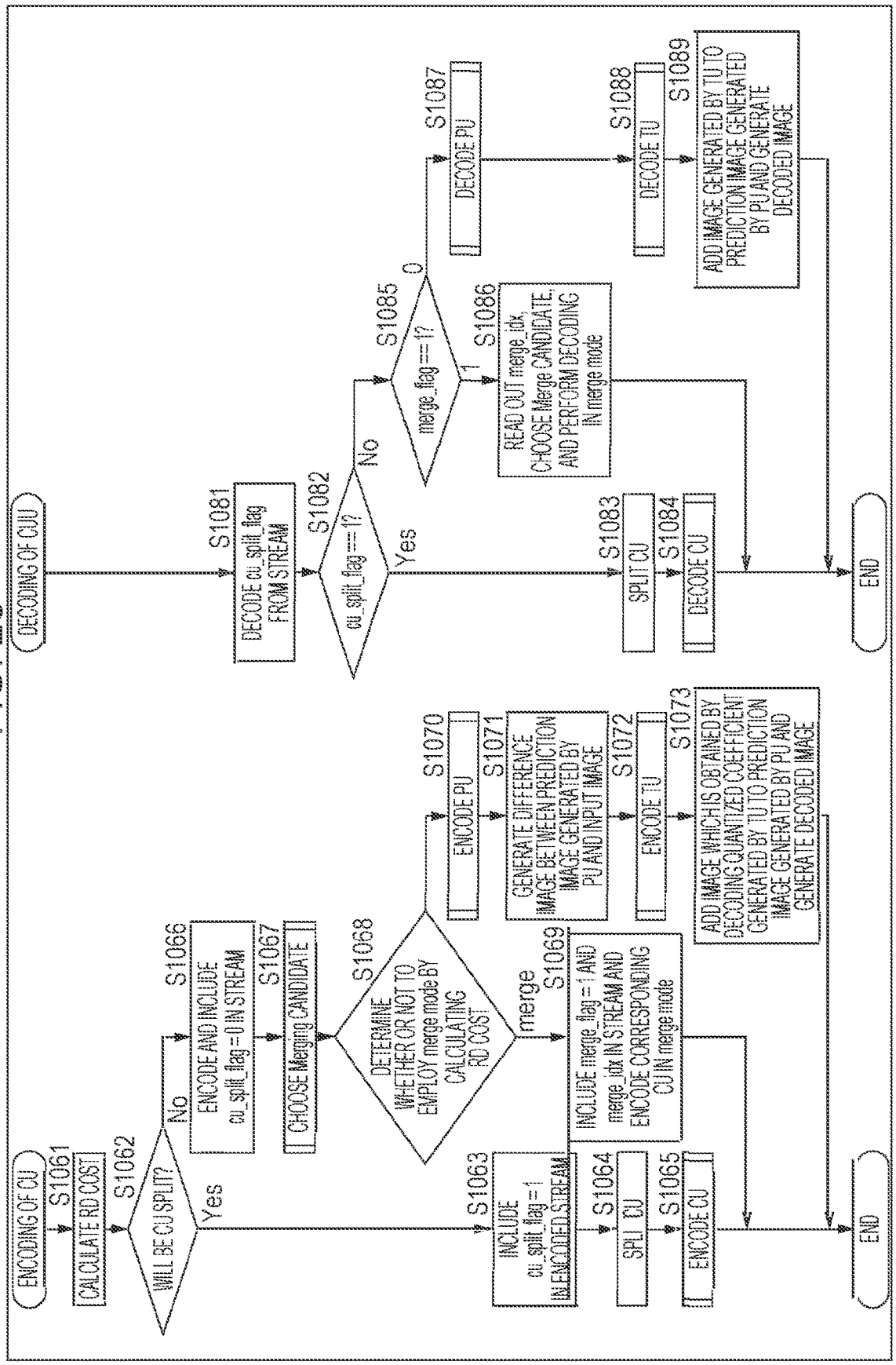
FIG. 23 is flowcharts illustrating encoding of a CU by an encoder 1000 and decoding of a CU by a decoder 2000.

FIG. 23 is a flowchart illustrating an outline of encoding of a CU performed by the encoder 1000 and decoding of the CU performed by the decoder 2000.

In the encoding of the CU, in Step S1061, the encoder 1000 calculates cost function values in respective cases including a case where the CU as a target block is split and a case where the CU is not split. Here, as for the cost function value, for example, a value called an RD cost in which a generated coding rate and encoding distortion are taken into consideration is known.

In Step S1062, the encoder 1000 determines whether or not the CU as a target block will be split based on the RD cost calculated in Step S1061.

Herein, in Step S1062, in a case where the RD cost when the CU is split is lower than the RD cost when the CU is not split (in a case where a generated coding rate and encoding distortion are comprehensively further improved when the CU is split than when the CU is not split), it is determined that the CU is split.

In a case where it is determined that the CU will be split in Step S1062, the process proceeds to Step S1063, and the encoder 1000 sets, for example, 1 which is a value indicating the split of the CU, in cu_split_flag which is a flag regarding the split of the CU, and includes the flag in encoded data (encoded stream).

In addition, in Step S1064, the encoder 1000 splits the CU as a target block into, for example, four new (2×2) CUs.

Further, in Step S1065, the encoder 1000 sequentially recursively performs an encoding process of the CU as a target block on the four new CUs obtained due to the split in Step S1064.

On the other hand, in a case where it is determined not to split the CU in Step S1062, the process proceeds to Step S1066, and the encoder 1000 sets, for example, 0 which is a value indicating not to perform the split of the CU, in cu_split_flag, and includes the flag in encoded data.

Then, in Step S1067, the encoder 1000 performs a merging candidate choosing process of selecting a merging candidate, and the process proceeds to Step S1068.

In Step S1068, the encoder 1000 calculates RD costs of respective cases including cases where the CU as a target block is encoded by employing the merge mode and is encoded without employing the merge mode.

In addition, in Step S1068, the encoder 1000 determines whether or not to encode the CU as a target block in the merge mode based on the RD cost calculated in Step S1068.

Herein, in Step S1068, in a case where the RD cost when the target block is encoded in the merge mode is smaller than the RD cost when the merge mode is not employed (in a case where a generated coding rate and encoding distortion are comprehensively further improved when the merge mode is employed than when the merge mode is not employed), it is determined to perform the encoding in the merge mode.

In a case where it is determined to perform the encoding in the merge mode (to employ the merge mode) in Step S1068, the process proceeds to Step S1069, and the encoder 1000 sets 1 which is a value indicating the employment of the merge mode, in merge_flag which is a flag regarding the merge mode, sets a value indicating a position of a merging region in merge_idx indicating the merging region, and includes the flag and the information in the encoded data.

In addition, in Step S1069, the encoder 1000 encodes the CU as a target block in the merge mode (generates a prediction image by using motion information on the merging region as motion information on the target block, and encodes the target block).

On the other hand, in a case where it is determined not to perform the encoding in the merge mode (not to employ the merge mode) in Step S1068, the process proceeds to Step S1070, and the encoder 1000 performs an encoding process of a PU forming the CU as a target block.

In Step S1071, the encoder 1000 subtracts the prediction image obtained by the encoding process on the PU in Step S1070, from a TU (input image) included in the PU forming the CU as a target block, and generates a difference image for the TU. In Step S1072, the encoder 1000 performs an encoding process on the TU in which the difference image is generated in Step S1071.

In addition, in Step S1073, the encoder 1000 performs orthogonal transform and quantization of the difference image for the TU obtained by the encoding process of the TU, so as to obtain a quantized coefficient, and performs inverse quantization and inverse orthogonal transform of the obtained quantized coefficient, so as to decode the difference image.

Further, in Step S1073, the encoder 1000 adds the prediction image obtained by the encoding process of the PU to the difference image decoded in Step S1073, to generate a decoded image for the TU. The decoded image is stored in the DPB 1014, and is then used as a reference image (picture) as necessary.

On the other hand, in the decoding of the CU, in Step S1081, the decoder 2000 decodes cu_split_flag of the CU as a target block from the encoded data (encoded stream).

In addition, in Step S1082, the decoder 2000 determines whether or not a value of cu_split_flag is 1.

In a case where it is determined that a value of cu_split_flag is 1 in Step S1082, that is, in a case where the CU as a target block is split, the process proceeds to Step S1083, and the decoder 2000 splits the CU as a target block into four new CUs in the same manner as in a case of Step S1064.

Further, in Step S1084, the decoder 2000 sequentially recursively performs a decoding process of the CU as a target block on the four new CUs obtained by the split in Step S1083.

On the other hand, in a case where it is determined that a value of cu_split_flag is not 1 (is 0) in Step S1082, that is, in a case where the CU as a target block is not split, the process proceeds to Step S1085, and the decoder 2000 determines whether or not a value of merge_flag is 1.

In Step S1085, in a case where it is determined that a value of merge_flag is 1, that is, in a case where the CU as a target block is encoded in the merge mode, the process proceeds to Step S1086, and the decoder 2000 reads out merge_idx from the encoded data and performs the same merging candidate choosing process as in the case of Step S1067.

In addition, in Step S1086, the decoder 2000 selects a merging candidate at a position indicated by merge_idx as a merging region among merging candidates obtained due to the merging candidate choosing process, and decodes the CU as a target block in the merge mode by using (motion information on) the merging region (generates a prediction image by using the motion information on the merging region as motion information on the target block, and decodes the target block).

In addition, in Step S1085, in a case where it is determined that a value of merge_flag is not 1 (is 0), that is, in a case where the CU as a target block is encoded without employing the merge mode, the process proceeds to Step S1087, and the decoder 2000 performs a decoding process on the PU forming the CU as a target block, and performs a decoding process on the TU included in the PU in Step S1088.

Further, in Step S1089, the decoder 2000 adds the prediction image obtained due to the decoding process on the PU to a difference image which is obtained by performing inverse quantization and inverse orthogonal transform on a quantized coefficient which is obtained due to the decoding process on the TU, to generate a decoded image for the TU. The decoded image is stored in the DPB 2008, and is then used as a reference image (picture) as necessary.

Figure 24:
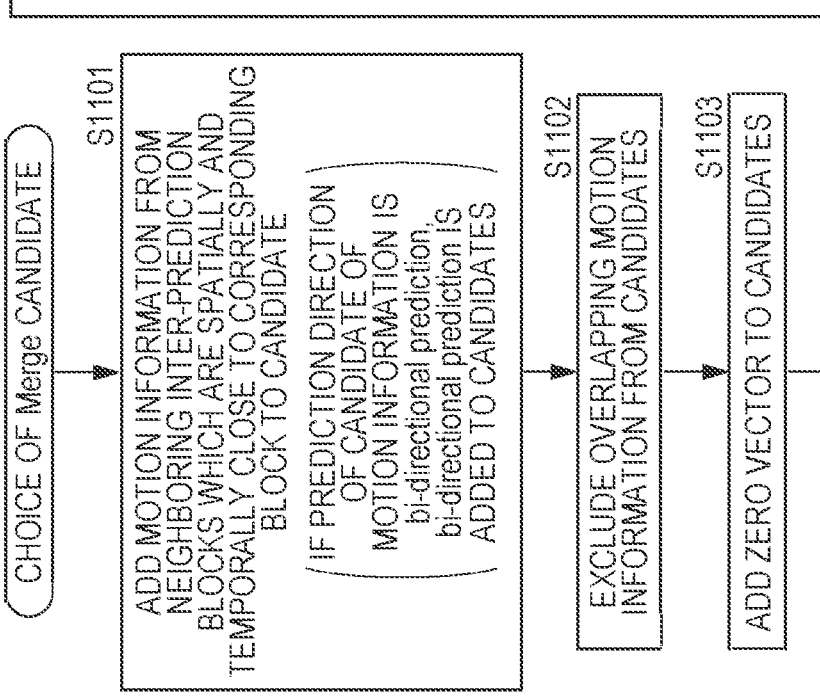
FIG. 24 is a flowchart illustrating a choice (selection) of merging candidates.

FIG. 24 is a flowchart illustrating the choice (selection) of the merging candidate in Step S1067 of FIG. 23.

That is, FIG. 24 is a flowchart illustrating the choice of a merging candidate when the disable_bip_small_mrg_idc information and the modify_bip_small_mrg_l0 information are used.

In Step S1101, among peripheral blocks which are blocks which are spatially and temporally close to the target block, the encoder 1000 adds an inter-prediction block which is a block subjected to inter-prediction to a merging candidate.

In addition, in this step, in a case where a prediction method of the inter-prediction block is bidirectional prediction, the inter-prediction block is added to a merging candidate in a state of the bidirectional prediction.

In Step S1102, the encoder 1000 excludes an inter-prediction block with the overlapped motion information from inter-prediction blocks which are merging candidates, from the merging candidates.

In Step S1103, the encoder 1000 adds an (virtual) inter-prediction block with a zero vector of the motion vector to a merging candidate.

After that, in Step S1104, the encoder 1000 determines whether or not a slice type of target block is B.

In a case where it is determined that a slice type of target block is not B in Step S1104, that is, in a case where the target block is not bi-predicted, the merging candidate choosing process ends. In this case, a merging region is selected by using the merging candidates obtained in Step S1101 and S1103 without change.

In addition, in a case where it is determined that a slice type of target block is B in Step S1104, that is, in a case where the target block is bi-predicted, the process proceeds to Step S1105, and the encoder 1000 determines whether or not a block size of the target block corresponds to a block size in which a prediction method is changed, indicated by the disable_bip_small_mrg_idc information.

In Step S1105, in a case where it is determined that a block size of the target block does not correspond to the block size indicated by the disable_bip_small_mrg_idc information, the merging candidate choosing process ends. Also in this case, a merging region is selected by using the merging candidates obtained in Step S1101 and S1103 without change.

In addition, in Step S1105, in a case where it is determined that a block size of the target block corresponds to the block size indicated by the disable_bip_small_mrg_idc information, the process proceeds to Step S1106, and the encoder 1000 determines whether or not the modify_bip_small_mrg_l0 information has a value of 0.

In Step S1106, in a case where it is determined that the modify_bip_small_mrg_l0 information does not have a value of 0, that is, the modify_bip_small_mrg_l0 information has a value of 1, the process proceeds to Step S1107, and the encoder 1000 changes bidirectional prediction for a merging candidate for which a prediction direction is the bidirectional prediction to L0 prediction of unidirectional prediction, and allows the merging candidate choosing process to end. In this case, for a merging candidate for which a prediction method is bidirectional prediction among the merging candidates obtained in Step S1101 and S1103, the bidirectional prediction is changed to the L0 prediction, and then, a merging region is selected among the merging candidates.

In addition, in Step S1106, in a case where it is determined that the modify_bip_small_mrg_l0 information has a value of 0, the process proceeds to Step S1108, and the encoder 1000 changes bidirectional prediction for a merging candidate for which a prediction direction is the bidirectional prediction to L1 prediction of the unidirectional prediction, and allows the merging candidate choosing process to end. In this case, for a merging candidate for which a prediction method is bidirectional prediction among the merging candidates obtained in Step S1101 and S1103, the bidirectional prediction is changed to the L0 prediction, and then, a merging region is selected among the merging candidates.

[Restriction Information]

Next, restriction information set by the setting unit 1021 will be described.

As described in the identification information, a maximum memory bandwidth (maximum necessary bandwidth) necessary in the MC is a bottleneck in mounting the encoder 1000 and the decoder 2000.

Herein, in the encoder 1000, the setting unit 1021 sets restriction information, and the inter-prediction unit 1018 performs prediction (generation of a prediction image) based on the restriction information, thereby allowing the maximum necessary bandwidth to be suppressed.

Here, the restriction information is information for restricting an image encoding (decoding) process, and includes, for example, a restriction mode RB or a restriction mode RV described below.

According to the restriction mode RB, a size of a block of an image and a prediction method applied to the block having the size are restricted, and according to the restriction mode RV, the number of motion vectors (the number of reference blocks) used to generate a prediction image in the MC of a block of an image is restricted.

FIG. 25 is a diagram illustrating the restriction mode RB.

In FIG. 25, for example, in a case where the restriction mode RB is B4, Bi-4×4, Bi-4×8, Bi-8×4, and Uni-4×4 are prohibited.

Here, for example, Bi-4×4 indicates that bidirectional prediction (Bi) is applied to a PU partition having a block size of 4×4.

In addition, for example, Uni-4×4 indicates that unidirectional prediction (Uni) is applied to a PU partition having a block size of 4×4.

Accordingly, in a case where the restriction mode RB is B4, applying bidirectional prediction and unidirectional prediction to a PU partition having a block size of 4×4 by using Bi-4×4 and Uni-4×4, and further using (inter-predicting) the PU partition having a block size of 4×4 are restricted.

In addition, in a case where the restriction mode RB is B4, applying bidirectional prediction to a PU partition having a block size of 4×8 by using Bi-4×8 is restricted.

Further, in a case where the restriction mode RB is B4, applying bidirectional prediction to a PU partition having a block size of 8×4 by using Bi-8×4 is restricted.

In the encoder 1000, the setting unit 1021 sets the restriction mode RB, for example, based on a maximum value of a memory bandwidth of the DPB 1014, and supplies the set restriction mode to the inter-prediction unit 1018 and the entropy encoding unit 1005.

The inter-prediction unit 1018 performs generation of a prediction image according to the restriction mode RB from the setting unit 1021.

Meanwhile, the entropy encoding unit 1005 includes the restriction mode RB from the setting unit 1021 in encoded data and transmits the restriction mode.

In the entropy encoding unit 1005, the restriction mode RB can be included in, for example, an SPS, a PPS, an APS, a slice header, or the like of the encoded data (encoded stream).

In addition, the setting unit 1021 sets the restriction mode RB having a greater value B # i as a maximum value of a memory bandwidth of the DPB 1014 becomes smaller.

Herein, the value B # i of the restriction mode RB being great indicates that a number # i is large.

In FIG. 25, the restriction mode RB has a decreasing maximum necessary bandwidth in the MC in an order of B1, B2, . . . , and B7.

Here, in FIG. 25, in a case where the restriction mode RB is B1, Bi-4×4 is restricted, and in a case where the restriction mode RB is B2, Bi-4×8 is restricted in addition to Bi-4×4. In a case where the restriction mode RB is B3, Bi-8×4 is restricted in addition to Bi-4×4 and Bi-4×8. As described above, in a certain restriction mode RB=B # i, new restriction content is added to restriction content in the previous restriction mode B # i−1.

The new restriction content is a combination of a block size in which consumption at a memory bandwidth is the maximum at that time and a prediction method applied to a PU partition having the block size.

As described above, in FIG. 25, in a case where the restriction mode RB is B1, Bi-4×4 is restricted, and in a case where the restriction mode RB is B2, Bi-4×8 is restricted in addition to Bi-4×4. In a case where the restriction mode RB is B3, Bi-8×4 is restricted in addition to Bi-4×4 and Bi-4×8.

Therefore, prediction of Bi-4×4 (prediction of applying bidirectional prediction to a PU partition having a block size of 4×4) consumes the largest memory bandwidth, and prediction of Bi-4×8 consumes the second largest memory bandwidth. In addition, prediction of Bi-8×4 consumes the third largest memory bandwidth.

Here, as described above, the prediction of Bi-4×8, that is, the prediction of a vertically long block (PU partition) having width×height of 4×8 consumes a larger memory bandwidth than the prediction of Bi-8×4, that is, the prediction of a horizontally long block having width×height of 8×4, and the reason thereof will be described later.

As described above, since the restriction mode RB has a decreasing maximum necessary bandwidth in the MC in an order of B1, B2, . . . , and B7, the restriction mode RB having a great value B # i is set by the setting unit 1021, and thus it is possible to suppress a memory bandwidth when a decoded image is read out from the DPB 1014 for generation of a prediction image. As a result, it is possible to prevent an increase in a cost of the encoder 1000.

In addition, in a case where the setting unit 1021 sets the restriction mode RB having a greater value B # i as a maximum value of a memory bandwidth of the DPB 1014 becomes smaller according to FIG. 25, applying bidirectional prediction or unidirectional prediction up to a block having a larger size is restricted as a maximum value of a memory bandwidth of the DPB 1014 becomes smaller.

In the decoder 2000, the entropy decoding unit 2001 separates the restriction mode RB from the encoded data, and supplies the restriction mode to the inter-prediction unit 2010.

The inter-prediction unit 2010 performs generation of a prediction image according to the restriction mode RB.

That is, in a case where the encoded data is suitable for the restriction mode RB, for example, in a case where Bi-4×4 is restricted in the restriction mode RB, and Bi-4×4 is not included in the encoded data according to the restriction mode RB, the inter-prediction unit 2010 generates, for example, a prediction image.

In addition, in a case where the encoded data is not suitable for the restriction mode RB, for example, in a case where Bi-4×4 is restricted in the restriction mode RB, but Bi-4×4 is included in the encoded data, for example, inter-prediction unit 2010 does not generate a prediction image and causes the decoder 2000 to stop the process.

In addition, in the encoder 1000, the setting unit 1021 can set the restriction mode RB in response to manipulation performed by a user such as an operator of the encoder 1000.

Further, in the encoder 1000, for a memory bandwidth at each value, a profile or a level can be defined as a maximum necessary bandwidth according to the maximum necessary bandwidth at each value, and the restriction mode RB can be linked to the profile or the level.

Herein, when a level is indicated by Lv. # i, and the maximum necessary bandwidth becomes smaller as a value # i of the level becomes greater, the level Lv. # i can be linked to, for example, the restriction mode RB=B # i.

In this case, in the encoder 1000, for example, if the level Lv.1 is set, the setting unit 1021 sets the restriction mode RB to B1 which is linked to the level Lv.1.

In addition, in the encoder 1000, encoding is performed without using a combination of a block size and a prediction method, indicated by the restriction mode RB, according to the restriction mode RB, and information on the profile and the level is included in encoded data so as to be transmitted.

In the decoder 2000, the information on the profile and the level can be decoded from the encoded data, and, for example, the restriction mode RB linked to the level can be recognized from the level.

In addition, in the encoder 1000, the restriction mode RB can be included in the encoded data so as to be transmitted, and, in the decoder 2000, the restriction mode RB included in the encoded data can be decoded.

The decoder 2000 can check whether or not a combination of a block size and a prediction method, restricted by the restriction mode RB, is included in the encoded data.

In a case where the encoded data is not suitable for the restriction mode RB, that is, in a case where a combination of a block size and a prediction method, restricted by the restriction mode RB, is included in the encoded data, the decoder 2000 can inform a high-order system of the fact that the encoded data is not suitable for the restriction mode RB, and the high-order system can determine how to treat the encoded data.

In addition, in a case where a size of an image (picture frame) is indicated by a profile or a level, the encoder 1000 can set the restriction mode RB for restricting application of bidirectional prediction or unidirectional prediction to a block having a larger size, for example, as the size of the image indicated by the profile or the level becomes larger.

Figure 26:
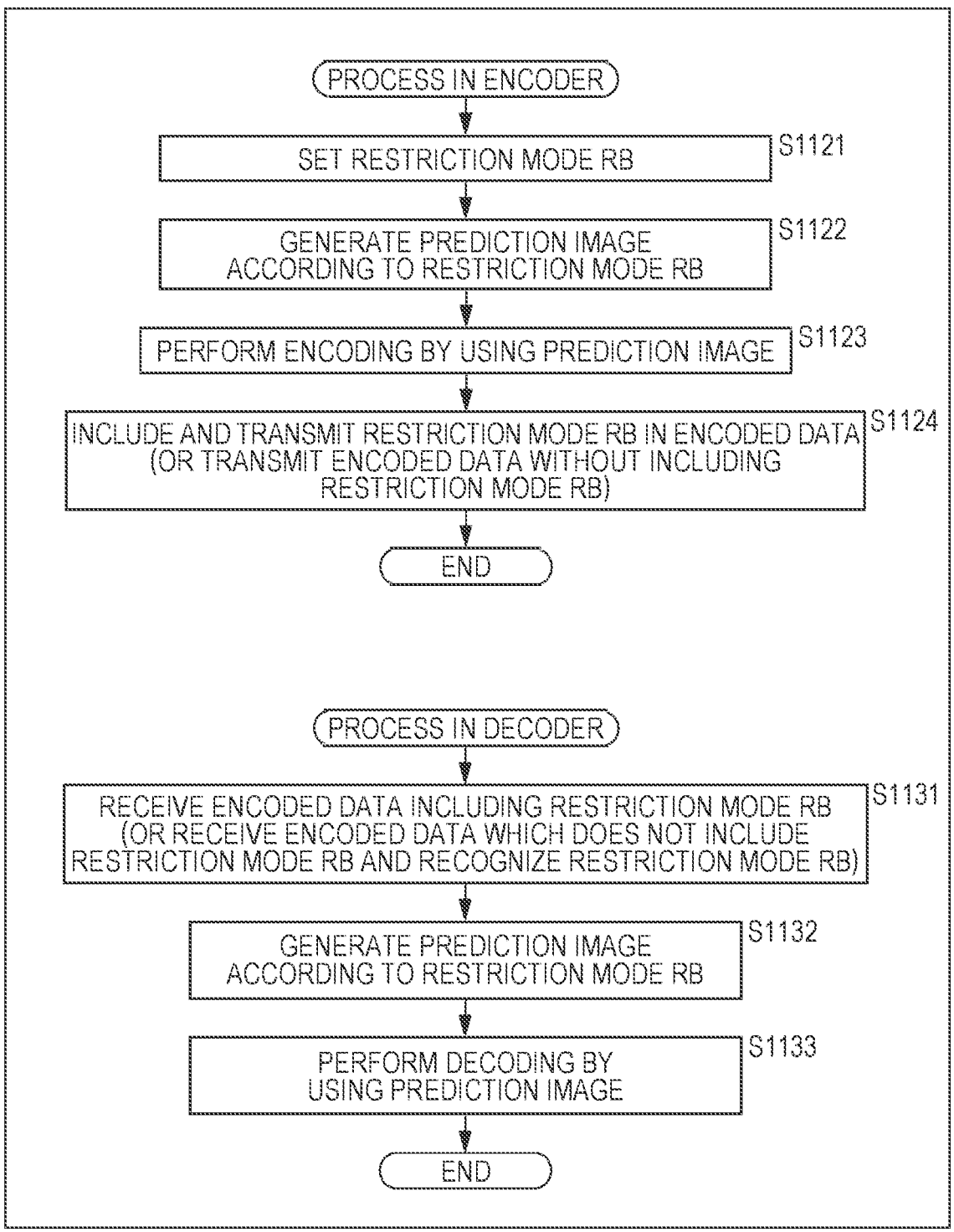
FIG. 26 is flowcharts illustrating processes of an encoder 1000 and a decoder 2000 in a case of using a restriction mode RB.

FIG. 26 is a flowchart illustrating a process performed by the encoder 1000 and the decoder 2000 when the restriction mode RB is used.

In the encoder 1000, in Step S1121, the setting unit 1021 sets the restriction mode RB in a target block based on, for example, a maximum value of a memory bandwidth of the DPB 1014, manipulation of a user, a level, or the like, and supplies the set restriction mode to the inter-prediction unit 1018 and the entropy encoding unit 1005.

In Step S1122, the inter-prediction unit 1018 generates a prediction image while restricting a block size of a PU partition and a prediction method applied to the PU partition having the block size according to the restriction mode RB from the setting unit 1021.

In Step S1123, the calculation unit 1002 to the entropy encoding unit 1005 encode the target block by using the prediction image generated in Step S1122 as necessary, and generate encoded data.

In Step S1124, the entropy encoding unit 1005 includes the restriction mode RB from the setting unit 1021 in the encoded data and transmits the restriction mode.

In addition, since a profile and a level can be included in the encoded data, in a case where the restriction mode RB is linked to the level (or the profile), the restriction mode RB can be recognized from information on the level included in the encoded data, and thus the restriction mode RB is not required to be included in the encoded data.

Accordingly, in a case where the restriction mode RB is linked to the level, the encoded data can be transmitted without including the restriction mode RB.

Meanwhile, in the decoder 2000, in Step S1131, the entropy decoding unit 2001 receives the encoded data. In addition, the entropy decoding unit 2001 separates the restriction mode RB from the encoded data, and supplies the restriction mode RB to the inter-prediction unit 2010.

In addition, in a case where the restriction mode RB is linked to the level, and thus the restriction mode RB is not included in the encoded data, the entropy decoding unit 2001 supplies the level included in the encoded data to the inter-prediction unit 2010, and the inter-prediction unit 2010 recognizes the restriction mode RB based on the level from the entropy decoding unit 2001.

In Step S1132, the inter-prediction unit 2010 generates a prediction image according to the restriction mode RB.

That is, the inter-prediction unit 1018 generates a prediction image while checking whether or not the encoded data is suitable for the restriction mode RB, that is, checking whether or not a combination of a block size and a prediction image, restricted by the restriction mode RB, is included in the encoded data.

In addition, in a case where the encoded data is not suitable for the restriction mode RB, the decoder 2000 informs a high-order system of the gist thereof.

On the other hand, in a case where the encoded data is suitable for the restriction mode RB, in Step S1133, the entropy decoding unit 2001 to the calculation unit 2004 decode the encoded data received in Step S1131 by using the prediction image generated in Step S1132 as necessary.

Figure 27:
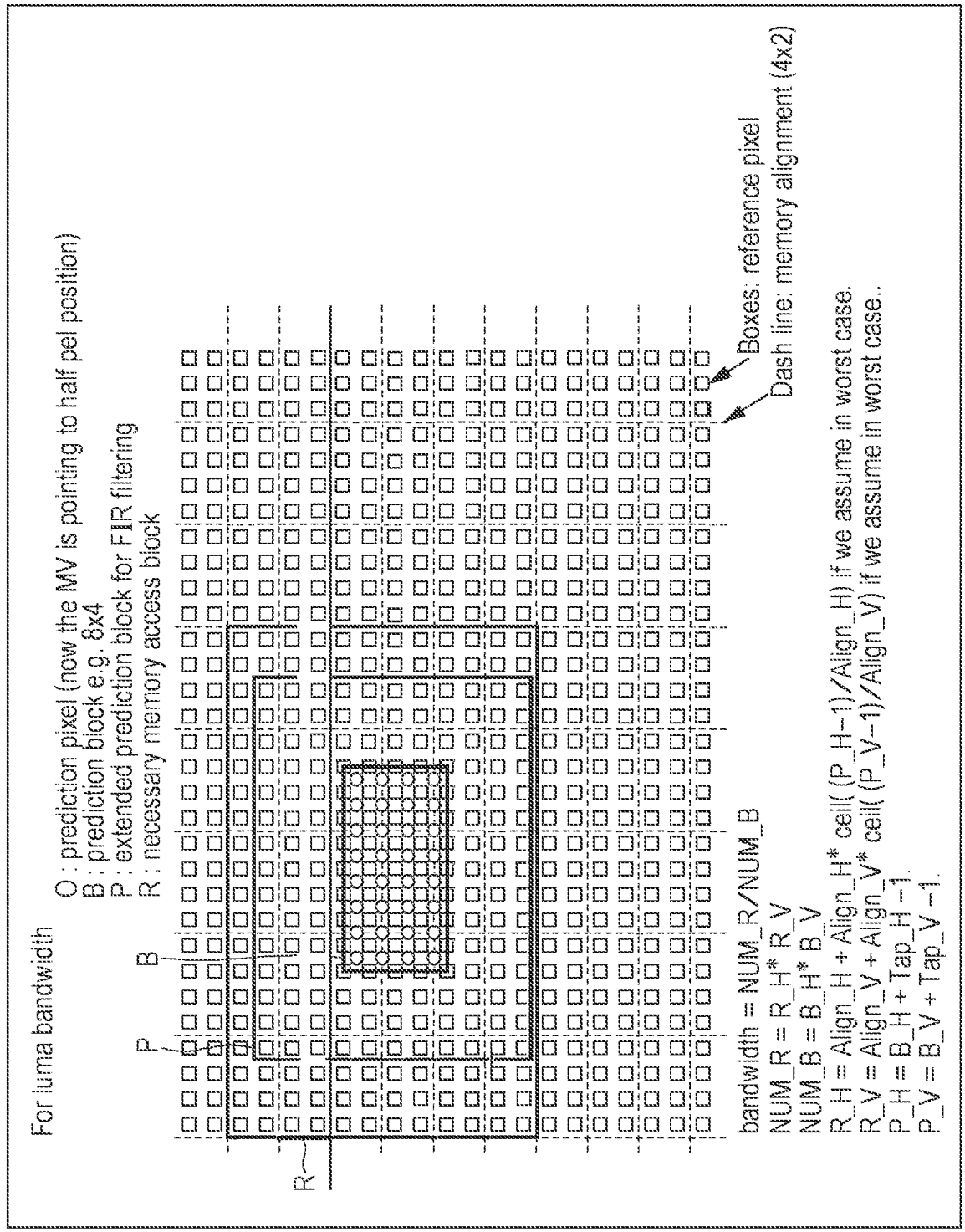
FIG. 27 is a diagram illustrating that a larger range of a memory bandwidth is used in prediction of vertical blocks, than in prediction of horizontal blocks.
Figure 28:
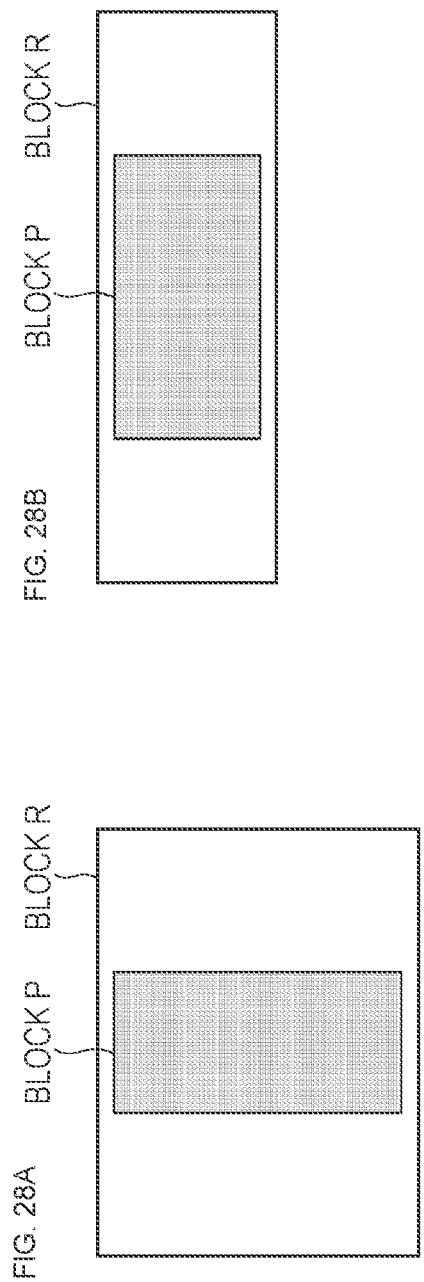
FIGS. 28A and 28B are diagrams illustrating that a larger range of a memory bandwidth is used in prediction of vertical blocks, than in prediction of horizontal blocks.

FIGS. 27 and 28 are diagrams illustrating that, even in blocks having the same size (the number of pixels), prediction of a vertically long block such as 4×8 consumes a larger memory bandwidth than prediction of a horizontally long block such as 8×4.

In a case where pixels of a decoded image (picture) stored in a memory are read out from the memory such as the DPB 1014, 64 bits or 128 bits become a bus width (data transmission path width) unit.

In a case where one pixel is formed by 8 bits, eight pixels are simultaneously read out in parallel in a bus width of 64 bits, and sixteen pixels are simultaneously read out in parallel in a bus width of 128 bits.

In general mounting, a horizontally long rectangular block is employed as a minimal unit of pixel groups which are simultaneously read out from a memory, due to experimental convenience or the like.

For example, in FIG. 27, pixels (values) are read out for each block having width×height of 4×2 pixels, partitioned by the dash lines.

Here, the minimal unit of pixel groups which are simultaneously read out from the memory is referred to as a minimal block.

In addition, in FIG. 27, the square (□ mark) indicates one pixel (data thereof) stored in the memory, and the circle (○ mark) indicates a position of a pixel of a prediction image. In FIG. 27, the prediction image is an image which deviates by ½ pixel in each of a horizontal direction and a vertical direction from a pixel of an image (reference image) stored in the memory.

In addition, a block B indicates a block of pixels of the prediction image, and is a block of 8×4 pixels in FIG. 27.

A block P indicates a block of pixels of a reference image to which a finite impulse response (FIR) filter as an interpolation filter is applied when a prediction image is generated from the reference image, and is a block which is obtained by extending the block B of the prediction image (hereinafter, referred to as a prediction block).

In FIG. 27, the block P is a block of 15×11 pixels. In the inter-prediction units 1018 and 2010, an interpolation filter is applied to the pixels of the block P, and thus the prediction image of the block B is generated.

A block R is a block of pixels which are required to be read out from the memory (are necessarily read out from the memory) when the pixels of the block P are read out from the memory, and is a block formed by 5×6 minimal blocks in width×height, that is, a block of 20×12 pixels, in FIG. 27.

Here, when the number of pixels of the block (hereinafter, also referred to as a necessary reading-out block) R which are required to be read out from the memory when the pixels of the block P are read out from the memory is denoted by NUM_R, and the number of pixels of the prediction block B is denoted by NUM_B, a memory bandwidth bandwidth is expressed by, for example, Equation (1).

$$\text{bandwidth} = NUM\_R/NUM\_B \quad (1)$$

The number NUM_B of pixels of the prediction block B is expressed by Equation (2) when the number of horizontal pixels and the number of vertical pixels are respectively denoted by B_H and B_V.

$$NUM\_B = B\_H \times B\_V \quad (2)$$

In FIG. 27, B_H×B_V is 8×4 pixels.

The number NUM_R of pixels of the necessary reading-out block R is expressed by Equation (3) when the number of horizontal pixels and the number of vertical pixels are respectively denoted by R_H and R_V.

$$NUM\_R = R\_H \times R\_V \quad (3)$$

Here, when the number of horizontal pixels and the number of vertical pixels of the minimal block are respectively denoted by Align_H and Align_V, the number R_H of horizontal pixels and the number R_V of vertical pixels of the necessary reading-out block R are expressed by Equations (4) and (5) in the worst case.

$$R\_H = \text{Align}\_H + \text{Align}\_H \times \text{ceil}((P\_H - 1)/\text{Align}\_H) \quad (4)$$

$$R\_V = \text{Align}\_V + \text{Align}\_V \times \text{ceil}((P\_V - 1)/\text{Align}\_V) \quad (5)$$

In addition, in Equations (4) and (5), ceil(x) indicates a minimal integer which is equal to or greater than x. Further, P_H and P_V respectively indicate the number of horizontal pixels and the number of vertical pixels of the block P to which the interpolation filter is applied, and are respectively expressed by Equations (6) and (7).

$$P\_H = B\_H + \text{Tap}\_H - 1 \quad (6)$$

$$P\_V = B\_V + \text{Tap}\_V - 1 \quad (7)$$

In Equations (6) and (7), Tap_H and Tap_V respectively indicate the number of horizontal taps and the number of vertical taps of an FIR filter as the interpolation filter.

In a case where the minimal block is formed by a plurality of pixels, pixels which are unnecessary in inter-prediction may be read out from the memory, but the unnecessary pixels are discarded after being read out from the memory.

In a case where the minimal block has a horizontally long rectangular shape, more residual pixels are read out at left and right parts of the necessary reading-out block R which are read out from the memory than at upper and lower parts thereof.

As in a vertically long block such as 4×8 and a horizontally long block such as 8×4, the number of pixels is the same, but, for the prediction block B having a different shape, the prediction block B which includes the most pixels which are unnecessary in inter-prediction in pixels which are read out for generation of a prediction image from the memory is a block which consumes the largest memory bandwidth.

In a case where the minimal block has a horizontally long rectangular shape, as shown in FIGS. 28A and 28B, when the pixels of the necessary reading-out block R including the extended block P (a block to which the interpolation filter is applied) of the prediction block B are read out, more pixels which are unnecessary in inter-prediction (filtering with the interpolation filter) are included when the prediction block B has a vertically long rectangular shape (FIG. 28A) than when the prediction block B has a horizontally long rectangular shape (FIG. 28B).

For this reason, the vertically long prediction block B such as 4×8 and the horizontally long prediction block B such as 8×4 have the same number of pixels, but prediction of the vertically long prediction block B consumes a larger memory bandwidth than prediction of the horizontally long prediction block B.

FIG. 29 is a diagram illustrating the restriction mode RV.

As described above, according to the restriction mode RV, the number of motion vectors (the number of reference blocks) used to generate a prediction image in the MC (ME) of a block of an image is restricted.

In FIG. 29, the restriction mode RV=V # i can take three values including V1, V2, and V3, and the number of motion vectors is restricted depending on a frame rate (Frame rate) and a size of an LCU (LCU size).

For example, in a case where a frame rate rate is a value in a range expressed by an expression 0<rate<=30, and a size of an LCU is 16×16 pixels, when the restriction mode RV is set to the value V1, the number of motion vectors which can be used in the MC is restricted to 32.

Here, in the restriction mode RV, instead of the number of motion vectors, the number of reference blocks read out from the DPB 1014 (DPB 2008) can be restricted.

According to FIG. 29, the number of reference blocks or a maximum value of the number of motion vectors is restricted by the frame rate and the size of an LCU.

For example, if the frame rate increases, the maximum necessary bandwidth also increases, and thus the number of reference blocks or the number of motion vectors is reduced in proportion to the frame rate according to FIG. 29.

In the encoder 1000, the setting unit 1021 sets the restriction mode RV based on, for example, a maximum value of a memory bandwidth of the DPB 1014 as well as the frame rate and the size of an LCU, and supplies the set restriction mode to the inter-prediction unit 1018 and the entropy encoding unit 1005.

The inter-prediction unit 1018 performs generation of a prediction image according to the restriction mode RV from the setting unit 1021.

Meanwhile, the entropy encoding unit 1005 includes the restriction mode RV from the setting unit 1021 in encoded data and transmits the restriction mode.

In the entropy encoding unit 1005, the restriction mode RV can be included in, for example, an SPS, a PPS, an APS, a slice header, or the like of the encoded data.

In addition, the setting unit 1021 sets the restriction mode RV having a greater value V # i as a maximum value of a memory bandwidth of the DPB 1014 becomes smaller.

Here, the value V # i of the restriction mode RV being great indicates that a number # i is large.

The restriction mode RV has a decreasing maximum necessary bandwidth in the MC in an order of V1, V2, and V3.

The restriction mode RV having a great value V # i is set by the setting unit 1021, and thus it is possible to suppress a memory bandwidth when a decoded image is read out from the DPB 1014 for generation of a prediction image. As a result, it is possible to prevent an increase in a cost of the encoder 1000.

In the decoder 2000, the entropy decoding unit 2001 separates the restriction mode RV from the encoded data, and supplies the restriction mode to the inter-prediction unit 2010.

The inter-prediction unit 2010 performs generation of a prediction image according to the restriction mode RV.

That is, in a case where the encoded data is suitable for the restriction mode RV, for example, in a case where the number of motion vectors is restricted to two in the restriction mode RV, and a block for which a prediction image is generated by using motion vectors exceeding two is not included in the encoded data, the inter-prediction unit 2010 generates, for example, a prediction image.

In addition, in a case where the encoded data is not suitable for the restriction mode RV, for example, in a case where the number of motion vectors is restricted to two in the restriction mode RV, but a block for which a prediction image is generated by using motion vectors exceeding two is included in the encoded data, the inter-prediction unit 2010 performs the same process as in the above-described case where the encoded data is not suitable for the restriction mode RB.

In addition, in the encoder 1000, the setting unit 1021 can set the restriction mode RV in response to manipulation performed by a user such as an operator of the encoder 1000.

In addition, in the encoder 1000, for a maximum value of a memory bandwidth of the DPB 1014, a profile or a level can be defined as a maximum necessary bandwidth according to restriction amount of the maximum necessary bandwidth and the restriction mode RV can be linked to the profile or the level.

Here, when the maximum necessary bandwidth becomes smaller as a value # i of the level becomes greater, the level Lv. # i can be linked to, for example, the restriction mode RV=V # i.

In this case, in the encoder 1000, for example, if the level Lv.1 is set, the setting unit 1021 sets the restriction mode RV to V1 which is linked to the level Lv.1.

In addition, in the encoder 1000, encoding is performed by restricting the number of motion vectors to the number (or less) indicated by the restriction mode RV, according to the restriction mode RB, and information (level_idc or the like) on the profile and the level is included in encoded data so as to be transmitted.

In the decoder 2000, the information on the profile and the level can be decoded from the encoded data, and, for example, the restriction mode RV linked to the level can be recognized from the level.

In addition, in the encoder 1000, the restriction mode RV can be included in the encoded data so as to be transmitted, and, in the decoder 2000, the restriction mode RV included in the encoded data can be decoded.

In a case where the encoded data is not suitable for the restriction mode RV, the decoder 2000 informs a high-order system of the fact that the encoded data is not suitable for the restriction mode RV. In this case, the high-order system determines how to treat the encoded data.

In addition, a size of an image (picture frame) can be indicated by a profile or a level. For example, in a case where the size of an image is indicated by the level, when the greater a value of the level is, the larger the size of an image is, the level Lv. # i is linked to the restriction mode RV=V # i, and, thus, for example, as the size of an image indicated by the level becomes larger, the encoder 1000 restricts the number of motion vectors to a smaller number, thereby reducing a memory bandwidth.

In a case where the level (or the profile) is linked to the restriction mode RV, in the same manner as in a case where the level is linked to the restriction mode RB, the restriction mode RV can be recognized from the level, and thus, in the encoder 1000, the restriction mode RV cannot be included in the encoded data.

Here, if an LCU size increases, for example, since the number of LCUs per picture decreases, the number of reference blocks or MVs which can be used by a single LCU increases as the number of LCUs decreases.

In addition, if an image size increases, for example, since the number of LCUs with a predetermined LCU size increases in a single picture, the number of reference block or MVs which can be used by a single LCU decreases as the number of LCUs increases.

Further, as described above, in a case where the number of reference blocks (or motion vectors) is reduced in proportion to a frame rate, in FIG. 29, if it is used as a reference that the number of reference blocks is two when a frame rate is 0<rate<=30, an LCU size is 8×8, and the restriction mode RV is V3, the number of reference blocks is restricted to one (=2×½) when a frame rate is 30<rate<=60, an LCU size is 8×8, and the restriction mode RV is V3. The number of reference blocks is restricted to 0.5 (=2×½×½) when a frame rate is 0<rate<=30, an LCU size is 8×8, and the restriction mode RV is V3.

However, since a non-integer such as 0.5 as the number of reference blocks is not appropriate, in FIG. 29, the number of reference blocks which is 0.5 in calculation is rounded up to 1 which is a minimal value of values taken as the number of (one or more) reference blocks.

As described above, in a case where the number of reference blocks is rounded up, the DPB 1014 of the encoder 1000 and the DPB 2008 of the decoder 2000 are required to be mounted so as to read out reference blocks of the rounded-up number.

In addition, the restriction modes RB and RV can be used in combination. Further, the identification information and the restriction information can be used in combination.

Further, although in the restriction mode RV of FIG. 29, the number of motion vectors or reference blocks used in an LCU is restricted depending on an LCU size, the number of motion vectors or reference blocks can be restricted depending on a size of a region in a region unit such as a PU, a TU, an SCU, or a picture, as well as the LCU. However, if a region for which the number of motion vectors or the like is restricted is set to a too wide region, many motion vectors are assigned to a part of the wide region, and, as a result, motion vectors assigned to other parts may be considerably restricted. In addition, if a region for which the number of motion vectors or the like is restricted is set to a too narrow region, the number of motion vectors assigned to the narrow region is originally small, and thus a degree of freedom of restricting the number of motion vectors decreases. Accordingly, a region for which the number of motion vectors is restricted is preferably a region having a proper size such as an LCU, in consideration of the above facts.

First Example of Syntax of Header Information Including Identification Information FIG. 30 is a diagram illustrating a first example of syntax of header information of encoded data, including identification information.

That is, FIG. 30 illustrates syntax of header information seq_parameter_set_rbsp( ) and a flag disable_bip_small_mrg_idc as identification information is included in the header information seq_parameter_set_rbsp( ).

The flag disable_bip_small_mrg_idc of FIG. 30 indicates a size of a block (prediction block) for which bidirectional prediction (bi-prediction) is prohibited.

FIG. 31 is a diagram illustrating a value taken by the flag disable_bip_small_mrg_idc as identification information of FIG. 30 and a size of a block for which bidirectional prediction is prohibited by the flag disable_bip_small_mrg_idc at each value.

In FIG. 31, the flag disable_bip_small_mrg_idc can take values including 0, 1, 2, and 3.

In a case where a value of the flag disable_bip_small_mrg_idc is 0, bidirectional prediction is not prohibited.

In a case where a value of the flag disable_bip_small_mrg_idc is 1, bidirectional prediction is prohibited for a block of 4×4 (a block having a block size of 4×4).

In a case where a value of the flag disable_bip_small_mrg_idc is 2, bidirectional prediction is prohibited for three types of blocks of 4×4, 8×4, and 4×8, and, in a case where a value of the flag disable_bip_small_mrg_idc is 3, bidirectional prediction is prohibited for four types of blocks of 4×4, 8×4, 4×8, and 8×8.

In addition, for example, the flag disable_bip_small_mrg_idc as identification information of FIG. 30 is set by the setting unit 1021 of the image processing apparatus of FIG. 16, is used for inter-prediction by the inter-prediction unit 1018, and is included in encoded data by the entropy encoding unit 1005.

Further, for example, the flag disable_bip_small_mrg_idc as identification information of FIG. 30 is separated from encoded data by the entropy decoding unit 2001 of the image processing apparatus of FIG. 16 and is used for inter-prediction by the inter-prediction unit 2010.

Second Example of Syntax of Header Information Including Identification Information FIGS. 32 and 33 are diagrams illustrating a second example of syntax of header information of encoded data, including identification information.

That is, FIG. 32 illustrates syntax of header information seq_parameter_set_rbsp( ) and flags disable_inter_4×8_8×4_8×8_bidir_flag and disable_inter_4×8_8×4_bidir_flag as identification information are included in the header information seq_parameter_set_rbsp( ).

In FIG. 32, the flag disable_inter_4×8_8×4_8×8_bidir_flag as identification information indicates whether or not bidirectional prediction can be applied to three types of blocks of 4×8, 8×4, and 8×8.

For example, in a case where a value of the flag disable_inter_4×8_8×4_8×8_bidir_flag is 0, bidirectional prediction is not prohibited for three types of blocks of 4×8, 8×4, and 8×8, and, in a case where a value of the flag disable_inter_4×8_8×4_8×8_bidir_flag is 1, bidirectional prediction is prohibited for three types of blocks of 4×8, 8×4, and 8×8.

In addition, in FIG. 32, the flag disable_inter_4×8_8×4_bidir_flag as identification information indicates whether or not bidirectional prediction can be applied to two types of blocks of 4×8 and 8×4.

For example, in a case where a value of the flag disable_inter_4×8_8×4_bidir_flag is 0, bidirectional prediction is not prohibited for two types of blocks of 4×8 and 8×4, and, in a case where a value of the flag disable_inter_4×8_8×4_bidir_flag is 1, bidirectional prediction is prohibited for two types of blocks of 4×8 and 8×4.

Therefore, in a case where a value of the flag disable_inter_4×8_8×4_8×8_bidir_flag is 1, when a target block is a block of 4×8, 8×4, or 8×8, a prediction method of a merging candidate to which bidirectional prediction is applied is replaced so that unidirectional prediction is applied instead of the bidirectional prediction, and a process in the merge mode is performed on the target block.

In addition, in a case where a value of the flag disable_inter_4×8_8×4_bidir_flag is 1, when a target block is a block of 4×8 or 8×4, a prediction method of a merging candidate to which bidirectional prediction is applied is replaced so that unidirectional prediction is applied instead of the bidirectional prediction, and a process in the merge mode is performed on the target block.

In FIG. 32, the flag disable_inter_4×8_8×4_8×8_bidir_flag is included in the header information seq_parameter_set_rbsp( ) in a case where a value of a flag log 2_min_coding_block_size_minus3 is equal to or less than 1. In addition, the flag disable_inter_4×8_8×4_bidir_flag is included in the header information seq_parameter_set_rbsp( ) in a case where a value of the flag log 2_min_coding_block_size_minus3 is 0 and a value of the flag disable_inter_4×8_8×4_8×8_bidir_flag is 0.

Here, the flag log 2_min_coding_block_size_minus3 indicates a minimal size of a CU (coding block).

In a case where a minimal size of a CU indicated by the flag log 2_min_coding_block_size_minus3 is a size (32×32 or 64×64) larger than 16×16, as a PU which is a target block, a block having a size of 16×16 (or a larger size) is used, and a block having a size of 8×8 (or a smaller size) is not used.

Therefore, in a case where a minimal size of a CU indicated by the flag log 2_min_coding_block_size_minus3 is a size larger than 16×16, the flags disable_inter_4×8_8×4_8×8_bidir_flag and disable_inter_4×8_8×4_bidir_flag as identification information have no meaning, and thus the entropy decoding unit 2001 (FIG. 16) does not read out (disregards) the flags even if the flags are included in encoded data.

In addition, in a case where the flag disable_inter_4×8_8×4_8×8_bidir_flag is not included in the header information seq_parameter_set_rbsp( ) a value of the flag disable_inter_4×8_8×4_8×8_bidir_flag is estimated to be 0.

Further, in a case where the flag disable_inter_4×8_8×4_bidir_flag is not included in the header information seq_parameter_set_rbsp( ) if a value of the flag disable_inter_4×8_8×4_8×8_bidir_flag is 0, a value of the flag disable_inter_4×8_8×4_bidir_flag is also estimated to be 0, and if a value of the flag disable_inter_4×8_8×4_8×8_bidir_flag is 1, a value of the flag disable_inter_4×8_8×4_bidir_flag is also estimated to be 1.

FIG. 33 illustrates syntax of header information prediction_unit(x0,y0,log 2CbSize), and a flag disable_bidir as identification information is included in the header information prediction_unit(x0,y0,log 2CbSize).

The flag disable_bidir as identification information is set to a value of 0 or 1 depending on the flags disable_inter_4×8_8×4_8×8_bidir_flag and disable_inter_4×8_8×4_bidir_flag as identification information of FIG. 32.

In a case where a value of the flag disable_bidir is 0, bidirectional prediction is not prohibited, and, in a case where a value of the flag disable_bidir is 1, bidirectional prediction is prohibited.

In FIG. 33, a flag inter_pred_flag[x0][y0] which is described after the flag disable_bidir indicates whether a prediction method of a block at a position indicated by x0 and y0 is unidirectional prediction or bidirectional prediction, but in a case where a value of the flag disable_bidir is 1, and bidirectional prediction is prohibited, the entropy decoding unit 2001 (FIG. 16) does not read out the flag inter_pred_flag[x0][y0] from the encoded data, and a prediction method of the block at the position indicated by x0 and y0 is interpreted as unidirectional prediction.

In addition, for example, the flags disable_inter_4×8_8×4_8×8_bidir_flag and disable_inter_4×8_8×4_bidir_flag as identification information of FIG. 32, and the flag disable_bidir as identification information of FIG. 33 are set by the setting unit 1021 of the image processing apparatus of FIG. 16 so as to be used for inter-prediction by the inter-prediction unit 1018 and be included in encoded data by the entropy encoding unit 1005.

Further, for example, the flags disable_inter_4×8_8×4_8×8_bidir_flag and disable_inter_4×8_8×4_bidir_flag as identification information of FIG. 32, and the flag disable_bidir as identification information of FIG. 33 are separated from the encoded data by the entropy decoding unit 2001 of the image processing apparatus of FIG. 16 so as to be used for inter-prediction by the inter-prediction unit 2010.

Here, the flags disable_inter_4×8_8×4_8×8_bidir_flag and disable_inter_4×8_8×4_bidir_flag as identification information of FIG. 32, and the flag disable_bidir as identification information of FIG. 33 can also be applied to a case of performing inter-prediction in modes other than the merge mode in cases other than a case of performing the merge mode.

Further, information indicating whether or not bidirectional prediction can be applied to a block of 4×4 among blocks having a size equal to or smaller than 8×8 is not included in the flags disable_inter_4×8_8×4_8×8_bidir_flag and disable_inter_4×8_8×4_bidir_flag as identification information included in the header information seq_parameter_set_rbsp( ) of FIG. 32. This is because a flag inter_4×4_enabled_flag is present in the header information seq_parameter_set_rbsp( ) at the present time.

That is, at the present time, the flag inter_4×4_enabled_flag indicating whether or not a block of 4×4 is used is defined in the header information seq_parameter_set_rbsp( ) shown in FIG. 30, and treating of the block of 4×4 follows the flag inter_4×4_enabled_flag. Therefore, in FIG. 32, a flag indicating whether or not bidirectional prediction can be applied to the block of 4×4 is not defined.

Thus, for example, in a case where the flag inter_4×4_enabled_flag is deleted in the future, a flag indicating whether or not bidirectional prediction can be applied to a block of 4×4 or a block having a block size of 4×4 or a larger block size can be defined and be included in the header information seq_parameter_set_rbsp( ) of FIG. 32 instead of the flags disable_inter_4×8_8×4_8×8_bidir_flag and disable_inter_4×8_8×4_bidir_flag (or along with the flags disable_inter_4×8_8×4_8×8_bidir_flag and disable_inter_4×8_8×4_bidir_flag) which do not include information on the block of 4×4.

In addition, the present technology can be applied to an image encoding device and an image decoding device which are used when image information (bit stream) which has been compressed through orthogonal transform such as discrete cosine transistor and motion compensation, such as, for example, MPEG or H.26x, is received via a network medium such as satellite broadcast, a cable television, the Internet, or a mobile phone. Further, the present technology can be applied to an image encoding device and an image decoding device which are used when a process is performed on storage media such as an optical disc, a magnetic disk, and a flash memory. Furthermore, the present technology can also be applied to a motion prediction compensation device included in the image encoding device and the image decoding device.

[Personal Computer]

The series of processes described above can be performed by hardware or software. When the series of processes is performed by the software, programs constituting the software are installed in a computer. Here, the computer includes a computer incorporated into dedicated hardware, or a general purpose personal computer or the like which can execute various kinds of functions by installing various kinds of programs.

Figure 34:
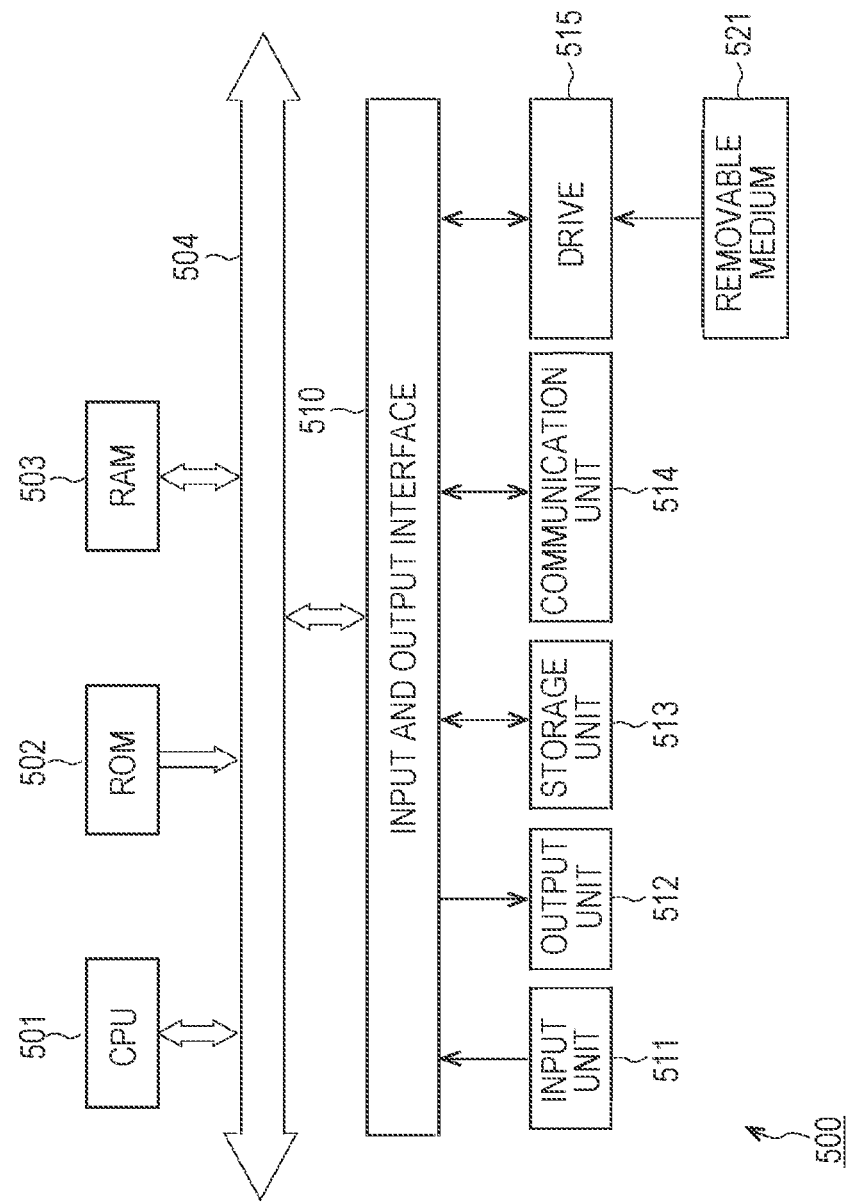
FIG. 34 is a block diagram showing a main configuration example of a personal computer.

In FIG. 34, a CPU (Central Processing Unit) 501 of the personal computer 500 performs various processes according to a program stored in a read only memory (ROM) 502 or a program which is loaded to a random access memory (RAM) 503 from a storage unit 513. The RAM 503 suitably stores data or the like which is necessary for the CPU 501 to execute various processes.

The CPU 501, the ROM 502, and the RAM 503 are connected to each other via a bus 504. In addition, an input and output interface 510 is also connected to the bus 504.

The input and output interface 510 is connected to an input unit 511 including a keyboard, a mouse, and the like, an output unit 512 including a display such as a cathode ray tube (CRT) or a liquid crystal display (LCD), a speaker, and the like, a storage unit 513 including a hard disk or the like, and a communication unit 514 including a modem or the like. The communication unit 514 performs a communication process via a network including the Internet.

A drive 515 is connected to the input and output interface 510 as necessary, a removable medium 521 such as a magnetic disk, an optical disc, a magneto-optical disc, or a semiconductor memory is mounted therein as appropriate, and a computer program read out therefrom is installed in the storage unit 513 as necessary.

In a case where the series of processes described above is executed in software, a program constituting the software is installed from a network or a recording medium.

The recording medium includes, for example, as shown in FIG. 34, not only the removable medium 521 such as a magnetic disk (including a floppy disk), an optical disc (including a compact disc-read only memory (CD-ROM) and a digital versatile disc (DVD)), a magneto-optical disc (including a mini disc (MD)), or a semiconductor memory, which is distributed so as to deliver a program to a user separately from a device body and records the program therein, but also the ROM 502 which is sent to a user in a state of being incorporated into a device body in advance and records a program therein, or a hard disk included in the storage unit 513.

In addition, the program executed by the computer may be a program which performs processes in a time series according to the order described in the present specification, and may be a program which performs processes in parallel or at a necessary timing such as when accessed.

Further, in the present specification, the steps for describing programs recorded on a recording medium include not only processes performed in a time series according to the described order, but also processes performed in parallel or separately even if not necessarily performed in the time series.

In addition, in the present specification, the system refers to the entire apparatus including a plurality of devices.

Further, in the above description, a configuration described as a single device (or a processing unit) may be divided into and formed by a plurality of devices (or processing units) altogether. In contrast, in the above description, configurations described as a plurality of devices (or processing units) may be formed by a single device (or a processing unit). In addition, configurations other than those described above may be added to the configuration of each device (or each processing unit). Further, a part of the configuration of one device (or a processing unit) may be included in the configuration of another device (or another processing unit) as long as the configuration and operations of the overall system are substantially the same. That is, the present technology is not limited to the embodiments described above but can have various modifications without departing from the scope of the present technology.

The image processing apparatus according to the embodiment described above can be applied to various electronic apparatuses such as a transmitter or a receiver in delivery on satellite broadcasting, cable broadcasting such as cable TV, and the Internet, and delivery to a terminal by cellular communication, a recording apparatus which records images on media such as an optical disc, a magnetic disk, and a flash memory, and a reproduction apparatus which reproduces images from the storage media. Hereinafter, four application examples will be described.

First Application Example: Television Receiver

Figure 35:
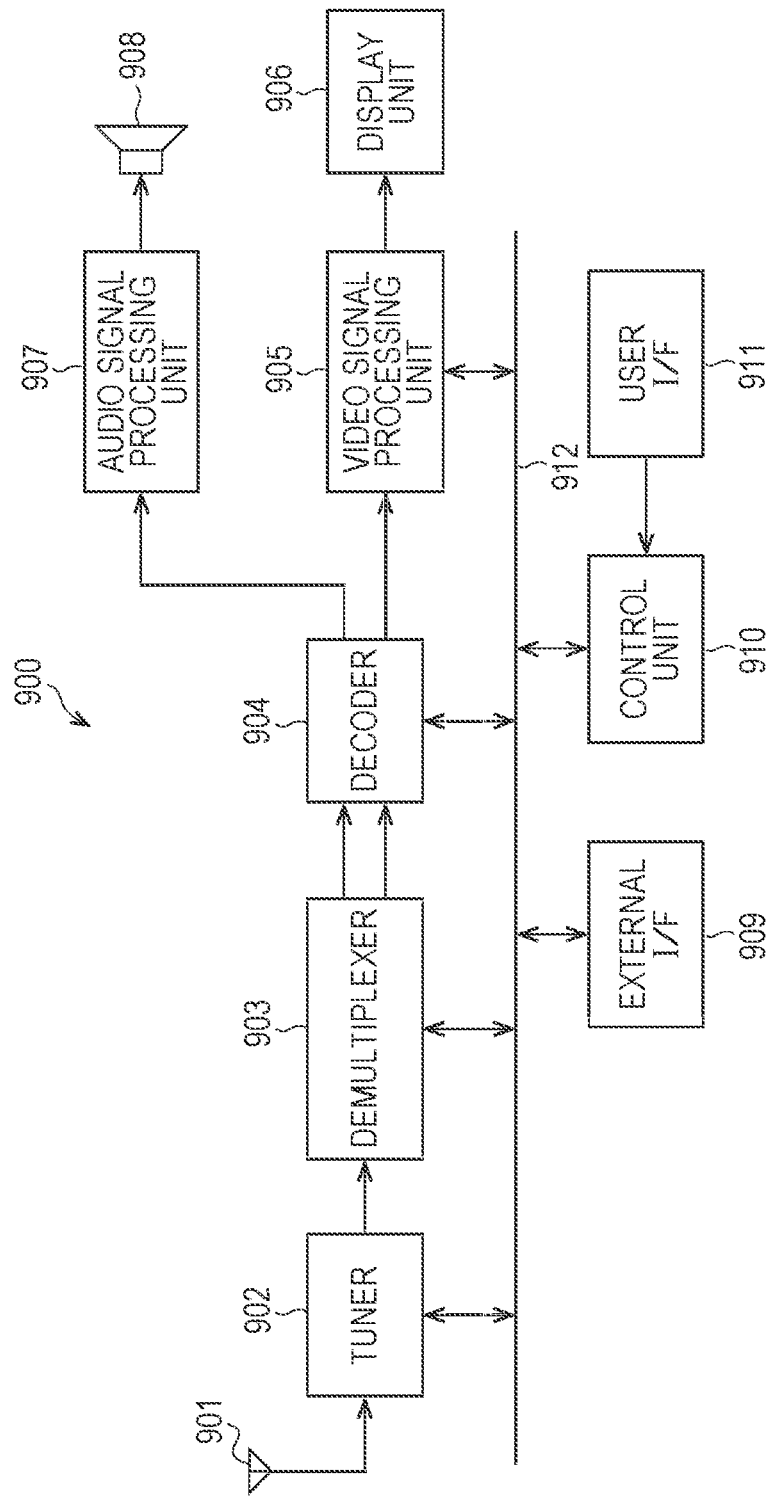
FIG. 35 is a block diagram showing an example of a schematic configuration of a television apparatus.

FIG. 35 illustrates an example of a schematic configuration of a television apparatus to which the embodiment described above is applied. The television apparatus 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcast signal which is received via the antenna 901 and demodulates the extracted signal. In addition, the tuner 902 outputs an encoded stream which is obtained through demodulation, to the demultiplexer 903. That is, the tuner 902 functions as transmission means in the television apparatus 900, for receiving the encoded stream in which an image is encoded.

The demultiplexer 903 demultiplexes an image (video) stream and an audio stream of a viewing target program from the encoded stream, and outputs the separated streams to the decoder 904. In addition, the demultiplexer 903 extracts auxiliary data such as an electronic program guide (EPG) from the encoded stream, and supplies the extracted data to the control unit 910. Further, the demultiplexer 903 may perform descrambling when the encoded stream is scrambled.

The decoder 904 decodes the image stream and the audio stream which are input from the demultiplexer 903. In addition, the decoder 904 outputs image data which is generated due to the decoding process, to the video signal processing unit 905. Further, the decoder 904 outputs audio data which is generated due to the decoding process, to the audio signal processing unit 907.

The video signal processing unit 905 reproduces the image data input from the decoder 904 so that an image is displayed on the display unit 906. In addition, the video signal processing unit 905 may display an application screen which is supplied via a network, on the display unit 906. Further, the video signal processing unit 905 may perform an additional process such as, for example, noise removal, on the image data, in accordance with settings thereof. Furthermore, the video signal processing unit 905 may generate a graphical user interface (GUI) image such as, for example, a menu, a button, or a cursor, and may superimpose the generated image on the output image.

The display unit 906 is driven by a driving signal which is supplied from the video signal processing unit 905, and displays an image on a screen of a display device (for example, a liquid crystal display, a plasma display, or an organic electroluminescence display (OLED)).

The audio signal processing unit 907 performs reproduction processes such as D/A conversion and amplification on the audio data which is input from the decoder 904, so as to allow sound to be output from the speaker 908. In addition, the audio signal processing unit 907 may perform an additional process such as noise removal on the audio data.

The external interface 909 is an interface which connects the television apparatus 900 to an external apparatus or the network. For example, an image stream or an audio stream which is received via the external interface 909 may be decoded by the decoder 904. That is, the external interface 909 also functions as transmission means in the television apparatus 900, for receiving an encoded stream in which an image is encoded.

The control unit 910 includes a processor such as a CPU, and memories such as a RAM and a ROM. The memories store a program executed by the CPU, program data, EPG data, data acquired via the network, and the like. The program stored in the memories is read and executed by the CPU, for example, when the television apparatus 900 is started. The CPU executes the program, and thus controls an operation of the television apparatus 900 in response to, for example, a manipulation signal which is input from the user interface 911.

The user interface 911 is connected to the control unit 910. The user interface 911 includes, for example, buttons and switches for a user to manipulate the television apparatus 900, a reception unit of a remote control signal, and the like. The user interface 911 generates a manipulation signal by detecting manipulation performed by a user through these constituent elements, and outputs the generated manipulation signal to the control unit 910.

The bus 912 connects the tuner 902, the demultiplexer 903, the decoder 904, the video signal processing unit 905, the audio signal processing unit 907, the external interface 909, and the control unit 910, to each other.

In the television apparatus 900 configured as described above, the decoder 904 has a function of the decoder 2000 according to the embodiment described above.

Second Application Example: Mobile Phone

Figure 36:
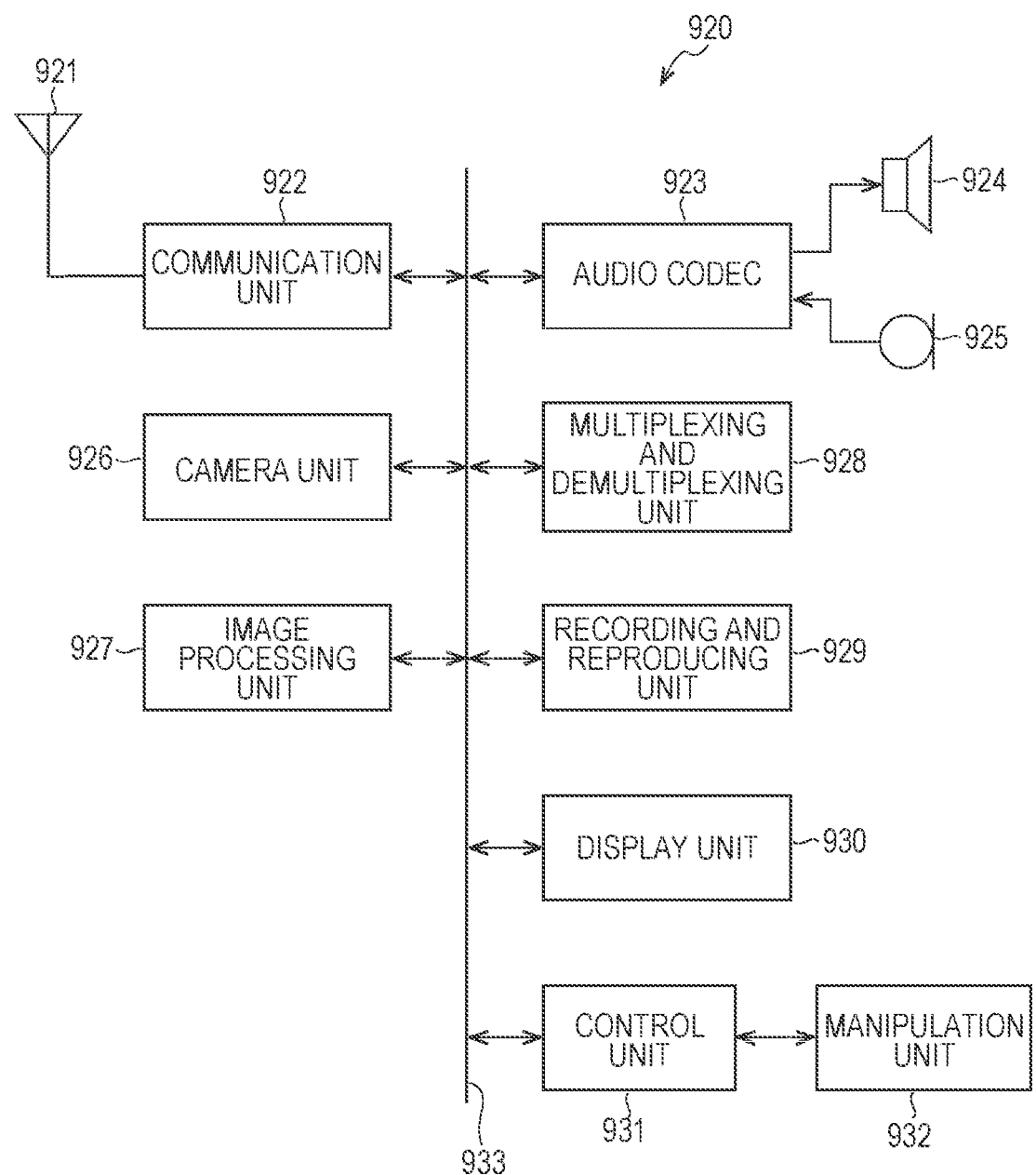
FIG. 36 is a block diagram showing an example of a schematic configuration of a mobile phone.

FIG. 36 illustrates an example of a schematic configuration of a mobile phone to which the embodiment described above is applied. The mobile phone 920 includes an antenna 921, a communication unit 922, an audio codec 923, a speaker 924, a microphone 925, a camera unit 926, an image processing unit 927, a multiplexing and demultiplexing unit 928, a recording and reproducing unit 929, a display unit 930, a control unit 931, a manipulation unit 932, and a bus 933.

The antenna 921 is connected to the communication unit 922. The speaker 924 and the microphone 925 are connected to the audio codec 923. The manipulation unit 932 is connected to the control unit 931. The bus 933 connects the communication unit 922, the audio codec 923, the camera unit 926, the image processing unit 927, the multiplexing and demultiplexing unit 928, the recording and reproducing unit 929, the display unit 930, and the control unit 931 to each other.

The mobile phone 920 performs operations such as transmission and reception of audio signals, transmission and reception of electronic mail or image data, capturing of an image, and recording of data in various operation modes including a speech mode, a data communication mode, a photographing mode, and a videophone mode.

In the speech mode, an analog audio signal generated by the microphone 925 is supplied to the audio codec 923. The audio codec 923 converts the analog audio signal into audio data, and compresses the converted audio data through A/D conversion. In addition, the audio codec 923 outputs the compressed audio data to the communication unit 922. The communication unit 922 encodes and modulates the audio data so as to generate a transmission signal. Further, the communication unit 922 transmits the generated transmission signal to a base station (not shown) via the antenna 921. Furthermore, the communication unit 922 amplifies a wireless signal which is received via the antenna 921 and converts a frequency thereof, so as to acquire a received signal. Moreover, the communication unit 922 demodulates and decodes the received signal so as to generate audio data, and outputs the generated audio data to the audio codec 923. The audio codec 923 decompresses and D/A converts the audio data so as to generate an analog audio signal. In addition, the audio codec 923 supplies the generated audio signal to the speaker 924 so as to output a sound.

In addition, in the data communication mode, for example, the control unit 931 generates text data forming an electronic mail in response to manipulation performed by a user using the manipulation unit 932. Further, the control unit 931 displays text on the display unit 930. Furthermore, the control unit 931 generates electronic mail data in response to a transmission instruction made by the user by using the manipulation unit 932, and outputs the generated electronic mail data to the communication unit 922. The communication unit 922 encodes and modulates the electronic mail data so as to generate a transmission signal. In addition, the communication unit 922 transmits the generated transmission signal to the base station (not shown) via the antenna 921. Further, the communication unit 922 amplifies a wireless signal which is received via the antenna 921 and converts a frequency thereof so as to acquire a received signal. Furthermore, the communication unit 922 demodulates and decodes the received signal so as to recover electronic mail data, and outputs the recovered electronic mail data to the control unit 931. The control unit 931 displays content of the electronic mail on the display unit 930 and stores the electronic mail data on a recording medium of the recording and reproducing unit 929.

The recording and reproducing unit 929 includes an arbitrary readable and writable storage medium. For example, the storage medium may be a built-in storage medium such as a RAM or a flash memory, and may be an externally attached storage medium such as a hard disk, a magnetic disk, a magneto-optical disc, an optical disc, an unallocated space bitmap (USB) memory, or a memory card.

In addition, in the photographing mode, for example, the camera unit 926 images a subject so as to generate image data, and outputs the generated image data to the image processing unit 927. The image processing unit 927 encodes the image data which is input from the camera unit 926, and stores the encoded stream on the storage medium of the recording and reproducing unit 929.

Further, in the videophone mode, for example, the multiplexing and demultiplexing unit 928 multiplexes the image stream which has been encoded by the image processing unit 927 and the audio stream which is input from the audio codec 923, and outputs the multiplexed stream to the communication unit 922. The communication unit 922 encodes and modulates the stream so as to generate a transmission signal. Furthermore, the communication unit 922 transmits the generated transmission signal to the base station (not shown) via the antenna 921. In addition, the communication unit 922 amplifies a wireless signal which is received via the antenna 921 and converts a frequency thereof so as to acquire a received signal. An encoded stream can be included in the transmission signal and received signal. Further, the communication unit 922 demodulates and decodes the received signal so as to recover a stream, and outputs the recovered stream to the multiplexing and demultiplexing unit 928. The multiplexing and demultiplexing unit 928 demultiplexes an image stream and an audio stream from the input stream, and outputs the video stream to the image processing unit 927 and the audio stream to the audio codec 923. The image processing unit 927 decodes the image stream so as to generate image data. The image data is supplied to the display unit 930 so as to allow a series of images to be displayed on the display unit 930. The audio codec 923 decompresses and D/A converts the audio stream so as to generate an analog audio signal. Furthermore, the audio codec 923 supplies the generated audio signal to the speaker 924 so as to output a sound.

In the mobile phone 920 with the above configuration, the image processing unit 927 has functions of the encoder 1000 and the decoder 2000 according to the embodiment described above.

Third Application Example: Recording and Reproducing Apparatus

Figure 37:
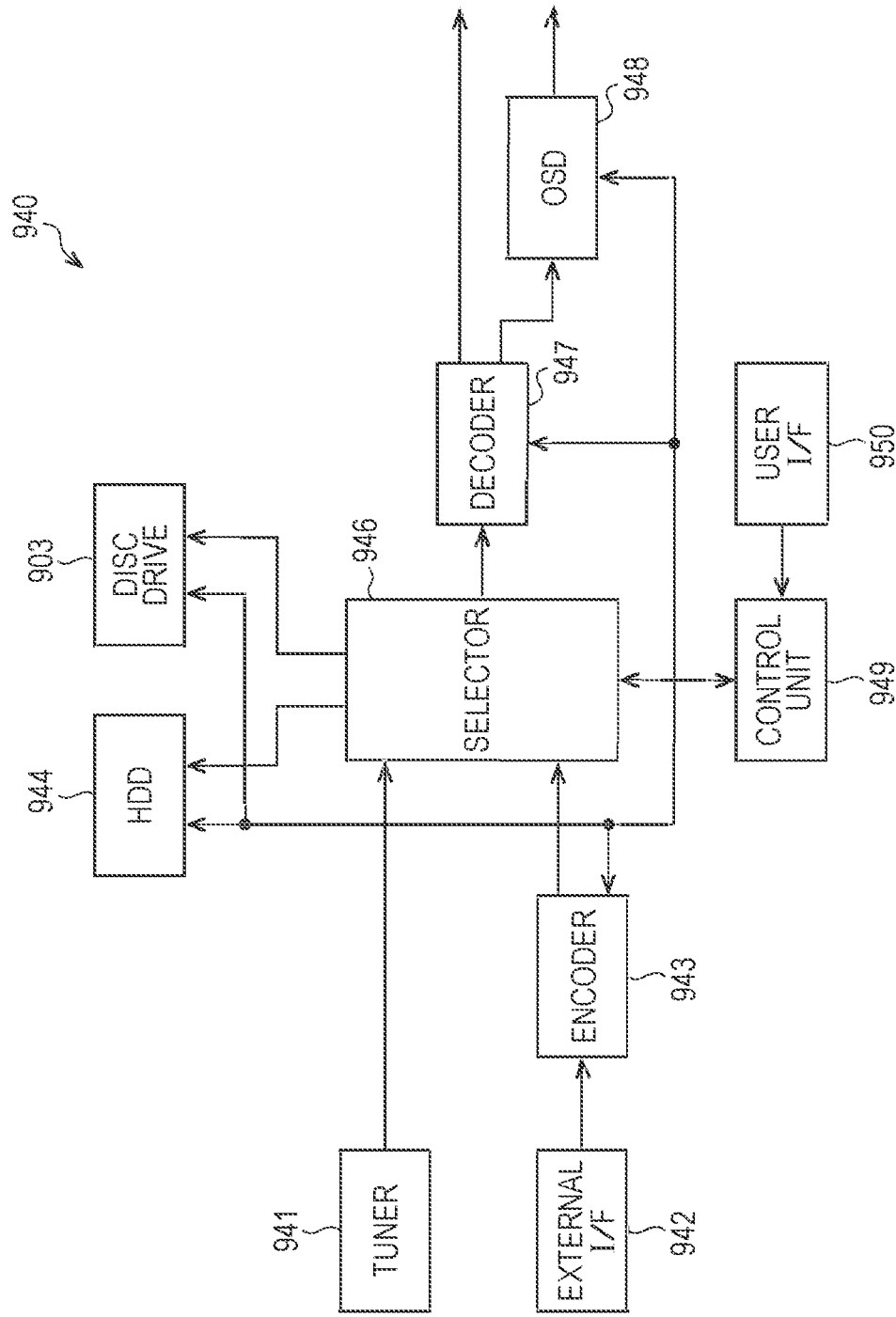
FIG. 37 is a block diagram showing an example of a schematic configuration of a recording and reproducing apparatus.

FIG. 37 illustrates an example of a schematic configuration of a recording and reproducing apparatus to which the embodiment described above is applied. The recording and reproducing apparatus 940 encodes, for example, audio data and image data of a received broadcast program, and records the encoded data on a recording medium. In addition, the recording and reproducing apparatus 940 may encode, for example, audio data and image data which are acquired from other apparatuses, and may record the encoded data on the recording medium. Further, the recording and reproducing apparatus 940 reproduces the data recorded on the recording medium on a monitor and a speaker, for example, in response to an instruction from a user. At that time, the recording and reproducing apparatus 940 decodes the audio data and the image data.

The recording and reproducing apparatus 940 includes a tuner 941, an external interface 942, an encoder 943, a hard disk drive (HDD) 944, a disc drive 945, a selector 946, a decoder 947, an on-screen display (OSD) 948, a control unit 949, and a user interface 950.

The tuner 941 extracts a signal of a desired channel from a broadcast signal which is received via an antenna (not shown) and demodulates the extracted signal. In addition, the tuner 941 outputs an encoded stream which is obtained through demodulation, to the selector 946. That is, the tuner 941 functions as transmission means in the recording and reproducing apparatus 940.

The external interface 942 is an interface which connects the recording and reproducing apparatus 940 to an external apparatus or a network. The external interface 942 may be, for example, an IEEE1394 interface, a network interface, a USB interface, a flash memory interface, or the like. For example, image data and audio data which are received via the external interface 942 are input to the encoder 943. That is, the external interface 942 functions as transmission means in the recording and reproducing apparatus 940.

The encoder 943 encodes the image data and the audio data in a case where the image data and the audio data input from the external interface 942 are not encoded. In addition, the encoder 943 outputs the encoded stream to the selector 946.

The HDD 944 records an encoded stream in which content data such as an image and a sound is compressed, various programs, and other data in an internal hard disk. In addition, the HDD 944 reads out the data from the hard disk when the image and the sound are reproduced.

The disc drive 945 records and reads out data on and from a recording medium which is mounted therein. The recording medium mounted in the disc drive 945 may be, for example, a DVD disc (DVD-Video, DVD-RAM, DVD-R, DVD-RW, DVD+R, DVD+RW, or the like), a Blu-ray (registered trademark) disc, or the like.

When an image and a sound are recorded, the selector 946 selects an encoded stream which is input from the tuner 941 or the encoder 943, and outputs the selected encoded stream to the HDD 944 or the disc drive 945. In addition, when an image and a sound are reproduced, the selector 946 outputs an encoded stream which is input from the HDD 944 or the disc drive 945, to the decoder 947.

The decoder 947 decodes the encoded stream so as to generate image data and audio data. In addition, the decoder 947 outputs the generated image data to the OSD 948. Further, the decoder 904 outputs the generated audio data to an external speaker.

The OSD 948 reproduces the image data which is input from the decoder 947 so as to display an image. In addition, the OSD 948 may superimpose a GUI image such as, for example, a menu, a button, or a cursor on the displayed image.

The control unit 949 includes a processor such as a CPU, and memories such as a RAM and a ROM. The memories store a program executed by the CPU, program data, and the like. The program stored in the memories is read and executed by the CPU, for example, when the recording and reproducing apparatus 940 is started. The CPU executes the program, and thus controls an operation of the recording and reproducing apparatus 940 in response to, for example, a manipulation signal which is input from the user interface 950.

The user interface 950 is connected to the control unit 949. The user interface 950 includes, for example, buttons and switches which allow a user to manipulate the recording and reproducing apparatus 940, a reception unit of a remote control signal, and the like. The user interface 950 generates a manipulation signal by detecting manipulation performed by a user via these constituent elements, and outputs the generated manipulation signal to the control unit 949.

In the recording and reproducing apparatus 940 with the above configuration, the encoder 943 has a function of the encoder 1000 according to the embodiment described above. In addition, the decoder 947 has a function of the decoder 2000 according to the embodiment described above.

Fourth Application Example: Imaging Apparatus

Figure 38:
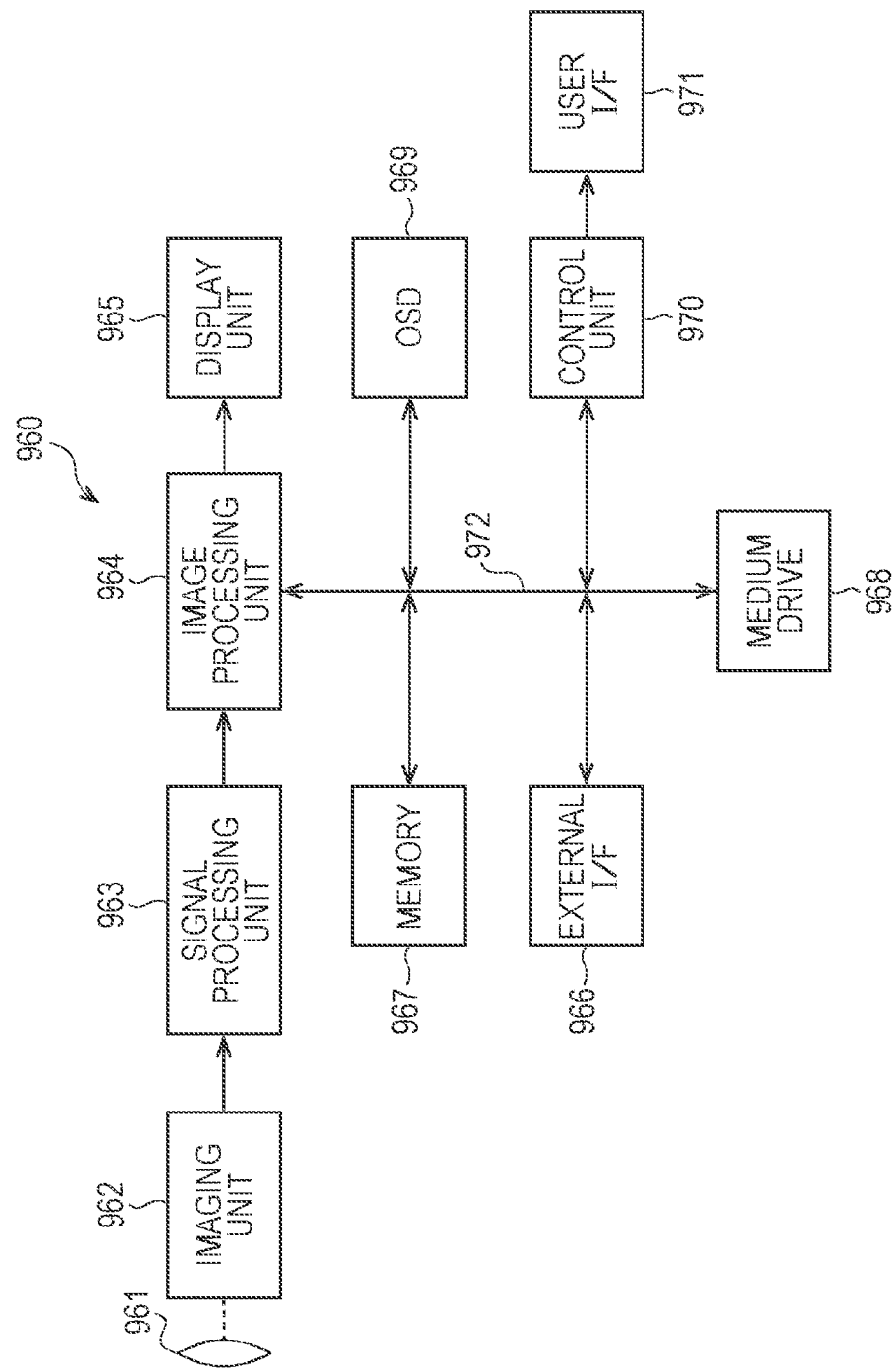
FIG. 38 is a block diagram showing an example of a schematic configuration of an imaging apparatus.

FIG. 38 illustrates an example of a schematic configuration of an imaging apparatus to which the embodiment described above is applied. The imaging apparatus 960 images a subject so as to generate an image, and encodes image data so as to record the encoded data on a recording medium.

The imaging apparatus 960 includes an optical block 961, an imaging unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970 to each other.

The optical block 961 includes a focus lens, a diaphragm mechanism, and the like. The optical block 961 forms an optical image of a subject on an imaging surface of the imaging unit 962. The imaging unit 962 includes an image sensor such as a charge coupled device (CCD) or a complementary metal oxide semiconductor (CMOS), and converts the optical image formed on the imaging surface into an image signal as an electrical signal through photoelectric conversion. In addition, the imaging unit 962 outputs the image signal to the signal processing unit 963.

The signal processing unit 963 performs various camera signal processes such as knee correction, gamma correction, and color correction on the image signal which is input from the imaging unit 962. The signal processing unit 963 outputs the image data having undergone the camera signal processes to the image processing unit 964.

The image processing unit 964 encodes the image data which is input from the signal processing unit 963 so as to generate encoded data. In addition, the image processing unit 964 outputs the generated encoded data to the external interface 966 or the medium drive 968. Further, the image processing unit 964 decodes the encoded data which is input from the external interface 966 or the medium drive 968, so as to generate image data. Furthermore, the image processing unit 964 outputs the generated image data to the display unit 965. Moreover, the image processing unit 964 may output image data which is input from the signal processing unit 963, to the display unit 965, so as to display an image. In addition, the image processing unit 964 may superimpose display data which is acquired from the OSD 969, on an image which is output to the display unit 965.

The OSD 969 generates a GUI image such as, for example, a menu, a button, or a cursor, and outputs the generated image to the image processing unit 964.

The external interface 966 is formed by, for example, a USB input and output terminal. The external interface 966 connects the imaging apparatus 960 to a printer, for example, when an image is printed. In addition, the external interface 966 is connected to a drive as necessary. A removable medium such as, for example, a magnetic disk or an optical disc can be mounted in the drive, and a program read out from the removable medium can be installed in the imaging apparatus 960. Further, the external interface 966 may be configured as a network interface which is connected to a network such as a LAN or the Internet. That is, the external interface 966 functions as transmission means in the imaging apparatus 960.

A recording medium mounted in the medium drive 968 may be any readable and writable removable medium such as, for example, a magnetic disk, a magneto-optical disc, an optical disc, or a semiconductor memory. In addition, a recording medium may be fixedly mounted in the medium drive 968, so as to configure a non-portable storage unit such as, for example, a built-in hard disk drive or a solid state drive (SSD).

The control unit 970 includes a processor such as a CPU, and memories such as a RAM and a ROM. The memories store a program executed by the CPU, program data, and the like. The program stored in the memories is read and executed by the CPU, for example, when the imaging apparatus 960 is started. The CPU executes the program, and thus controls an operation of the imaging apparatus 960 in response to, for example, a manipulation signal which is input from the user interface 971.

The user interface 971 is connected to the control unit 970. The user interface 971 includes, for example, buttons and switches which allow a user to manipulate the imaging apparatus 960, and the like. The user interface 971 generates a manipulation signal by detecting manipulation performed by a user via these constituent elements, and outputs the generated manipulation signal to the control unit 970.

In the imaging apparatus 960 with the above configuration, the image processing unit 964 has functions of the encoder 1000 and the decoder 2000 according to the embodiment described above.

[Application to Multi-View Image Encoding and Multi-View Image Decoding]

Figure 39:
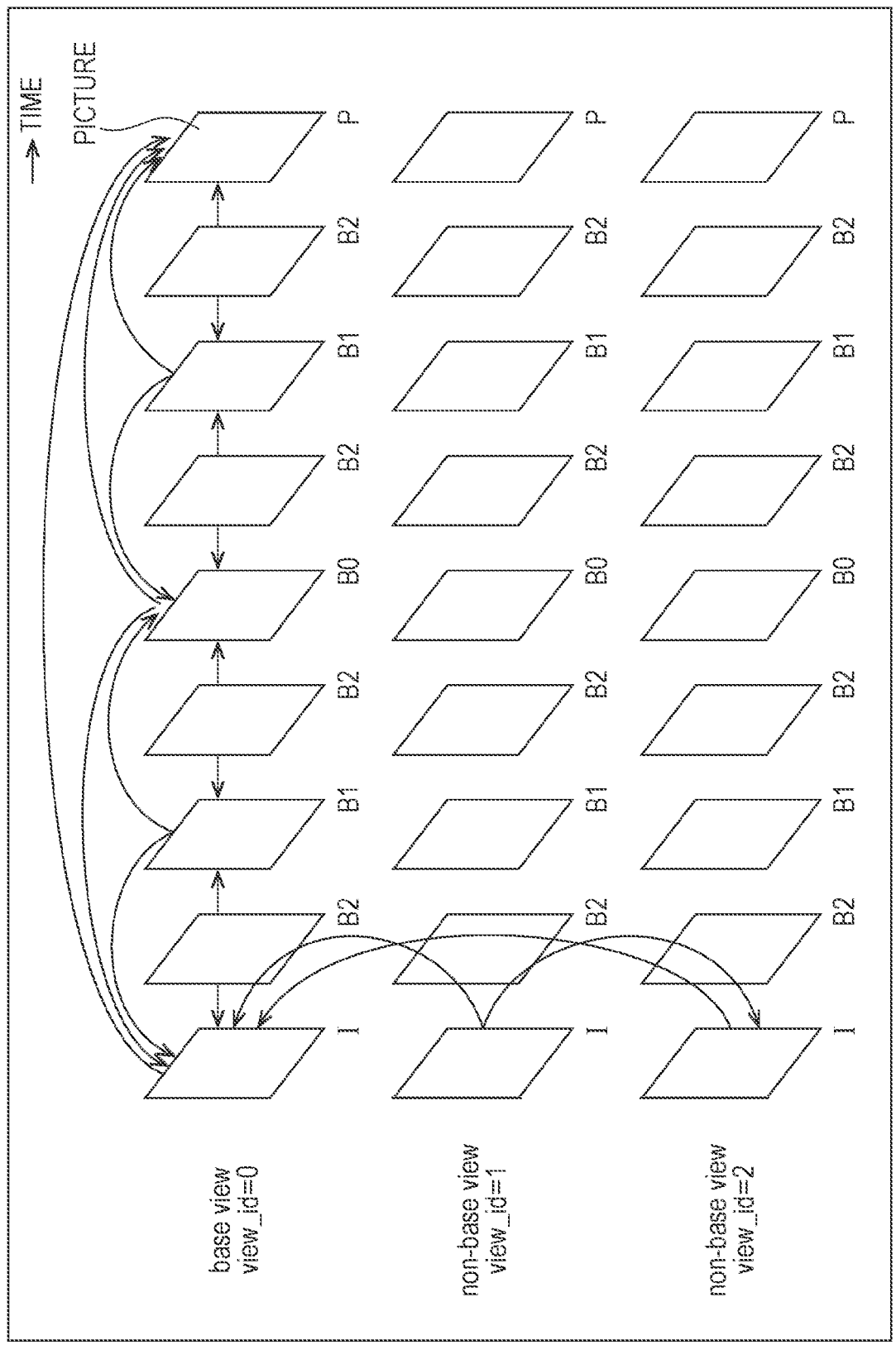
FIG. 39 is a diagram showing an example of a multi-view image encoding method.

FIG. 39 is a diagram illustrating an example of a multi-view image encoding method.

The series of processes described above can be applied to multi-view image encoding and multi-view image decoding.

As shown in FIG. 39, multi-view images include images from a plurality of views, and an image from a certain view among the plurality of views is designated as a base view image. The images from the respective views other than the base view image are treated as non-base view images.

In FIG. 39, three-view images are present as multi-view images, and an image having 0 as view_id for identifying an image at each view is a base view image. In addition, images having view_id of 1 and 2 are non-base view images.

Here, in the multi-view image encoding and multi-view image decoding, the base view image is processed (encoded and decoded) without referring to images at other views. On the other hand, the non-base view image can be processed by referring to images at other views. In FIG. 39, the arrow indicates reference of an image, and an image on the start point of the arrow can be processed by referring to an image on the end point of the arrow as necessary.

In a case where the multi-view images as shown in FIG. 39 are encoded and decoded, each view image is encoded and decoded, and the technique for the image processing apparatus of FIG. 16 can be applied to encoding and decoding of each view. Accordingly, as described above, it is possible to prevent an increase in cost.

In addition, in the encoding and decoding of each view, the flag and other information used for the technique for the image processing apparatus of FIG. 16 can be shared.

[Multi-View Image Encoding Device]

Figure 40:
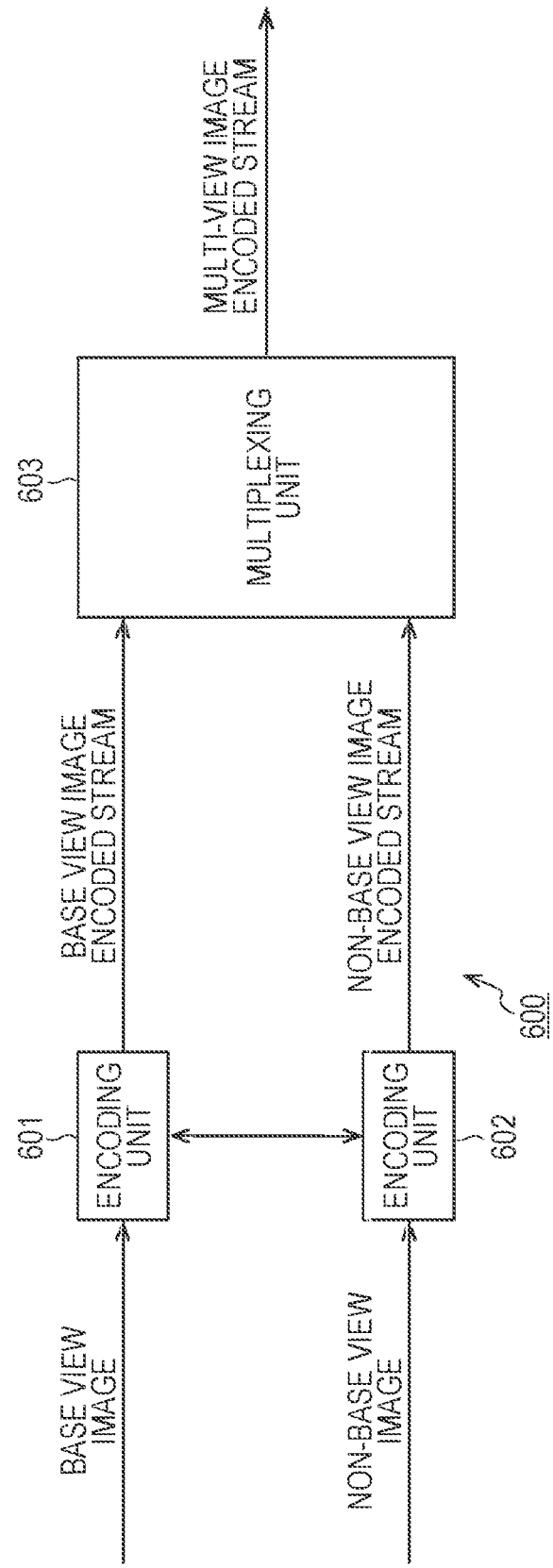
FIG. 40 is a diagram showing a main configuration example of a multi-view image encoding device to which the present technology is applied.

FIG. 40 is a block diagram illustrating a configuration example of a multi-view image encoding device which performs the multi-view image encoding described above.

As shown in FIG. 40, the multi-view image encoding device 600 includes an encoding unit 601, an encoding unit 602, and a multiplexing unit 603, and encodes multi-view images formed by two-view images including, for example, a base view image and a non-base view image. As the multi-view images formed by two-view images, there are, for example, three-dimensional (3D) images formed by a left eye image which is observed with the left eye and a right eye image which is observed with the right eye.

The encoding unit 601 encodes the base view image so as to generate a base view image encoded stream. The encoding unit 602 encodes the non-base view image while referring to the base view image (a base view image which is encoded by the encoding unit 601 and is locally decoded) as necessary, so as to generate a non-base view image encoded stream. The multiplexing unit 603 multiplexes the base view image encoded stream generated in the encoding unit 601 and the non-base view image encoded stream generated in the encoding unit 602, so as to generate a multi-view image encoded stream.

The technique for the encoder 1000 of the image processing apparatus of FIG. 16 can be applied to the encoding unit 601 and the encoding unit 602 of the multi-view image encoding device 600. In addition, as described above, the encoding unit 601 and the encoding unit 602 can share the flag and other information.

[Multi-View Image Decoding Device]

Figure 41:
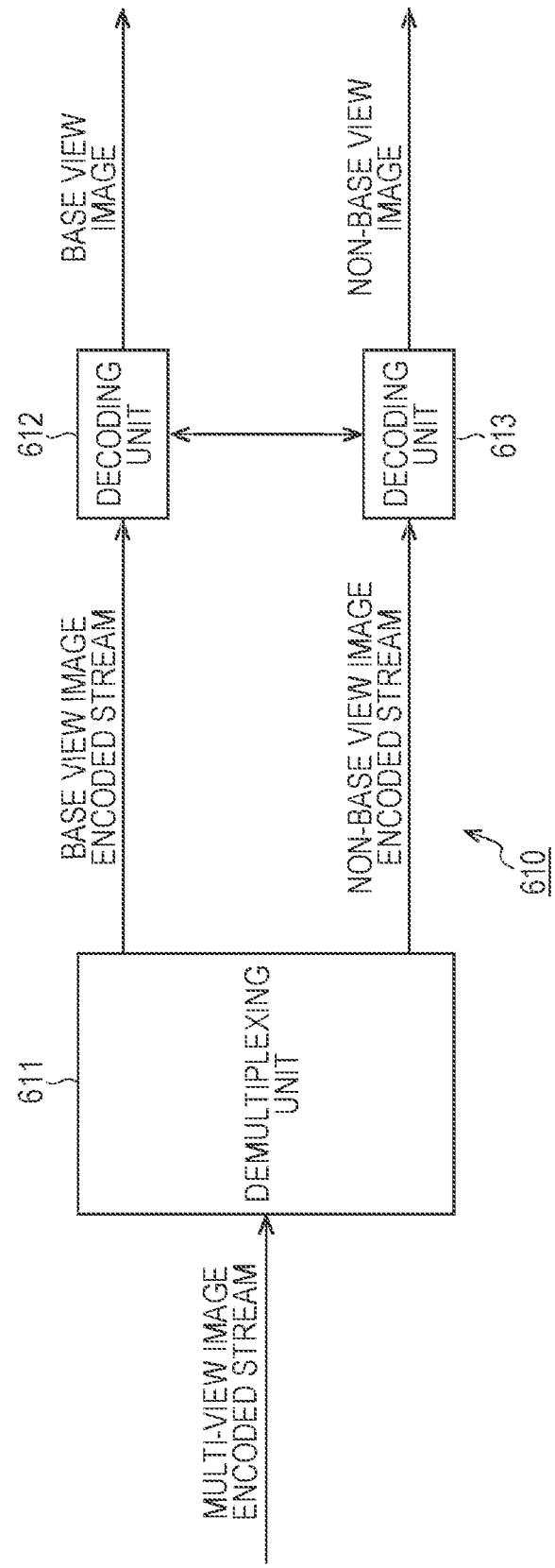
FIG. 41 is a diagram showing a main configuration example of a multi-view image decoding device to which the present technology is applied.

FIG. 41 is a block diagram illustrating a configuration example of a multi-view image decoding device which performs the multi-view image decoding described above.

As shown in FIG. 41, the multi-view image decoding device 610 includes a demultiplexing unit 611, a decoding unit 612, and a decoding unit 613, and decodes, for example, the multi-view image encoded stream obtained by the multi-view image encoding device of FIG. 40.

The demultiplexing unit 611 demultiplexes the multi-view image encoded stream into which the base view image encoded stream and the non-base view image encoded stream are multiplexed, so as to extract the base view image encoded stream and the non-base view image encoded stream. The decoding unit 612 decodes the base view image encoded stream extracted by the demultiplexing unit 611 so as to obtain a base view image. The decoding unit 613 decodes the non-base view image encoded stream extracted by the demultiplexing unit 611 while referring to the base view image which is decoded by the decoding unit 612 as necessary, so as to obtain a non-base view image.

The decoder 2000 of the image processing apparatus of FIG. 16 can be applied to the decoding unit 612 and the decoding unit 613 of the multi-view image decoding device 610. In addition, as described above, the decoding unit 612 and the decoding unit 613 can share the flag and other information.

[Application to Hierarchical Layer Image Encoding and Hierarchical Layer Image Decoding]

Figure 42:
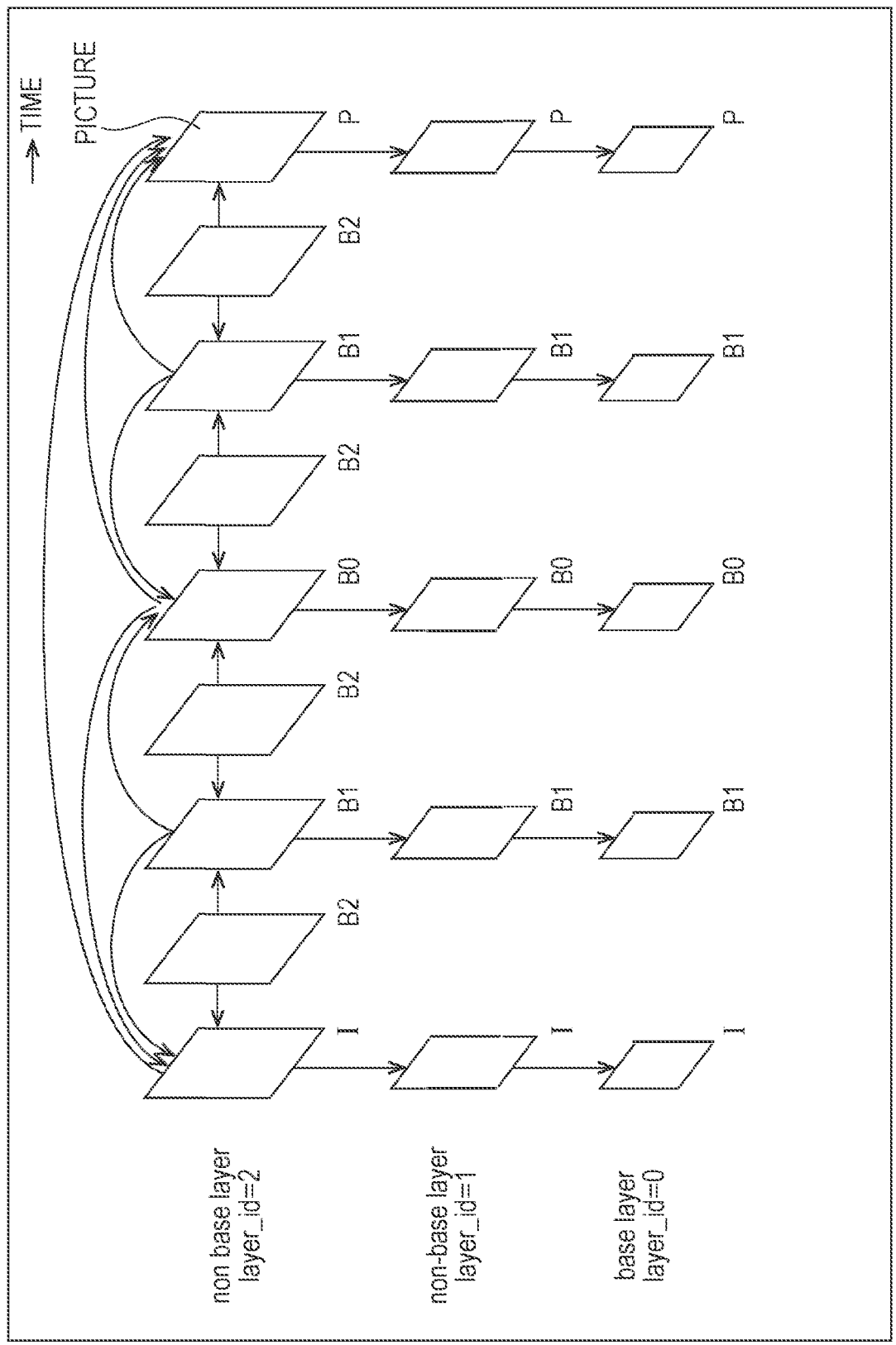
FIG. 42 is a diagram showing an example of a hierarchical layer image encoding method.

FIG. 42 is a diagram illustrating an example of a hierarchical layer image encoding method.

The series of processes described above can be applied to hierarchical layer image encoding and hierarchical layer image decoding.

As shown in FIG. 42, hierarchical layer images include images of a plurality of hierarchical layers (resolutions), and an image (for example, an image with the lowest resolution) of a certain layer among the plurality of hierarchical layers is designated as a base layer image. The images of the respective hierarchical layers other than the base layer image are treated as non-base layer images.

In FIG. 42, three-hierarchical layer images are present as hierarchical layer images, and an image having 0 as layer_id for identifying an image of each layer is a base layer image. In addition, images having layer_id of 1 and 2 are non-base layer images. Further, the non-base layer image having layer_id of 2 is, for example, an image with an original resolution of certain content, and the non-base layer image having layer_id of 1 is, for example, an image which is obtained by deteriorating the resolution of the non-base layer image having layer_id of 2. Furthermore, the base layer image having layer_id of 0 is an image which is obtained by deteriorating the resolution of the non-base layer image having layer_id of 1.

Here, in the hierarchical layer image encoding and hierarchical layer image decoding, the base layer image is processed (encoded and decoded) without referring to images of other layers (hierarchical layer). On the other hand, the non-base layer image can be processed by referring to images of other layers. In FIG. 42, in the same manner as in FIG. 39, the arrow indicates reference of an image, and an image on the start point of the arrow can be processed by referring to an image on the end point of the arrow as necessary.

In a case where the hierarchical layer images as shown in FIG. 42 are encoded and decoded, each hierarchical layer image is encoded and decoded, and the technique of the image processing apparatus of FIG. 16 can be applied to encoding and decoding of each hierarchical layer. Accordingly, as described above, it is possible to prevent an increase in a cost.

In addition, in the encoding and decoding of each hierarchical layer, the flag and other information used for the technique for the image processing apparatus of FIG. 16 can be shared.

[Hierarchical Layer Image Encoding Device]

Figure 43:
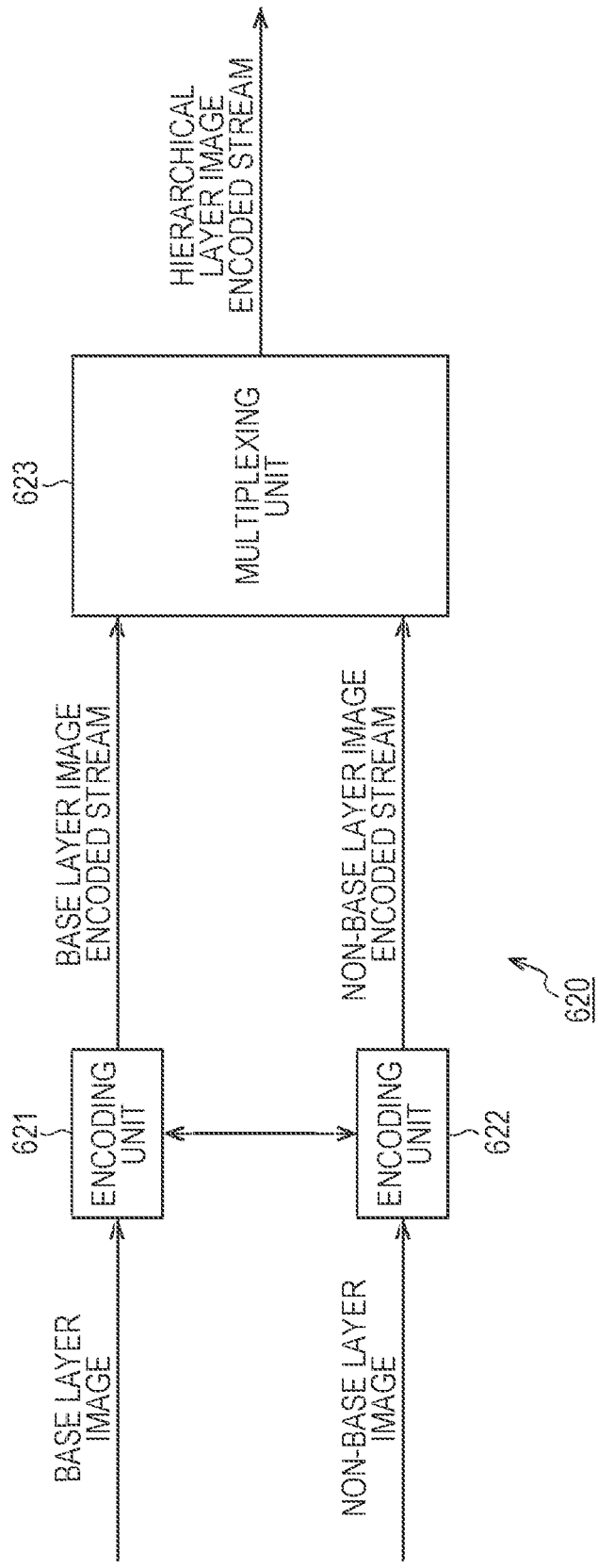
FIG. 43 is a diagram showing a main configuration example of a hierarchical layer image encoding device to which the present technology is applied.

FIG. 43 is a block diagram illustrating a configuration example of a hierarchical layer image encoding device which performs the hierarchical layer image encoding described above.

As shown in FIG. 43, the hierarchical layer image encoding device 620 includes an encoding unit 621, an encoding unit 622, and a multiplexing unit 623, and encodes hierarchical layer images formed by two-hierarchical layer images including, for example, a base layer image and a non-base layer image.

The encoding unit 621 encodes the base layer image so as to generate a base layer image encoded stream. The encoding unit 622 encodes the non-base layer image while referring to the base layer image (a base layer image which is encoded by the encoding unit 621 and is locally decoded) as necessary, so as to generate a non-base layer image encoded stream. The multiplexing unit 623 multiplexes the base layer image encoded stream generated in the encoding unit 621 and the non-base layer image encoded stream generated in the encoding unit 622, so as to generate a hierarchical layer image encoded stream.

The technique for the encoder 1000 of the image processing apparatus of FIG. 16 can be applied to the encoding unit 621 and the encoding unit 622 of the hierarchical layer image encoding device 620. In addition, as described above, the encoding unit 621 and the encoding unit 622 can share the flag and other information.

[Hierarchical Layer Image Decoding Device]

Figure 44:
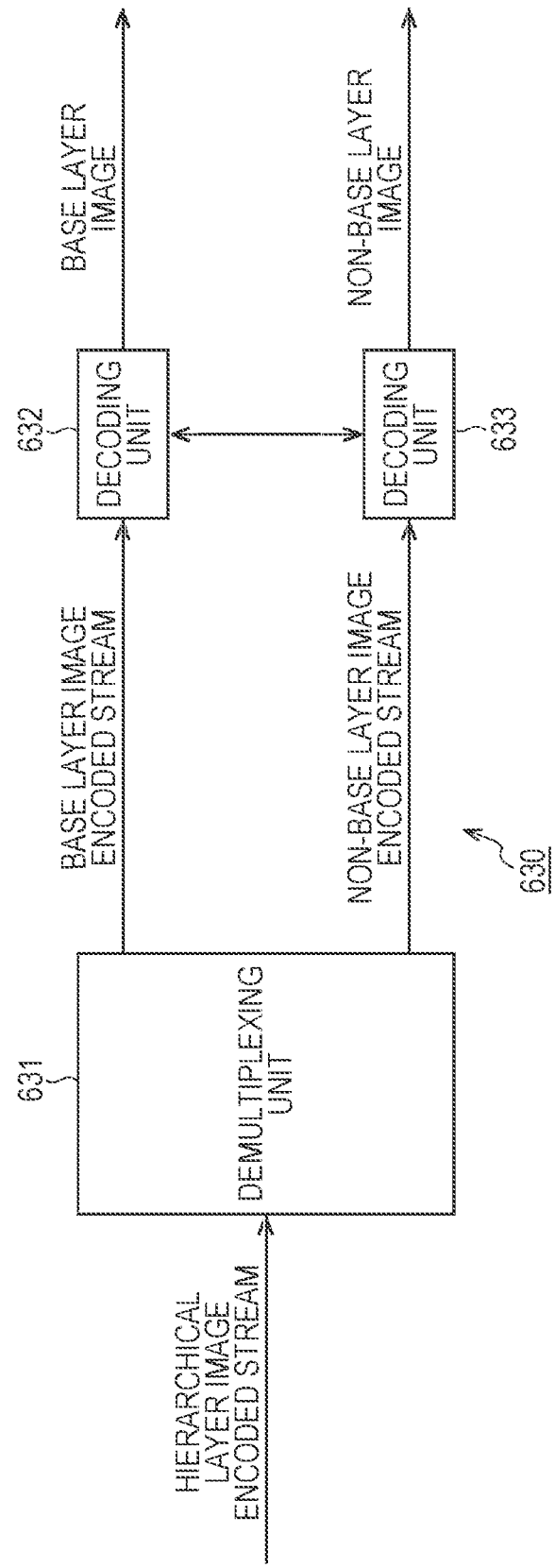
FIG. 44 is a diagram showing a main configuration example of a hierarchical layer image decoding device to which the present technology is applied.

FIG. 44 is a block diagram illustrating a configuration example of a layer image decoding device which performs the hierarchical layer image decoding described above.

As shown in FIG. 44, the hierarchical layer image decoding device 630 includes a demultiplexing unit 631, a decoding unit 632, and a decoding unit 633, and decodes, for example, the hierarchical layer image encoded stream obtained by the hierarchical layer image encoding device of FIG. 43.

The demultiplexing unit 631 demultiplexes the hierarchical layer image encoded stream into which the base layer image encoded stream and the non-base layer image encoded stream are multiplexed, so as to extract the base layer image encoded stream and the non-base layer image encoded stream. The decoding unit 632 decodes the base layer image encoded stream extracted by the demultiplexing unit 631 so as to obtain a base layer image. The decoding unit 633 decodes the non-base layer image encoded stream extracted by the demultiplexing unit 631 while referring to the base layer image which is decoded by the decoding unit 632 as necessary, so as to obtain a non-base layer image.

The technique the decoder 2000 of the image processing apparatus of FIG. 16 can be applied to the decoding unit 632 and the decoding unit 633 of the hierarchical layer image decoding device 630. In addition, as described above, the decoding unit 632 and the decoding unit 633 can share the flag and other information.

Examples of Using Hierarchical Layer Image Encoding Method

Examples of using the hierarchical layer image encoding method described above will be described.

First Example of Using Hierarchical Layer Image Encoding Method

Figure 45:
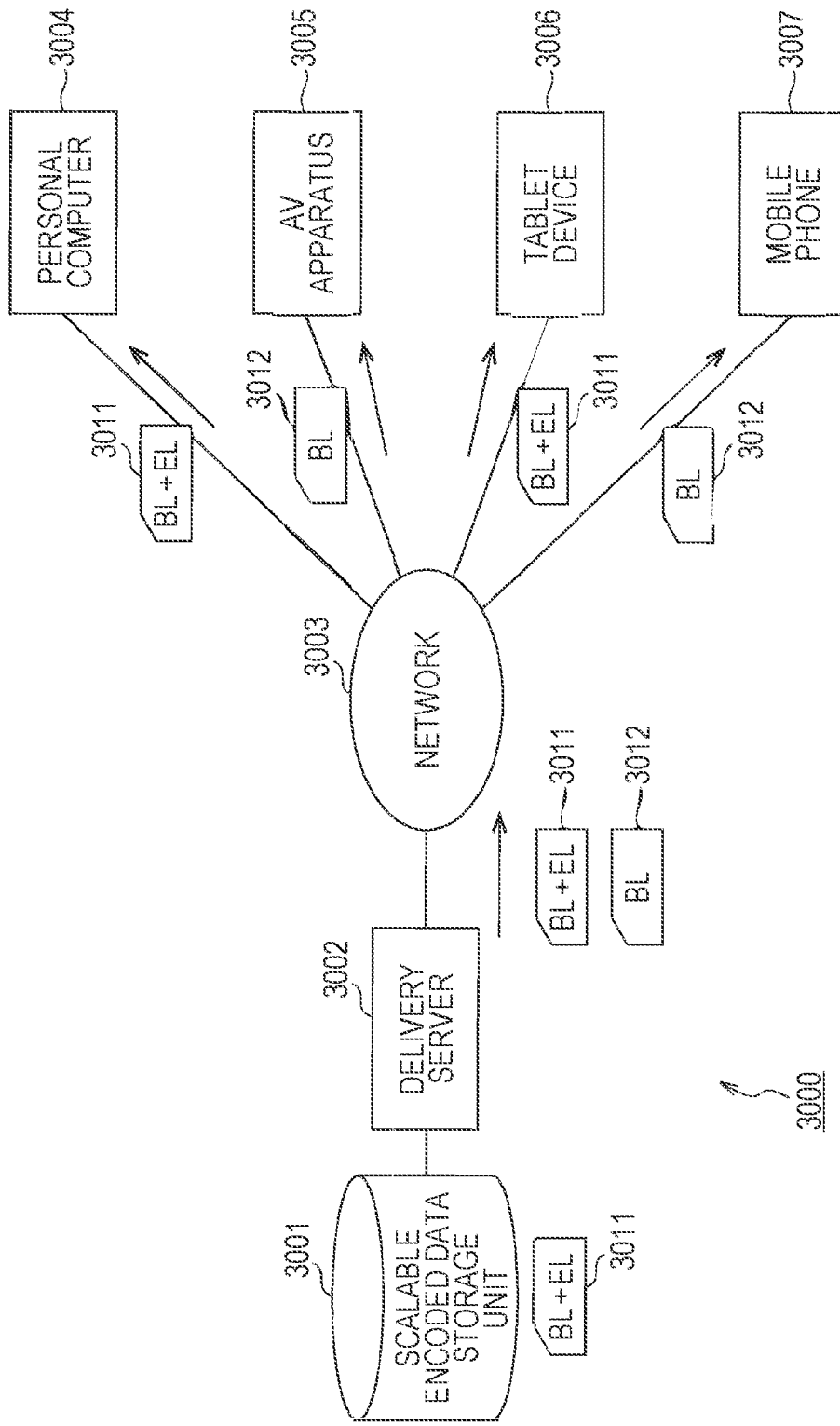
FIG. 45 is a block diagram showing an example of usage of scalable encoding.

FIG. 45 is a diagram illustrating a first example of using the hierarchical layer image encoding method.

The hierarchical layer image encoding (hereinafter, also referred to as scalable encoding) can be used, for example, to select data to be transmitted as in an example shown in FIG. 45.

In a data transmission system 3000 shown in FIG. 45, scalable encoded data which is obtained by scalably encoding a hierarchical layer image is stored in a scalable encoded data storage unit 3001.

A delivery server 3002 reads out the scalable encoded data stored in the scalable encoded data storage unit 3001, and delivers the scalable encoded data to terminal apparatuses such as a personal computer 3004, an AV apparatus 3005, a tablet device 3006, and a mobile phone 3007 via a network 3003.

At that time, the delivery server 3002 selects and transmits encoded data with appropriate quality (resolution and the like) based on performances of the terminal apparatuses, communication circumstances, or the like. Even if the delivery server 3002 unnecessarily transmits high quality data, it cannot be said that a high quality image is obtained in the terminal apparatus, and there is a concern that delay or overflow may occur. In addition, there is a concern that high quality data may unnecessarily occupy a communication band, and may unnecessarily increase a load on the terminal apparatus. Conversely, if the delivery server 3002 merely transmits low quality data, it is difficult to obtain a high quality image even if performances of the terminal apparatuses or communication circumstances are sufficient. For this reason, the delivery server 3002 reads out and transmits encoded data with quality (layer) which is suitable for the performances of the terminal apparatuses or the communication circumstances from the scalable encoded data storage unit 3001, as appropriate.

Here, in FIG. 45, the scalable encoded data storage unit 3001 stores scalable encoded data (BL+EL) 3011. The scalable encoded data (BL+EL) 3011 is a hierarchical layer image encoded stream into which a base layer image encoded stream BL and a non-base layer image encoded stream EL are multiplexed.

The base layer image encoded stream BL is encoded data obtained by encoding a base layer image. In addition, the non-base layer image encoded stream EL is encoded data obtained by encoding a non-base layer (enhance layer) image while referring to the base layer image as necessary.

Therefore, the scalable encoded data (BL+EL) 3011 is encoded data which includes images of both the base layer and the non-base layer, and is data which allows both the base layer image and the non-base layer image to be obtained through decoding.

The delivery server 3002 selects an appropriate layer based on a performance of a terminal apparatus which receives data (receives delivered data) or communication circumstances, and reads out data (necessary to decode an image) of the layer from the scalable encoded data storage unit 3001. For example, the delivery server 3002 reads out the scalable encoded data (BL+EL) 3011 which has high quality (which allows a high quality image to be obtained) from the scalable encoded data storage unit 3001, and transmits the data as it is, for the personal computer 3004 or the tablet device 3006 having a high processing performance. In contrast, for example, for the AV apparatus 3005 or the mobile phone 3007 having a low processing performance, the delivery server 3002 extracts base layer data (base layer image encoded stream BL) from the scalable encoded data (BL+EL) 3011, and transmits the data as scalable encoded data (BL) 3012 which is data of the same content as that of the scalable encoded data (BL+EL) 3011 in terms of content but has lower quality than the scalable encoded data (BL+EL) 3011.

As described above, since a data amount can be easily adjusted by using the scalable encoded data, it is possible to suppress the occurrence of delay or overflow or to suppress an unnecessary increase in a load on a terminal apparatus or a communication medium.

In addition, in the scalable encoding, since encoding of a non-base layer (enhance layer) image is performed while referring to a base layer image, redundancy between layers is reduced in the scalable encoded data (BL+EL) 3011, and thus a data amount becomes smaller than in a case where a non-base layer image is encoded without referring to images of other layers, that is, in an independent manner. Therefore, a storage region of the scalable encoded data storage unit 3001 can be used more efficiently.

In addition, various apparatuses such as the personal computer 3004 to the mobile phone 3007 can be employed as terminal apparatuses which receive data from the delivery server 3002, and there are various performances of hardware of the terminal apparatuses vary. Further, there are various applications which are executed by the terminal apparatuses, and there are also various performances of software thereof. Furthermore, all communication line networks including a wired network, a wireless network, or both networks, such as, for example, the Internet or a local area network (LAN) can be employed as the network 3003 which is a communication medium, and there are various data transmission performances. Moreover, a data transmission performance of the network 3003 serving as a communication medium may vary depending on a traffic amount or other communication circumstances.

Therefore, before starting data transmission, the delivery server 3002 can perform communication with a terminal apparatus which is a transmission destination of the data, so as to obtain information regarding performances of the terminal apparatus such as a hardware performance of the terminal apparatus and a performance of an application (software) executed by the terminal apparatus, and information regarding communication circumstances such as an available bandwidth of the network 3003. In addition, the delivery server 3002 can select an appropriate layer based on the information regarding the performances of the terminal apparatus and the information regarding the communication circumstances.

Further, the extraction of the scalable encoded data (BL) 3012 from the scalable encoded data (BL+EL) 3011 can be performed by the terminal apparatus as well as by the delivery server 3002. For example, the personal computer 3004 can not only decode the scalable encoded data (BL+EL) 3011 which is transmitted from the delivery server 3002 so as to display a non-base layer image, but also extract the base layer scalable encoded data (BL) 3012 from the scalable encoded data (BL+EL) 3011 which is transmitted from the delivery server 3002 so as to store the data, in order to transmit the data to other devices, or to decode the data for display of a base layer image.

Of course, the number of scalable encoded data storage units 3001, the number of delivery servers 3002, the number of networks 3003, and the number of terminal apparatuses are all arbitrary.

In addition, the terminal apparatus can receive, for example, scalable encoded data of a plurality of content items from the delivery server 3002. Further, in a case where scalable encoded data of a plurality of content items is received from the delivery server 3002, the terminal apparatus can perform, for example, display of a plurality of screens such as so-called two-screen display in which a non-base layer image is displayed in relation to a certain content item among the plurality of content items, and a base layer image is displayed in relation to the other content items.

Second Example of Using Hierarchical Layer Image Encoding Method

Figure 46:
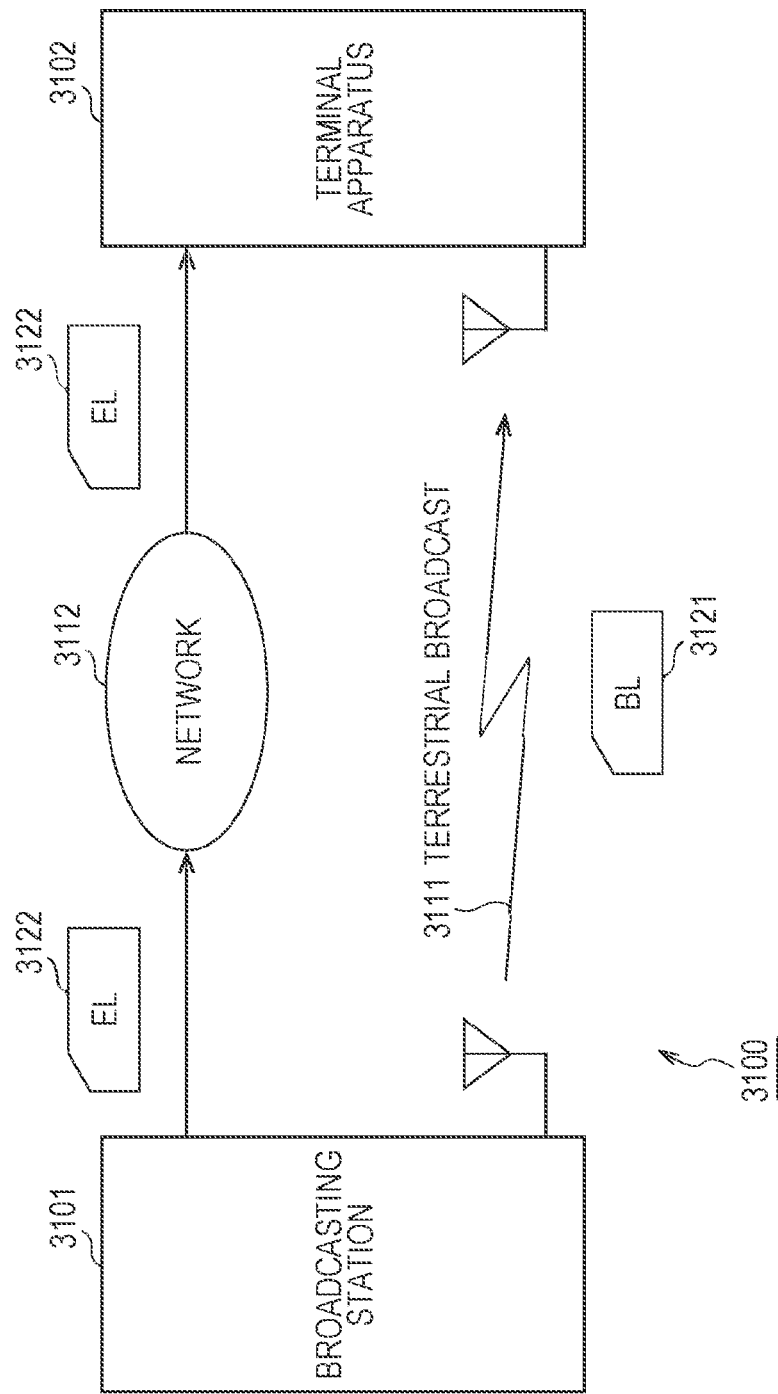
FIG. 46 is a block diagram showing another example of usage of scalable encoding.

FIG. 46 is a diagram illustrating a second example of using the hierarchical layer image encoding method.

The scalable encoding can be used, for example, for transmission using a plurality of communication media as in an example shown in FIG. 46.

In a data transmission system 3100 shown in FIG. 46, a broadcasting station 3101 transmits base layer scalable encoded data (BL) 3121 by using a terrestrial broadcast 3111. In addition, the broadcasting station 3101 transmits (for example, packetizes and transmits) non-base layer scalable encoded data (EL) 3122 via any network 3112 formed by a wired network, a wireless network, or both.

A terminal apparatus 3102 has a reception function of the terrestrial broadcast 3111 which is broadcasted by the broadcasting station 3101, and receives the base layer scalable encoded data (BL) 3121 which is transmitted via the terrestrial broadcast 3111. In addition, the terminal apparatus 3102 further has a communication function of performing communication using the network 3112, and receives the non-base layer scalable encoded data (EL) 3122 which is transmitted via the network 3112.

The terminal apparatus 3102 can decode the base layer scalable encoded data (BL) 3121 which is acquired via the terrestrial broadcast 3111, for example, in response to an instruction from a user, so as to obtain a base layer image, to store the image, and to transmit the image to other apparatuses.

In addition, for example, in response to an instruction from a user, the terminal apparatus 3102 can combine the base layer scalable encoded data (BL) 3121 which is acquired via the terrestrial broadcast 3111 with the non-base layer scalable encoded data (EL) 3122 which is acquired via the network 3112 so as to obtain scalable encoded data (BL+EL), and can decode the data so as to obtain a non-base layer image, to store the image, and to transmit the image to other apparatuses.

As described above, the scalable encoded data can be transmitted via a communication medium which is different for each layer, for example. In this case, a load can be distributed, and thus it is possible to suppress the occurrence of delay or overflow.

In addition, a communication medium used for transmission can be selected for each layer depending on circumstances. For example, the base layer scalable encoded data (BL) 3121 having a relatively large amount of data can be transmitted via a communication media having a large bandwidth, and the non-base layer scalable encoded data (EL) 3122 having a relatively small amount of data can be transmitted via a communication medium having a small bandwidth. In addition, for example, a communication medium for transmitting the non-base layer scalable encoded data (EL) 3122 can be changed between the network 3112 and the terrestrial broadcast 3111 depending on an available bandwidth of the network 3112. Of course, this is also the same for data of any layer.

The control is performed as described above, and thus it is possible to further suppress an increase in a load in data transmission.

In addition, the number of layers is arbitrary, and the number of communication media used for transmission is also arbitrary. Further, the number of terminal apparatuses 3102 serving as a data transmission destination is also arbitrary. Furthermore, the data transmission system 3100, which splits encoded data which is scalably encoded into a plurality of data items in the unit of layers and transmits the data items via a plurality of lines as shown in FIG. 46, is not limited to a system which uses a broadcast.

Third Example of Using Hierarchical Layer Image Encoding Method

Figure 47:
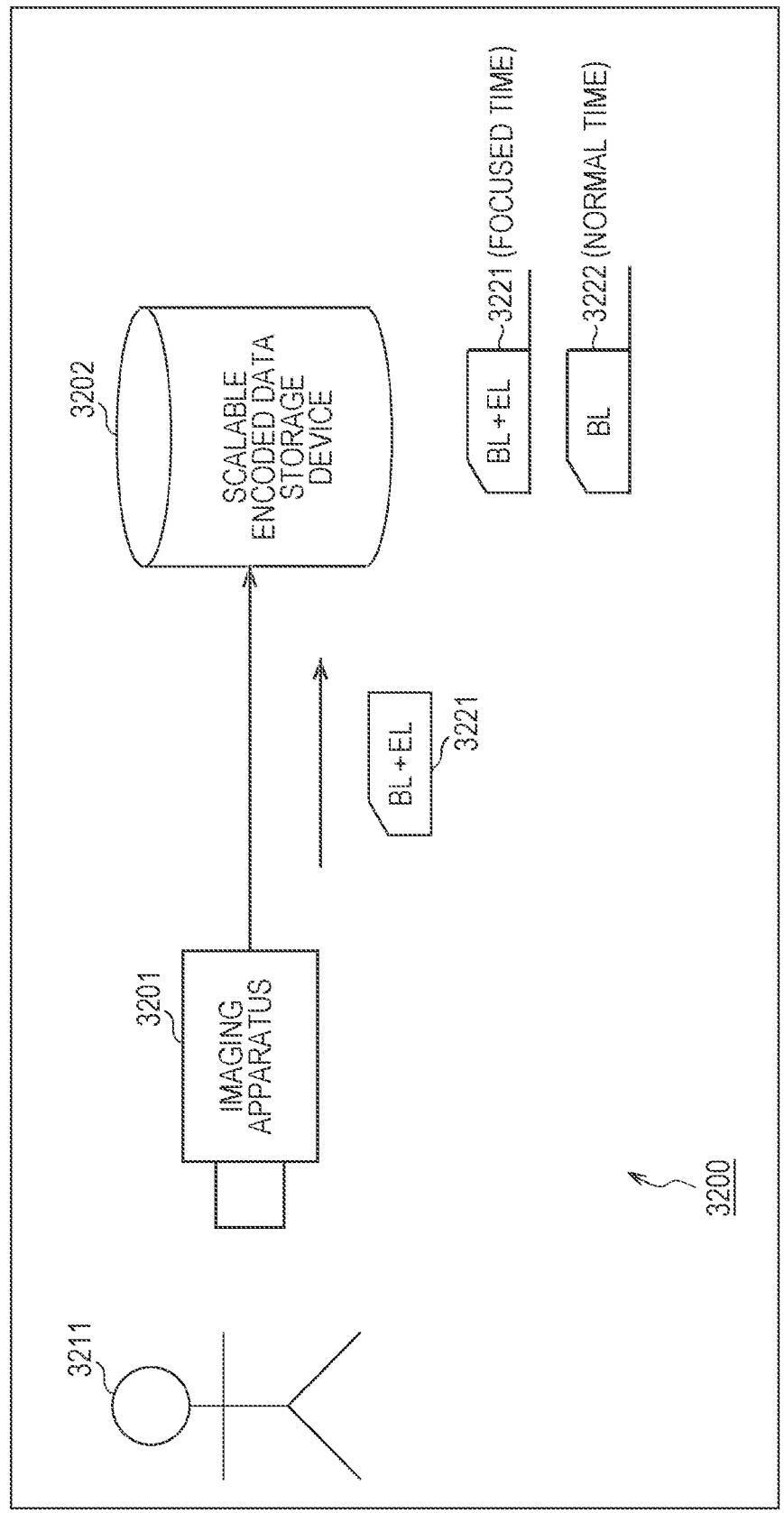
FIG. 47 is a block diagram showing still another example of usage of scalable encoding.

FIG. 47 is a diagram illustrating a third example of using the hierarchical layer image encoding method.

The scalable encoding can be used, for example, to store encoded data as in an example shown in FIG. 47.

In an imaging system 3200 shown in FIG. 47, an imaging apparatus 3201 scalably encodes image data which is obtained by imaging a subject 3211, and supplies resultant data to a scalable encoded data storage device 3202 as scalable encoded data (BL+EL) 3221.

The scalable encoded data storage device 3202 stores the scalable encoded data (BL+EL) 3221 which is supplied from the imaging apparatus 3201, with quality (resolution) based on circumstances. For example, in a case of the normal time, the scalable encoded data storage device 3202 extracts base layer data from the scalable encoded data (BL+EL) 3221, and stores the data as base layer scalable encoded data (BL) 3222 having a small amount of data with low quality. In contrast, for example, in a case of the notice time, the scalable encoded data storage device 3202 stores the scalable encoded data (BL+EL) 3221 having a large amount of data with high quality as it is.

Accordingly, since the scalable encoded data storage device 3202 can preserve a high quality image only as necessary, it is possible to suppress an increase in a data amount while suppressing a reduction in the value of an image due to image quality deterioration, and thus to improve use efficiency of a storage region.

For example, the imaging apparatus 3201 is assumed to be a monitoring camera. In a case (a case of the normal time) where a monitoring target (for example, an trespasser) is not reflected in a captured image (image data obtained by the imaging apparatus 3201), there is a high probability that content of the captured image may not be important, and thus a reduction in a data amount is prioritized, and the captured image (scalable encoded data) is stored with low quality. In contrast, in a case (a case of the notice time) where a monitoring target is reflected in a captured image as a subject 3211, there is a high probability that content of the captured image may be important, and thus image quality is prioritized, and the captured image (scalable encoded data) is stored with high quality.

In addition, the normal time and the notice time may be determined, for example, by the scalable encoded data storage device 3202 analyzing an image. Further, the normal time and the notice time can be determined, for example, by the imaging apparatus 3201, and a determination result can be transmitted to the scalable encoded data storage device 3202.

In addition, a determination criterion of the normal time and the notice time is arbitrary, and content of a captured image which is used as a determination criterion is arbitrary. Of course, conditions other than the content of a captured image can be used as a determination criterion. For example, the normal time and the notice time can be determined based on the magnitude, a waveform, or the like of a recorded sound. In addition, the normal time and the notice time can be changed, for example, for each predetermined time interval, or by an external instruction such as an instruction from a user.

In addition, in the above description, an example of changing two states including the normal time and the notice time has been described, but the number of states is arbitrary, and, for example, three or more states such as the normal time, the slight notice time, the notice time, and the great notice time can be changed. Herein, an maximum number of changed states depends on the number of layers of scalable encoded data.

In addition, the imaging apparatus 3201 can determine the number of scalable encoded layers based on a state. For example, in a case of the normal time, the imaging apparatus 3201 can generate the base layer scalable encoded data (BL) 3222 having a small amount of data with low quality, and can supply the data to the scalable encoded data storage device 3202. Further, for example, in a case of the notice time, the imaging apparatus 3201 can generate the base layer and non-base layer scalable encoded data (BL+EL) 3221 having a large amount of data with high quality, and can supply the data to the scalable encoded data storage device 3202.

In addition, usage of the imaging system 3200 is arbitrary and is not limited to a monitoring camera.

Further, in the present specification, a description has been made of an example in which various information pieces such as the prediction mode information and the merge information are multiplexed into a header of an encoded stream, and are transmitted from an encoding side to a decoding side. However, a method of transmitting the information pieces is not limited to this example. For example, the information may be transmitted or recorded as separate data correlated with an encoded stream without being multiplexed into the encoded stream. Here, the term "correlated" indicates that an image (which may be a part of the image such as a slice or a block) included in the encoded stream can be linked to information corresponding to the image during decoding. That is, the information may be transmitted on a transmission path different from that of the image (or the encoded stream). Furthermore, the information may be recorded on a recording medium (or a different recording area of the same recording medium) different from that of the image (or the encoded stream). Moreover, the information and the image (or the encoded stream) may be correlated with each other in any unit such as, for example, a plurality of frames, one frame, or a part of the frame.

As described above, although the preferred embodiment of the present technology has been described in detail with reference to the accompanying drawings, the present invention is not limited to this example. It is obvious that those skilled in the art can conceive of various modifications or alterations in the scope of the technical spirit recited in the claims, and it is understood that they naturally also fall within the technical scope of the present technology.

In addition, the present technology may have the following configurations.

[1]

An image processing apparatus including: a setting unit which sets restriction information for restricting a size of a block of an image and a prediction method to be applied to the block having the size; a prediction unit which generates a prediction image according to the restriction information set by the setting unit; an encoding unit which encodes the image using the prediction image generated by the prediction unit and generates an encoded stream; and a transmission unit which transmits the encoded stream generated by the encoding unit and the restriction information set by the setting unit.

[2]

The image processing apparatus according to [1], in which the setting unit sets the restriction information based on a memory bandwidth which is a transmission rate at which a decoded image is read out from a storage unit which stores the decoded image used when generating the prediction image.

[3]

The image processing apparatus according to [2], in which the setting unit sets restriction information for restricting a predetermined prediction method to be applied to a block having a large size, as the memory bandwidth is small.

[4]

The image processing apparatus according to [3], in which the predetermined prediction method is bidirectional prediction, or both bidirectional prediction and unidirectional prediction.

[5]
The image processing apparatus according to [1], in which the setting unit sets the restriction information based on a profile or a level.

[6]
The image processing apparatus according to [5], in which the setting unit sets restriction information for restricting a predetermined prediction method to be applied to a block having a large size as the size of the image represented by the profile or the level is large.

[7]
The image processing apparatus according to [6], in which the predetermined prediction method is bidirectional prediction, or both bidirectional prediction and unidirectional prediction.

[8]
An image processing method including: a setting step of setting restriction information for restricting a size of a block of an image and a prediction method to be applied to the block having the size; a prediction step of generating a prediction image according to the restriction information set in the setting step; an encoding step of encoding the image using the prediction image generated in the prediction step and generating an encoded stream; and a transmission step of transmitting the encoded stream generated in the encoding step and the restriction information set in the setting step.

[9]
An image processing apparatus including: a reception unit which receives restriction information for restricting a size of a block of an image and a prediction method to be applied to the block having the size, and an encoded stream generated by encoding the image; a prediction unit which generates a prediction image according to the restriction information received by the reception unit; and a decoding unit which decodes the encoded stream received by the reception unit, using the prediction image generated by the prediction unit.

[10]
The image processing apparatus according to [9], in which the prediction unit generates the prediction image, in a case where the encoded stream is suitable for the restriction information.

[11]
An image processing method including: a reception step of receiving restriction information for restricting a size of a block of an image and a prediction method to be applied to the block having the size, and an encoded stream generated by encoding the image; a prediction step of generating a prediction image according to the restriction information received in the reception step; and a decoding step of decoding the encoded stream received in the reception step, using the prediction image generated in the prediction step.

[12]
An image processing apparatus including: a setting unit which sets restriction information for restricting a size of a block of an image and a prediction method to be applied to the block having the size, based on a profile and a level; a prediction unit which generates a prediction image according to the restriction information set by the setting unit; an encoding unit which encodes the image using the prediction image generated by the prediction unit and generates an encoded stream; and a transmission unit which transmits the encoded stream generated by the encoding unit.

[13]
An image processing method including: a setting step of setting restriction information for restricting a size of a block of an image and a prediction method to be applied to the block having the size, based on a profile and a level; a prediction step of generating a prediction image according to the restriction information set in the setting step; an encoding step of encoding the image using the prediction image generated in the prediction step and generating an encoded stream; and a transmission step of transmitting the encoded stream generated in the encoding step.

[14]
An image processing apparatus including: a reception unit which receives an encoded stream encoded according to restriction information for restricting a size of a block of an image and a prediction method to be applied to the block having the size, based on a profile or a level; a prediction unit which generates a prediction image according to the restriction information recognized based on the profile or the level; and a decoding unit which decodes the encoded stream received by the reception unit, using the prediction image generated by the prediction unit.

[15]
An image processing method including: a reception step of receiving an encoded stream encoded according to restriction information for restricting a size of a block of an image and a prediction method to be applied to the block having the size, based on a profile or a level; a prediction step of generating a prediction image according to the restriction information recognized based on the profile or the level; and a decoding step of decoding the encoded stream received in the reception step, using the prediction image generated in the prediction step.

REFERENCE SIGNS LIST

100 IMAGE ENCODING DEVICE, 106 REVERSIBLE ENCODING UNIT, 121 ENCODING CONTROL UNIT, 143 MERGE FLAG ENCODING UNIT, 144 MERGE MODE ENCODING UNIT, 200 IMAGE DECODING DEVICE, 202 REVERSIBLE DECODING UNIT, 221 DECODING CONTROL UNIT, 243 MERGE FLAG DECODING UNIT, 244 MERGE MODE DECODING UNIT, 1001 INPUT PICTURE BUFFER, 1002 CALCULATION UNIT, 1003 ORTHOGONAL TRANSFORM UNIT, 1004 QUANTIZATION UNIT, 1005 ENTROPY ENCODING UNIT, 1006 INVERSE QUANTIZATION UNIT, 1007 INVERSE ORTHOGONAL TRANSFORM UNIT, 1008 CALCULATION UNIT, 1009 DEBLOCK FILTER, 1010 ADAPTIVE SAMPLE OFFSET UNIT, 1011 ADAPTIVE SAMPLE OFFSET ESTIMATION UNIT, 1012 ADAPTIVE LOOP FILTER, 1013 ADAPTIVE LOOP FILTER ESTIMATION UNIT, 1014 DPB, 1015 INTRA-DIRECTION ESTIMATION UNIT, 1016 INTRA-PREDICTION UNIT, 1017 MOTION ESTIMATION UNIT, 1018 INTER-PREDICTION UNIT, 1019 MODE DETERMINATION UNIT, 1021 SETTING UNIT, 2001 ENTROPY DECODING UNIT, 2002 INVERSE QUANTIZATION UNIT, 2003 INVERSE ORTHOGONAL TRANSFORM UNIT, 2004 CALCULATION UNIT, 2005 DEBLOCK FILTER, 2006 ADAPTIVE SAMPLE OFFSET UNIT, 2007 ADAPTIVE LOOP FILTER, 2008 DPB, 2009 INTRA-PREDICTION UNIT, 2010 INTER-PREDICTION UNIT, 2011 MODE SELECTION UNIT

What is claimed is:
1. An image processing apparatus, comprising:
a memory configured to store a decoded image; and
circuitry configured to:
set restriction information based on each of a maximum required value of a memory bandwidth, a frame rate, and a size of a largest coding unit, wherein the restriction information is set for generation of a prediction image, and the memory bandwidth is a transmission rate at which the stored decoded image is read out from the memory;

generate the prediction image based on the set restriction information;

calculate a difference between an input image and the prediction image;

encode the calculated difference between the input image and the prediction image;

generate an encoded stream based on the prediction image and the set restriction information; and transmit the generated encoded stream and the set restriction information.

2. The image processing apparatus according to claim 1, wherein the circuitry is further configured to set the restriction information to prohibit bidirectional prediction to be applied to a partitioned image block.

3. The image processing apparatus according to claim 2, wherein a size of the partitioned image block is one of 4×4, 8×4, 4×8, or 8×8.

4. The image processing apparatus according to claim 1, wherein the set restriction information limits, based on the memory bandwidth, an application of a specific prediction method to a block of a specific size.

5. The image processing apparatus according to claim 4, wherein the specific prediction method is at least one of a bidirectional prediction or a unidirectional prediction.

6. The image processing apparatus according to claim 1, wherein the circuitry is further configured to set the restriction information based on at least one of profile information or level information.

7. The image processing apparatus according to claim 6, wherein the circuitry is further configured to set the restriction information to restrict a specific prediction method to be applied to a block of a specific size, the restriction of the specific prediction method is based on a size of the input image, and the size of the input image is represented by at least one of the profile information or the level information.

8. The image processing apparatus according to claim 7, wherein the specific prediction method is at least one of a bidirectional prediction or a unidirectional prediction.

9. An image processing method, comprising:

setting restriction information based on each of a maximum required value of a memory bandwidth, a frame rate, and a size of a largest coding unit, wherein the restriction information is set for generation of a prediction image, and the memory bandwidth is a transmission rate at which a decoded image is read out from a memory;

generating the prediction image based on the set restriction information;

calculating a difference between an input image and the prediction image;

encoding the calculated difference between the input image and the prediction image;

generating an encoded stream based on the prediction image and the set restriction information; and transmitting the generated encoded stream and the set restriction information.

10. The image processing method according to claim 9, wherein the restriction information is set to prohibit bidirectional prediction to be applied to a partitioned image block.

11. The image processing method according to claim 10, wherein a size of the partitioned image block is one of 4×4, 8×4, 4×8, or 8×8.

12. The image processing method according to claim 9, wherein the set restriction information limits, based on the memory bandwidth, an application of a specific prediction method to a block of a specific size.

13. The image processing method according to claim 12, wherein the specific prediction method is at least one of a bidirectional prediction or a unidirectional prediction.

14. The image processing method according to claim 9, wherein the restriction information is set further based on at least one of profile information or level information.

15. The image processing method according to claim 14, wherein the set restriction information restricts a specific prediction method to be applied to a block of a specific size, the restriction of the specific prediction method is based on a size of the input image, and the size of the input image is represented by at least one of the profile information or the level information.

16. The image processing method according to claim 15, wherein the specific prediction method is at least one of a bidirectional prediction or a unidirectional prediction.

17. A non-transitory computer-readable medium having stored thereon computer-executable instructions that, when executed by a computer, cause the computer to execute operations, the operations comprising:

setting restriction information based on each of a maximum required value of a memory bandwidth, a frame rate, and a size of a largest coding unit, wherein the restriction information is set for generation of a prediction image, and the memory bandwidth is a transmission rate at which a decoded image is read out from a memory;

generating the prediction image based on the set restriction information;

calculating a difference between an input image and the prediction image;

encoding the calculated difference between the input image and the prediction image;

generating an encoded stream based on the prediction image and the set restriction information; and transmitting the generated encoded stream and the set restriction information.

* * * * *